US 12,535,944 B2

United States Patent
Ye et al.

(10) Patent No.: US 12,535,944 B2
(45) Date of Patent: Jan. 27, 2026

(54) METHOD FOR INTERACTION BETWEEN ELECTRONIC DEVICES AND ELECTRONIC DEVICE

(71) Applicant: Huawei Technologies Co., Ltd., Shenzhen (CN)

(72) Inventors: Fei Ye, Wuhan (CN); Lina Tao, Shenzhen (CN); Yufeng Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 86 days.

(21) Appl. No.: 18/557,699

(22) PCT Filed: Apr. 2, 2022

(86) PCT No.: PCT/CN2022/085110
§ 371 (c)(1),
(2) Date: Oct. 27, 2023

(87) PCT Pub. No.: WO2022/228048
PCT Pub. Date: Nov. 3, 2022

(65) Prior Publication Data
US 2024/0220095 A1 Jul. 4, 2024

(30) Foreign Application Priority Data
Apr. 29, 2021 (CN) .......................... 202110475805.1

(51) Int. Cl.
*G06F 3/04847* (2022.01)
*G06F 1/16* (2006.01)
(Continued)

(52) U.S. Cl.
CPC ........ *G06F 3/04847* (2013.01); *G06F 1/1698* (2013.01); *G06F 3/04817* (2013.01); *G06F 3/0486* (2013.01); *G06F 3/0488* (2013.01)

(58) Field of Classification Search
CPC ............ G06F 3/04847; G06F 3/04817; G06F 3/0486; G06F 3/0488; G06F 3/165;
(Continued)

(56) References Cited

U.S. PATENT DOCUMENTS

2010/0138794 A1 6/2010 Ganey et al.
2012/0151400 A1* 6/2012 Hong .................. G06F 3/04817
715/769
(Continued)

FOREIGN PATENT DOCUMENTS

CN 103916162 A 7/2014
CN 104023069 A 9/2014
(Continued)

*Primary Examiner* — Jeanette J Parker
(74) *Attorney, Agent, or Firm* — Slater Matsil, LLP

(57) ABSTRACT

A method for interaction between electronic devices. A unified entry for triggering an interaction function between associated devices is provided in a control center of the electronic device. On the unified entry, a user may trigger an interaction function between two or more electronic devices by dragging a device icon of the associated device, and the electronic device may intelligently determine an interaction function executed between the electronic devices.

19 Claims, 39 Drawing Sheets

(51) Int. Cl.
*G06F 3/04817* (2022.01)
*G06F 3/0486* (2013.01)
*G06F 3/0488* (2022.01)

(58) Field of Classification Search
CPC ............ G06F 1/1698; H04N 21/41265; H04N 21/43615; H04N 21/485; H04W 4/023
See application file for complete search history.

(56) References Cited

U.S. PATENT DOCUMENTS

| | | | |
|---|---|---|---|
| 2012/0191832 A1* | 7/2012 | Kim | ...................... H04L 65/403 |
| | | | 709/223 |
| 2016/0092072 A1 | 3/2016 | So et al. | |
| 2017/0171035 A1 | 6/2017 | Lu et al. | |
| 2017/0289329 A1* | 10/2017 | Yim | ...................... H04W 88/02 |
| 2017/0311368 A1* | 10/2017 | Kandur Raja | .......... H04L 12/28 |
| 2023/0273763 A1* | 8/2023 | Kim | ........................ G06F 3/165 |
| | | | 381/307 |

FOREIGN PATENT DOCUMENTS

| | | |
|---|---|---|
| CN | 104954537 A | 9/2015 |
| CN | 111796786 A | 10/2020 |
| CN | 111835904 A | 10/2020 |
| CN | 111880421 A | 11/2020 |
| KR | 101752417 B1 | 6/2017 |
| WO | 1998048554 A1 | 10/1998 |
| WO | 2012038589 A1 | 3/2012 |

* cited by examiner

METHOD FOR INTERACTION BETWEEN ELECTRONIC DEVICES AND ELECTRONIC DEVICE

CROSS-REFERENCE TO RELATED APPLICATIONS

This application is a national stage of International Application No. PCT/CN2022/085110, filed on Apr. 2, 2022, which claims priority to Chinese Patent Application No. 202110475805.1, filed on Apr. 29, 2021. Both of the aforementioned applications are hereby incorporated by reference in their entireties.

TECHNICAL FIELD

This application relates to the field of electronic technologies, and in particular, to a method for interaction between electronic devices and an electronic device.

BACKGROUND

There are more and more all-scenario electronic devices, and different electronic devices have different software and hardware features. Generally, two or more electronic devices need to collaborate with each other to perform some tasks, for example, projection, application handoff, and file/picture sharing, which are also referred to as cross-device services. In practice, a same device vendor or a same application vendor may set different entries and different triggering manners for different cross-device services. Different device vendors or different application vendors may set different entries and triggering modes for a same cross-device service.

For example, a file/image on an electronic device A needs to be shared with an electronic device B. A user selects the to-be-shared file/picture in the electronic device A, and taps a sharing control. The electronic device A starts to search for a surrounding device and displays a device list. The user selects the electronic device B from the device list, and the electronic device A sends the selected file/picture to the electronic device B.

For another example, screen content of the electronic device A needs to be projected onto the electronic device B. A user needs to first enable a wireless connection function of the two electronic devices. Then, the user performs an operation on the electronic device B, so that the electronic device B displays QR code, and then enables a scanning function of the electronic device A to scan the QR code and establish a connection to the electronic device B. After the electronic device A establishes the connection to the electronic device B, the user operates a screen projection control on an interface of a specific application (for example, a screen projection application or a video application) on the electronic device A, the electronic device A sends projection data to the electronic device B, and the electronic device B displays a screen mirror image of the electronic device A.

As can be seen above, entries of cross-device services are scattered and interaction modes are different, which may confuse users.

SUMMARY

This application provides a method for interaction between electronic devices and an electronic device, so as to resolve a problem that entries of interaction functions between electronic devices are scattered and interaction manners are different, which easily causes confusion of a user during use.

According to a first aspect, a method for interaction between electronic devices is provided, including: A first electronic device displays a first interface, where the first interface includes a first control corresponding to the first electronic device (for example, a device icon corresponding to the first electronic device) and a second control corresponding to a second electronic device (for example, a device icon corresponding to the second electronic device), the second electronic device is associated with the first electronic device, and a distance between the first control and the second control is a first distance; the first electronic device receives a first operation of a user on the second control; in response to the first operation, the first electronic device controls the distance between the first control and the second control to change to a second distance (for example, to be zero or close to zero, that is, two device icons may overlap or partially overlap, or edges of the two device icons are in contact), and the first electronic device determines to perform a first interaction function with the second electronic device, where the second distance is less than the first distance.

It can be learned from the foregoing content that a user may trigger an interaction function between electronic devices by moving, on a first interface, a control corresponding to the electronic device. An operation manner of the user is simple and easy to remember, and efficiency of interaction between the user and the electronic device is improved. It is easy to understand that the first interface may be used as a unified entry for triggering the interaction function between electronic devices, thereby resolving a problem in the conventional technology that entries of interaction functions between electronic devices are scattered and interaction manners are different, which easily causes confusion of the user during use.

In a possible implementation, that the second electronic device is associated with the first electronic device includes: The second electronic device and the first electronic device are located in a same communication network; or the second electronic device and the first electronic device log in to a same account; or a login account of the second electronic device and a login account of the first electronic device belong to a same group; or the second electronic device has been connected to a hotspot shared by the first electronic device; or the first electronic device has been connected to a hotspot shared by the second electronic device; or the first electronic device and the second electronic device have established a Wi-Fi direct connection.

In other words, the first interface may be used as a unified entry for triggering an interaction function between the first electronic device and an associated device of the first electronic device.

In a possible implementation, the first operation includes: dragging the second control on the first interface, and releasing the second control when the distance between the second control and the first control is less than a first threshold, where the first threshold is less than the first distance, and the first threshold is greater than or equal to the second distance. The dragging the second control on the first interface includes: touching and holding the second control on the first interface, and dragging the second control toward the first control.

In some examples of this implementation, a location of the second control may change with a movement of a finger of the user on a screen. In a specific implementation, when the user drags the second control to move, if the distance between the second control and the first control is less than the first threshold, and the finger of the user releases the second control (that is, the finger leaves the screen of the first electronic device), the distance between the first control and the second control changes to the second distance. In another specific implementation, after the user drags the second control to move, if the distance between the second control and the first control is less than a first threshold, and the finger of the user does not release the second control (that is, the finger does not leave the screen of the first electronic device) and stays at a location for preset duration, the distance between the first control and the second control changes to the second distance.

It should be noted that a moving track of the finger when the user drags the second control is not limited in this application. In other words, the moving track when the user drags the second control may be any curve. When the finger of the user releases the second control, or when duration for which the finger of the user stays at the location reaches preset duration, a distance between a location at which the finger of the user releases a device icon of a sound box or a location at which the finger of the user stays and the first control is calculated. When the distance is less than the first threshold, the distance between the first control and the second control changes to the second distance.

In some other examples of this implementation, when the user touches and holds the second control to drag, the second control may not change with a movement of the finger of the user. To be specific, when the user touches and holds the second control, and leaves the screen after sliding on the screen for a distance or stays at a location on the screen for preset duration, the first electronic device determines a location at which the finger of the user leaves the screen or a location at which the finger of the user stays and the first control. When the distance is less than the first threshold, the distance between the first control and the second control changes to the second distance.

In a possible implementation, the method further includes: The first electronic device displays a running interface of the first application. The first electronic device receives a second operation. In response to the second operation, the first electronic device displays an interface of a control center, where the interface of the control center includes a first widget. The first electronic device receives a third operation on the first widget. That a first electronic device displays a first interface includes: In response to the third operation, the first electronic device displays the first interface.

In other words, the first interface may be entered through the control center of the first electronic device. In some other examples, the first interface may alternatively be set in a leftmost screen or a corresponding interface of another application (for example, a system setting application or a smart home application).

In a possible implementation, that the first electronic device determines to perform a first interaction function with the second electronic device includes: The first electronic device determines the first interaction function based on information about an application currently running on the first electronic device and a device type of the second electronic device.

In other words, the first electronic device may intelligently determine, based on the information about the currently running application and the device type of the second electronic device, the first interaction function performed with the second electronic device. In other words, when the application currently running on the first electronic device is different, the first electronic device performs a different interaction function with the second electronic device. Alternatively, the first electronic device performs a different interaction function with a second electronic device of a different device type.

In this way, intelligence of the first electronic device is improved, and interaction scenarios between electronic devices are enriched.

In a possible implementation, the application currently running on the first electronic device is a first application.

In other words, the user displays the control center in a pull-up or slide-down manner on an application interface of the first application displayed by the first electronic device, and enters the first interface through a control (or referred to as a widget) of the control center. In this case, the application currently running on the first electronic device is the first application. In some scenarios, when the first application is a non-desktop application, the first electronic device may determine, based on running information of the first application and the device type of the second electronic device, to perform an interaction function, that is, the first interaction function. When the first application is a desktop application, the first electronic device may also determine, based on the device type of the second electronic device, to perform a specific interaction function, that is, the first interaction function is a preset function.

In a possible implementation, after the distance between the first control and the second control changes to the second distance, the method further includes: The first electronic device receives a fourth operation on the second control; and in response to the fourth operation, the first electronic device controls the distance between the second control and the first control to change to the first distance, and stop performing the first interaction function with the second electronic device.

Therefore, a manner of stopping the first interaction function performed between the first electronic device and the second electronic device is provided.

In a possible implementation, the fourth operation includes: dragging the second control, and releasing the second control when a distance between the second control and the first control is greater than a second threshold; or touching and holding the second control, dragging the second control away from the first control, and releasing the second control when the distance between the second control and the first control is greater than the second threshold, where the second threshold is less than or equal to the first distance, and the second threshold is greater than the second distance.

In a possible implementation, after that the first electronic device controls the distance between the second control and the first control to change to the first distance, the method further includes: The first electronic device receives a fifth operation on the first control; and in response to the fifth operation, the first electronic device controls the distance between the first control and the second control to change to the second distance, and the first electronic device determines to perform a second interaction function with the second electronic device, or the first electronic device sends a first message to the second electronic device, where the first message indicates the second electronic device to determine a second interaction function performed by the second electronic device with the first electronic device.

In other words, when the user moves the first control, the first electronic device may determine the second interaction function performed with the second electronic device, or the second electronic device may determine the second interaction function performed with the first electronic device.

In a possible implementation, a data transmission direction between the first electronic device and the second electronic device during performing of the first interaction function by the first electronic device and the second electronic device is different from a data transmission direction between the first electronic device and the second electronic device during performing of the second interaction function by the first electronic device and the second electronic device.

In other words, dragging, by the user, the second control to approach the first control and dragging, by the user, the first control to approach the second control may trigger a same interaction function, but indicate different data transmission directions between the two electronic devices. For example, if a device icon of a PC is touched and held and dragged toward a device icon of a mobile phone to trigger an interaction function between two electronic devices, when application handoff is performed between a mobile phone 101 and a PC 104, a state of an application on the PC 104 may be sent to the mobile phone 101, and the mobile phone 101 performs the application through handoff based on the received state of the application. If a device icon of the mobile phone is touched and held and dragged toward a device icon of the PC to trigger an interaction function between two electronic devices, when application handoff is performed between the mobile phone 101 and the PC 104, a state of an application on the mobile phone 101 may be sent to the PC 104, and the PC 104 performs the application through handoff based on to the received state of the application.

In a possible implementation, a relative location between the second control and the first control in the first interface is determined based on a relative location between the second electronic device and the first electronic device.

In other words, a relative location relationship between the first control and the second control also represents a location relationship between the first electronic device and the second electronic device in real space. In other words, the first interface more vividly displays the relative location of the first electronic device and the second electronic device in real space. It is easy to understand that relative locations of electronic devices in real space help the user distinguish between the electronic devices. In other words, if the first electronic device finds two or more electronic devices with a same name, the user may distinguish the electronic devices with the same name based on different relative locations between the first electronic device and the electronic devices, so that the user selects one of the electronic devices to interact with the first electronic device. For example, when the first electronic device finds two smart televisions whose names are HUAWEI Vision, an interface A displayed by the first electronic device further displays two relative locations of identifiers of the HUAWEI Visions and an identifier of the first electronic device. In this case, the user may determine, based on a location of each smart television relative to the first electronic device in real space, a smart television corresponding to the identifier of each HUAWEI Vision.

In a possible implementation, the relative location between the second electronic device and the first electronic device includes a relative distance and/or a relative direction between the second electronic device and the second electronic device in a horizontal direction.

In a possible implementation, the method further includes: The first electronic device measures the relative distance between the second electronic device and the first electronic device by using a Wi-Fi-based positioning technology or a Bluetooth iBeacon-based positioning technology; or the first electronic device measures the relative distance and/or the relative direction between the second electronic device and the first electronic device by using a Bluetooth 5.1-based AOA positioning technology and a UWB-based positioning technology.

In a possible implementation, the first interface further includes a third control corresponding to a third electronic device, and the third electronic device is associated with the first electronic device.

It can be learned that the first interface includes a control corresponding to another electronic device associated with the first electronic device. In other words, the first interface may be used as a unified entry for triggering an interaction function between the first electronic device and an associated device of the first electronic device.

In a possible implementation, in the first interface, the third control and the second control are centered around the first control.

In an example, the first electronic device may not measure the distance between each associated device and the first electronic device. Instead, a distance between a device icon of each associated device and a device icon of the first electronic device is set to a default value, for example, 120 DP. Optionally, to create a sense of randomness and enhance aesthetics of a device icon layout, a length value, for example, 20 DP, may also be randomly added or subtracted from a determined distance between a device icon of another associated device and the device icon of the first electronic device. It should be noted that, the distance between the device icon of each associated device and the device icon of the first electronic device may be set to be same, that is, there is one default value. Alternatively, the distance between the device icon of each associated device and the device icon of the first electronic device may be set to be different, that is, there are a plurality of default values.

Then, an included angle α between connecting lines of device icons of any two adjacent associated devices and the device icon of the first electronic device is determined based on a quantity M of the associated devices. For example, α=360 degrees/M. Optionally, to create a sense of randomness and enhance aesthetics of the device icon layout, an angle value, for example, 10 degrees, may also be randomly added or subtracted from the determined angle α.

Finally, a location of a device icon of another associated device is determined based on the included angle α and the default distance between the device icon of each associated device and the device icon of the first electronic device. For example, the first electronic device displays an interface 1201 shown in FIG. 12. It can be seen that distances between device icons of associated devices and the device icon of the first electronic device are approximately equal.

According to a second aspect, a method for interaction between electronic devices is provided, including: A first electronic device displays a first interface, where the first interface includes a first control corresponding to the first electronic device, a second control corresponding to a second electronic device, and a third control corresponding to a third electronic device, both the second electronic device and the third electronic device are associated with the first electronic device, and a distance between the second control and the third control is a first distance; the first electronic device receives a first operation of a user on the second control; and in response to the first operation, the first electronic device controls a distance between the second control and the third control to change to a second distance, and the first electronic device determines that the second electronic device performs a first interaction function with the third electronic device, where the second distance is less than the first distance.

In other words, the user may also trigger, on the first interface of the first electronic device, an interaction function between two other electronic devices that are not the first electronic device. In other words, the first interface of the first electronic device may be used as a unified entry for triggering an interaction function between associated devices of the first electronic device. In this way, a problem in the conventional technology that entries of interaction functions of different electronic devices are scattered and interaction manners are different is resolved, which easily causes confusion of a user during use.

In a possible implementation, that the first electronic device determines that the second electronic device performs a first interaction function with the third electronic device includes: The first electronic device sends a first message to the second electronic device, where the first message indicates to report information about an application currently running on the second electronic device, or the first electronic device sends a second message to the third electronic device, where the second message indicates to report information about an application currently running on the third electronic device; the first electronic device receives the information about the application currently running on the second electronic device, or the first electronic device receives the information about the application currently running on the third electronic device; and the first electronic device determines, based on the information about the application currently running on the second electronic device and a device type of the third electronic device, to perform the first interaction function; or the first electronic device determines, based on the information about the application currently running on the third electronic device and a device type of the second electronic device, to perform the first interaction function.

In other words, a method for determining, by the first electronic device, the interaction function performed between the second electronic device and the third electronic device is provided.

In a possible implementation, before that the first electronic device receives a first operation of a user on the second control, the method further includes: The first electronic device receives information about an application currently running on the second electronic device, or the first electronic device receives information about an application currently running on the third electronic device; then, that the first electronic device determines that the second electronic device performs a first interaction function the third electronic device includes: The first electronic device determines, based on the information about the application currently running on the second electronic device and a device type of the third electronic device, to perform the first interaction function; or the first electronic device determines, based on the information about the application currently running on the third electronic device and a device type of the second electronic device, to perform the first interaction function.

In other words, another method for determining, by the first electronic device, the interaction function performed between the second electronic device and the third electronic device is provided.

In a possible implementation, after that the first electronic device determines that the second electronic device performs a first interaction function with the third electronic device, the method further includes: The first electronic device sends a third message to the second electronic device or the third electronic device, to indicate to perform the first interaction function.

In a possible implementation, the method further includes: The first electronic device receives a second operation of the user; in response to the second operation, the first electronic device controls the second control to move away from the third control; and when a distance between the second control and the third control is greater than or equal to a first threshold, the first electronic device sends a fourth message to the second electronic device or the third electronic device, to indicate to stop performing the first interaction function.

In a possible implementation, the first operation includes: dragging the second control on the first interface, and releasing the second control when the distance between the second control and the third control is less than a first threshold, where the first threshold is less than the first distance, and the first threshold is greater than or equal to the second distance. The dragging a second control on the first interface includes: touching and holding the second control on the first interface, and dragging the second control toward the third control.

In a possible implementation, after the distance between the second control and the third control is changed to the second distance, the method further includes: The first electronic device receives a second operation of the user on the second control; and in response to the second operation, the first electronic device controls the distance between the second control and the third control to change to the first distance, and the first electronic device sends a fourth message to the second electronic device or the third electronic device, to indicate to stop performing the first interaction function.

In a possible implementation, the second operation includes: dragging the second control, and releasing the second control when the distance between the second control and the third control is greater than a second threshold; or touching and holding the second control, dragging the second control away from the third control, and releasing the second control when the distance between the second control and the third control is greater than the second threshold, where the second threshold is less than or equal to the first distance, and the second threshold is greater than the second distance.

According to a third aspect, a method for interaction between electronic devices is provided, including: A first electronic device displays a first interface, where the first interface includes a first control corresponding to the first electronic device, a second control corresponding to a second electronic device, and a third control corresponding to a third electronic device, both the second electronic device and the third electronic device are associated with the first electronic device, and a distance between the second control and the third control is a first distance; the first electronic device receives a first operation of a user on the second control; and in response to the first operation, the first electronic device controls a distance between the second control and the third control to change to a second distance, and the first electronic device sends a first message to the second electronic device or the third electronic device, to trigger the second electronic device and the third electronic device to perform a first interaction function, where the second distance is less than the first distance.

In other words, the user may trigger, on the first interface of the first electronic device, an interaction function between two other electronic devices that are not the first electronic device. In other words, the first interface of the first electronic device may be used as a unified entry for triggering an interaction function between associated devices of the first electronic device.

In addition, the first electronic device does not determine the interaction function executed between the second electronic device and the third electronic device, but the second electronic device or the third electronic device determines the interaction function executed between the two electronic devices.

In a possible implementation, the first operation includes: dragging the second control on the first interface, and releasing the second control when the distance between the second control and the third control is less than a first threshold, where the first threshold is less than the first distance, and the first threshold is greater than or equal to the second distance. The dragging a second control on the first interface includes: touching and holding the second control on the first interface, and dragging the second control toward the third control.

In a possible implementation, the method further includes: The first electronic device receives a second operation on the second control; and in response to the second operation, the first electronic device controls the distance between the second control and the third control to change to the first distance, and the first electronic device sends a second message to the second electronic device or the third electronic device, to indicate to stop performing the first interaction function.

In a possible implementation, the second operation includes: dragging the second control, and releasing the second control when the distance between the second control and the third control is greater than a second threshold; or touching and holding the second control, dragging the second control away from the third control, and releasing the second control when the distance between the second control and the third control is greater than the second threshold, where the second threshold is less than or equal to the first distance, and the second threshold is greater than the second distance.

According to a fourth aspect, a method for interaction between electronic devices is provided. The method is applied to a first electronic device, and the method includes: displaying a running interface of a first application; receiving a first operation of a user; in response to the first operation, displaying an interface of a control center, where the interface of the control center includes a first widget; receiving a second operation on the first widget; in response to the second operation, displaying a first interface, where the first interface includes a first control corresponding to the first electronic device and a second control corresponding to a second electronic device, the second electronic device is associated with the first electronic device, and a distance between the first control and the second control is a first distance; receiving a third operation on the second control on the first interface; and in response to the third operation, controlling the second control to be adsorbed together with the first control, and determining to perform a first interaction function with the second electronic device.

It can be seen that the control center provides a unified entry for triggering an interaction function between associated devices, and a triggered user interaction manner is unified.

In a possible implementation, that the second electronic device is associated with the first electronic device includes: The second electronic device and the first electronic device are located in a same communication network; or the second electronic device and the first electronic device log in to a same account; or a login account of the second electronic device and a login account of the first electronic device belong to a same group.

In a possible implementation, the determining to perform a first interaction function with the second electronic device includes: determining, based on a type of the second electronic device, the first interaction function performed with the second electronic device; or determining, based on the first application and a type of the second electronic device, the first interaction function performed with the second electronic device.

In a possible implementation, the first interaction function is any one of an audio projection function, a screen projection function, an application handoff function, or a content sharing function.

The audio projection function is that the first electronic device sends audio data of first audio to the second electronic device, so that the second electronic device plays the first audio; the screen projection function is that the first electronic device sends interface data of the first interface to the second electronic device, so that the second electronic device displays the first interface, where the interface data of the first interface includes a screenshot of the first interface or an instruction for drawing the first interface, and when the first interface is a video image, the interface data of the first interface further includes a playback address of the video image; the application handoff function is that the first electronic device sends information about a second application running on the first electronic device to the second electronic device, so that the second electronic device continues to run the second application; and the content sharing function is that the first electronic device sends a first object to the second electronic device, wherein the first object includes any one or more of a picture, a video, a file, a text, and audio.

In a possible implementation, the third operation includes: dragging the second control on the first interface, and releasing the second control when the distance between the second control and the first control is less than a first threshold, where the first threshold is less than the first distance.

In a possible implementation, after the second control is adsorbed together with the first control, the method further includes: The first electronic device receives a fourth operation on the second control; and in response to the fourth operation, the first electronic device controls a distance between the second control and the third control to change to the first distance, and stops performing the first interaction function with the second electronic device.

In a possible implementation, the fourth operation includes: dragging the second control, and releasing the second control when a distance between the second control and the first control is greater than a second threshold; and touching and holding the second control, dragging the second control away from the first control, and releasing the second control when the distance between the second control and the third control is greater than the second threshold, where the second threshold is less than or equal to the first distance.

According to a fifth aspect, an electronic device is provided, including: a processor, a memory, and a touchscreen, where the memory and the touchscreen are coupled to the processor, the memory is configured to store computer program code, the computer program code includes computer instructions, and when the processor reads the computer instructions from the memory, the electronic device performs the method according to any one of the foregoing aspects and the possible implementations of the foregoing aspects.

According to a sixth aspect, an apparatus is provided. The apparatus is included in a first electronic device, and the apparatus has a function of implementing behavior of the electronic device in any method in the foregoing aspects and the possible implementations. The function may be implemented by hardware, or may be implemented by hardware executing corresponding software. The hardware or the software includes at least one module or unit corresponding to the foregoing functions, for example, a receiving module or unit, a display module or unit, and a processing module or unit.

According to a seventh aspect, a computer-readable storage medium is provided, including computer instructions, where when the computer instructions are run on a terminal, the terminal performs the method according to any one of the foregoing aspects and the possible implementations of the foregoing aspect.

According to an eighth aspect, a computer program product is provided. When the computer program product runs on a computer, the computer performs the method according to any one of the foregoing aspects and the possible implementations of the foregoing aspects.

According to a ninth aspect, a chip system is provided, including a processor. When the processor executes instructions, the processor performs the method according to any one of the foregoing aspects and the possible implementations of the foregoing aspects.

It may be understood that, for beneficial effects that can be achieved by the electronic device, the apparatus, the computer-readable storage medium, the computer program product, and the chip system provided in the fifth aspect to the ninth aspect, refer to beneficial effects in any one of the first aspect to the fourth aspect and the possible implementations of the first aspect to the fourth aspect. Details are not described herein again.

DETAILED DESCRIPTION OF ILLUSTRATIVE EMBODIMENTS

In the descriptions of embodiments of this application, unless otherwise specified, "/" means "or". For example, A/B may represent A or B. In this specification, "and/or" describes only an association relationship between associated objects and represents that three relationships may exist. For example, A and/or B may represent the following three cases: Only A exists, both A and B exist, and only B exists.

In addition, the word like "as an example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word like "example" or "for example" is intended to present a relative concept in a specific manner.

Figure 1:
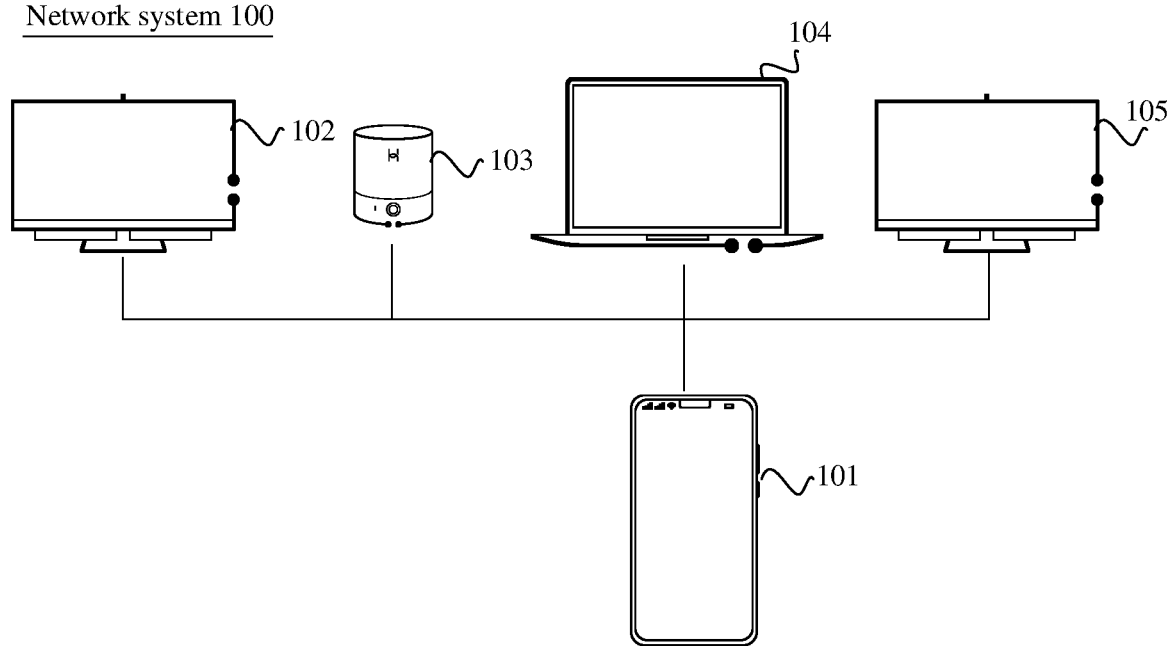
FIG. 1 is a schematic diagram of a system structure of an application scenario according to an embodiment of this application.

A method for interaction between electronic devices provided in an embodiment of this application is applicable to a network system 100 shown in FIG. 1. FIG. 1 is a schematic diagram of an architecture of a network system 100. The network system 100 includes at least two electronic devices, and the at least two electronic devices are associated electronic devices. For example, the at least two electronic devices may be electronic devices located in a same wireless fidelity (wireless fidelity, Wi-Fi) network, or may be electronic devices that log in to a same account (for example, a Huawei account), or electronic devices that log in to an account belonging to a same group (for example, belonging to a same home account). Alternatively, the at least two electronic devices may be electronic devices that establish a trust relationship in another manner, for example, electronic devices that have connected to a hotspot shared by each other, or have established a Wi-Fi direct connection. The electronic device in this application may be specifically a mobile phone, a tablet computer, a personal computer (personal computer, PC), a personal digital assistant (personal digital assistant, PDA), a smartwatch, a netbook, a wearable electronic device, an augmented reality (augmented reality, AR) device, a virtual reality (virtual reality, VR) device, a vehicle-mounted device, a smart television (also referred to as a smart screen, a large screen, or the like), a smart acoustic device, or the like. A specific form of the electronic device is not specifically limited in this application.

For example, the method for interaction between electronic devices provided in an embodiment of this application is described herein by using an example in which the network system 100 includes a mobile phone 101, a smart television 102, a smart sound box 103, a PC 104, and a smart television 105 that have an association relationship.

When performing interaction between electronic devices, a user needs to select, on an electronic device (for example, the mobile phone 101), an electronic device to interact with. In a technical solution, the mobile phone 101 enables a wireless communication function, searches for another surrounding electronic device, and displays a list of found electronic devices. Then, the user needs to select, from the list, an electronic device (for example, the smart television 102, the smart sound box 103, the PC 104, and the smart television 105) that needs to be interacted with. It should be noted that, in the list displayed on the mobile phone 101, a type and/or a model of each found electronic device is usually used as a name of the electronic device, for example, HUAWEI Vision, HUAWEI SoundX, or HUAWEI MateBook. If there are two or more electronic devices with a same name in the found electronic devices, the user cannot distinguish between the two or more electronic devices with a same name, and cannot determine which electronic device should be selected. For example, after the mobile phone 101 finds the smart television 102 and the smart television 105, two identifiers whose names are HUAWEI Vision are displayed in the list. However, the user cannot distinguish which smart television corresponds to each HUAWEI Vision identifier, and cannot determine which smart television is to be selected.

In view of this, an embodiment of this application provides a technical solution. When searching for another surrounding electronic device by using the wireless communication function, the mobile phone 101 measures a relative location between the found another electronic device and the mobile phone 101 in real space. The relative location between the another electronic device and the mobile phone 101 includes a relative distance and/or a relative direction between the another electronic device and the mobile phone 101. Then, the mobile phone 101 displays an interface of a device layout based on the relative location between the another electronic device and the mobile phone 101 in real space, and the interface is denoted as an interface A. For example, the interface A includes identifiers of the another electronic device found by the mobile phone 101 and the mobile phone 101. In addition, a relative location relationship between the identifier of the mobile phone 101 and the identifier of the another electronic device also represents a location relationship between the mobile phone 101 and the another electronic device in real space. In other words, the interface A more vividly displays the relative location between the mobile phone 101 and another electronic device in real space.

It is easy to understand that relative locations of electronic devices in real space help the user distinguish between the electronic devices. In other words, if the mobile phone 101 finds two or more electronic devices with a same name, the user may distinguish electronic devices with the same name based on different relative locations between the mobile phone 101 and the electronic devices, so that the user selects one of the electronic devices to interact with the mobile phone 101. For example, when the mobile phone 101 finds two smart televisions whose names are HUAWEI Vision, the interface A displayed on the mobile phone 101 further displays locations of two HUAWEI Vision identifiers relative to the identifier of the mobile phone 101. In this case, the user may determine, based on a location of each smart television relative to the mobile phone 101 in real space, a smart television corresponding to each HUAWEI Vision identifier.

In a specific embodiment, the user may enter the interface A by using a control center of the mobile phone 101. For example, FIG. 2(1) is a schematic diagram of a home screen (or referred to as a home screen interface or a desktop) displayed by the mobile phone 101. In response to detecting that the user performs an operation 1 on the home screen of the mobile phone 101, the mobile phone 101 displays an interface of a control center shown in FIG. 2(2). The operation 1 is an operation of entering the control center of the mobile phone 101, for example, may be an operation of sliding upward from a bottom of a screen (that is, a bottom of the home screen) by the user, or an operation of sliding downward from a top of the screen (that is, the top of the home screen). The operation 1 may further include a series of operations. For example, the operation 1 includes an operation that the user taps a "Settings" application icon on the home screen, and selects a control corresponding to the control center on an interface of the "Settings" application.

Figure 2:
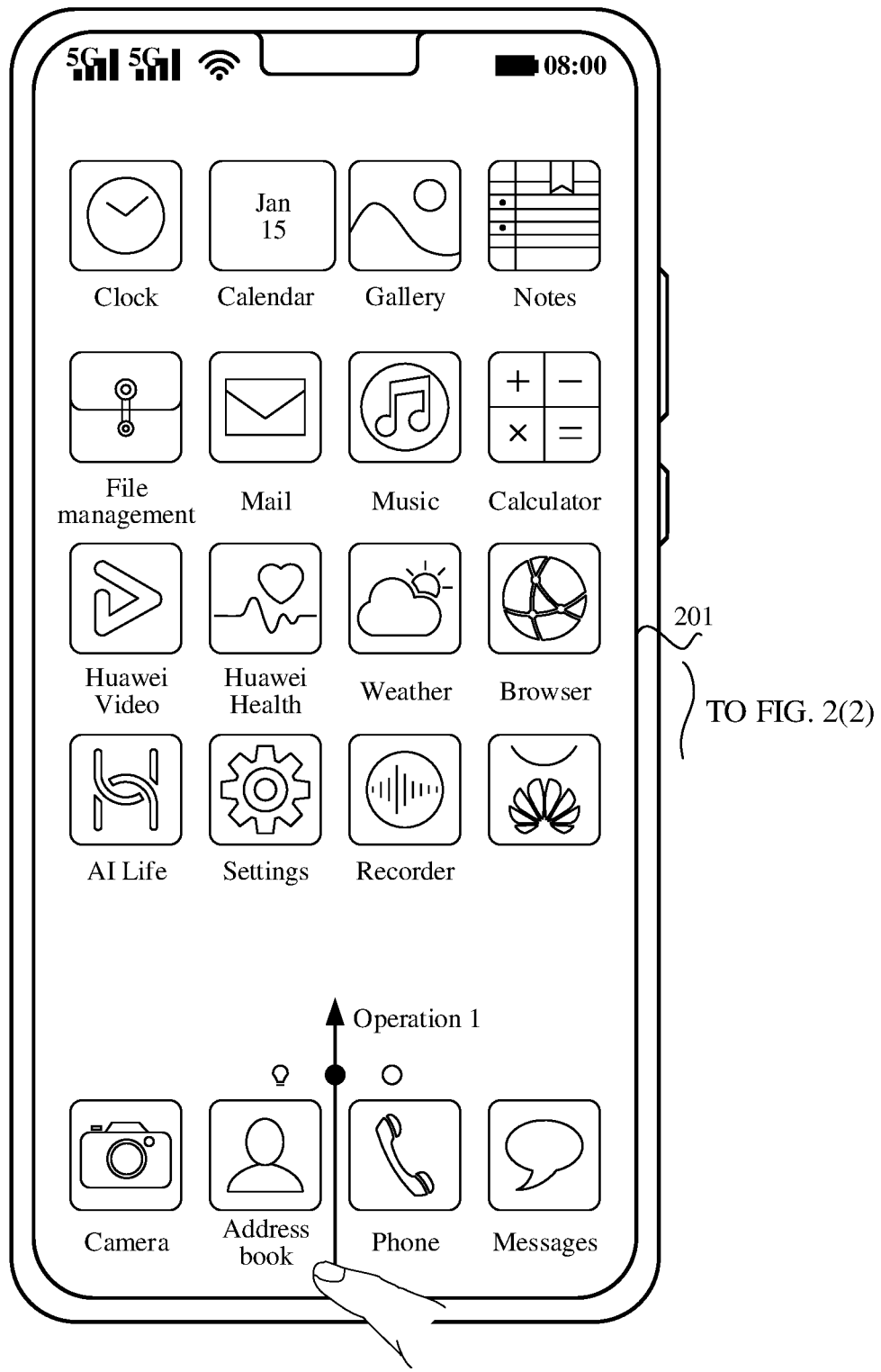
FIG. 2(1) and FIG. 2(2) are a schematic diagram of some user interfaces of an electronic device according to an embodiment of this application.
Figure 2:
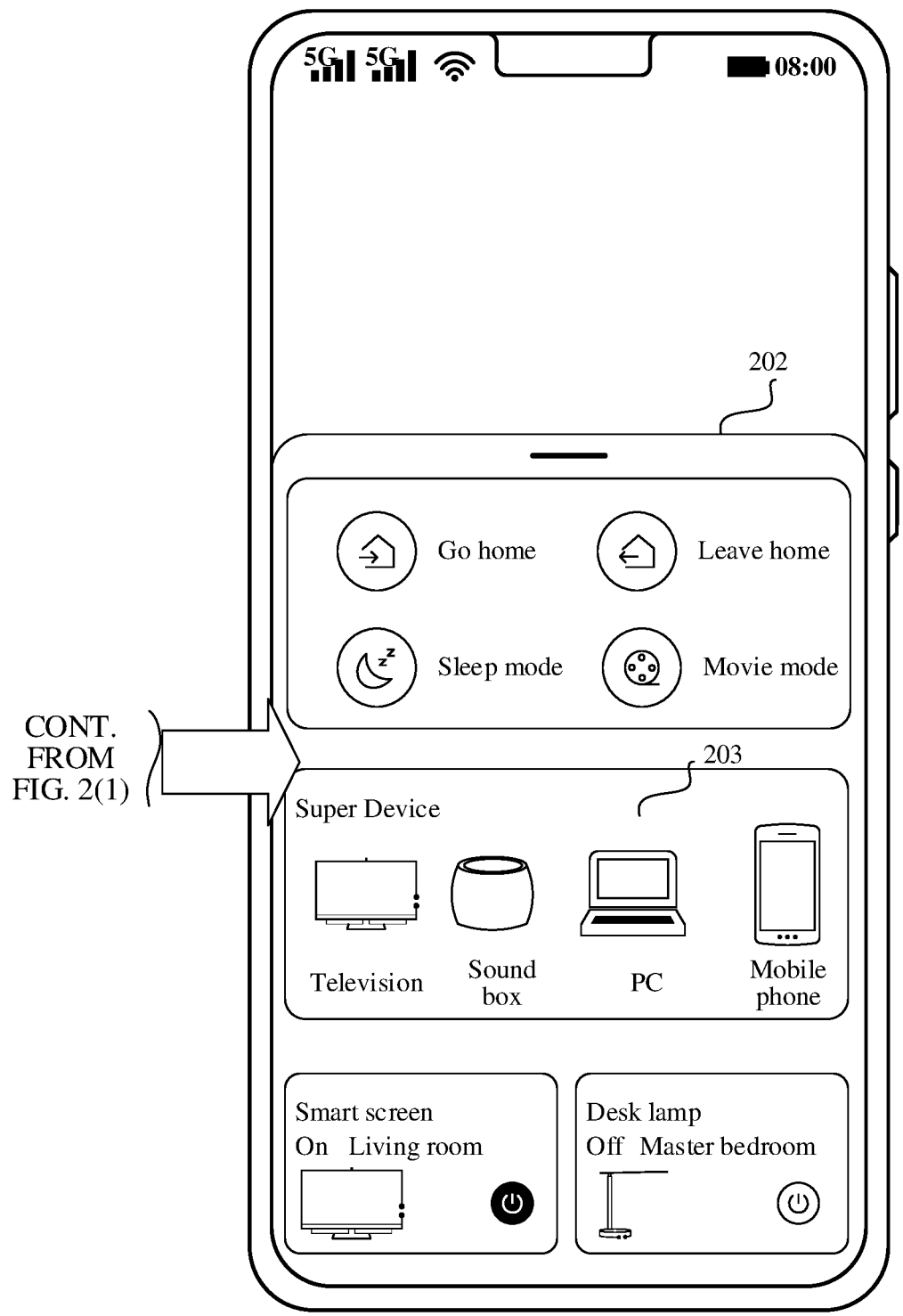

As shown in FIG. 2(2), the interface of the control center of the mobile phone 101 includes a control 203 used to enter the interface A (or referred to as a widget 203 or a module 203). Further, in response to detecting that the user operates the control 203, the mobile phone 101 starts to broadcast a query message through a wireless communication function, to search for a surrounding electronic device associated with the mobile phone 101, that is, an associated device of the mobile phone 101. The associated device of the mobile phone 101 may be an electronic device located in a same communication network as the mobile phone 101, for example, an electronic device located in a same wireless fidelity (wireless fidelity, Wi-Fi) network. Alternatively, the associated device of the mobile phone 101 may be an electronic device that logs in to a same account (for example, a Huawei account) as the mobile phone 101, or an electronic device that logs in to an account belonging to a same group as the mobile phone 101 (for example, belonging to a same family account). The associated device of the mobile phone 101 may alternatively be an electronic device that establishes a trust relationship with the mobile phone 101 in another manner, for example, an electronic device that has connected to a hotspot shared by the mobile phone 101. Alternatively, the mobile phone 101 has connected to a hotspot shared by the electronic device, or the mobile phone 101 and the electronic device have established a Wi-Fi Direct connection. In other words, a specific manner of associating the another electronic device with the mobile phone 101 is not limited in embodiments of this application. It should be noted that, in the accompanying drawings of this application, a "super device" is used to collectively refer to the mobile phone 101 and an associated device that has the foregoing association relationship with the mobile phone 101. In other words, the television, the sound box, the PC, and the like that are displayed in the control 203 are associated devices of the mobile phone 101. In other words, the "super device" is used to represent a set of electronic devices having the foregoing association relationship. It may be understood that the "super device" may alternatively be expressed as another term, and does not constitute a specific limitation on the electronic device in embodiments of this application.

The wireless communication function includes but is not limited to a wireless communication function implemented by using technologies such as a wireless local area network (wireless local area network, WLAN) (for example, Wi-Fi), radio frequency identification (Radio Frequency Identification, RFID), infrared, Bluetooth, ZigBee, and ultra-wideband (Ultra Wide Band, UWB).

It may be understood that most wireless communication functions have a specific positioning capability, for example, a Wi-Fi-based positioning capability, a Bluetooth iBeacon-based positioning capability, a Bluetooth 5.1-based angle of arrival (Angle of Arrival, AOA) positioning capability, and a UWB-based positioning capability. A distance between the mobile phone 101 and another electronic device may be measured based on the Wi-Fi-based positioning capability and the Bluetooth iBeacon-based positioning capability. The distance between the mobile phone 101 and the another electronic device and a direction of the another electronic device relative to the mobile phone 101 can be measured based on the Bluetooth 5.1-based AOA positioning capability and the UWB-based positioning capability.

After finding an associated device (for example, the smart television 102, the smart sound box 103, the PC 104, and the smart television 105) of the mobile phone 101, the mobile phone 101 further measures a relative location of the associated device with the mobile phone 101 in real space by using the positioning capability of the wireless communication function. After obtaining the relative location between the associated device and the mobile phone 101 in the real space, the mobile phone 101 may display an interface 301 shown in FIG. 3, that is, the interface A. The interface 301 includes a device icon (and a device name) used to represent each electronic device, for example, specifically includes a device icon corresponding to the mobile phone 101 and a device icon of another electronic device associated with the mobile phone 101. In addition, a layout of each device icon is consistent with a layout of an electronic device corresponding to each device icon in real space. In other words, a relative location between device icons in the interface 301 is consistent with a relative location relationship of electronic devices corresponding to the device icons in horizontal space.

Figure 3:
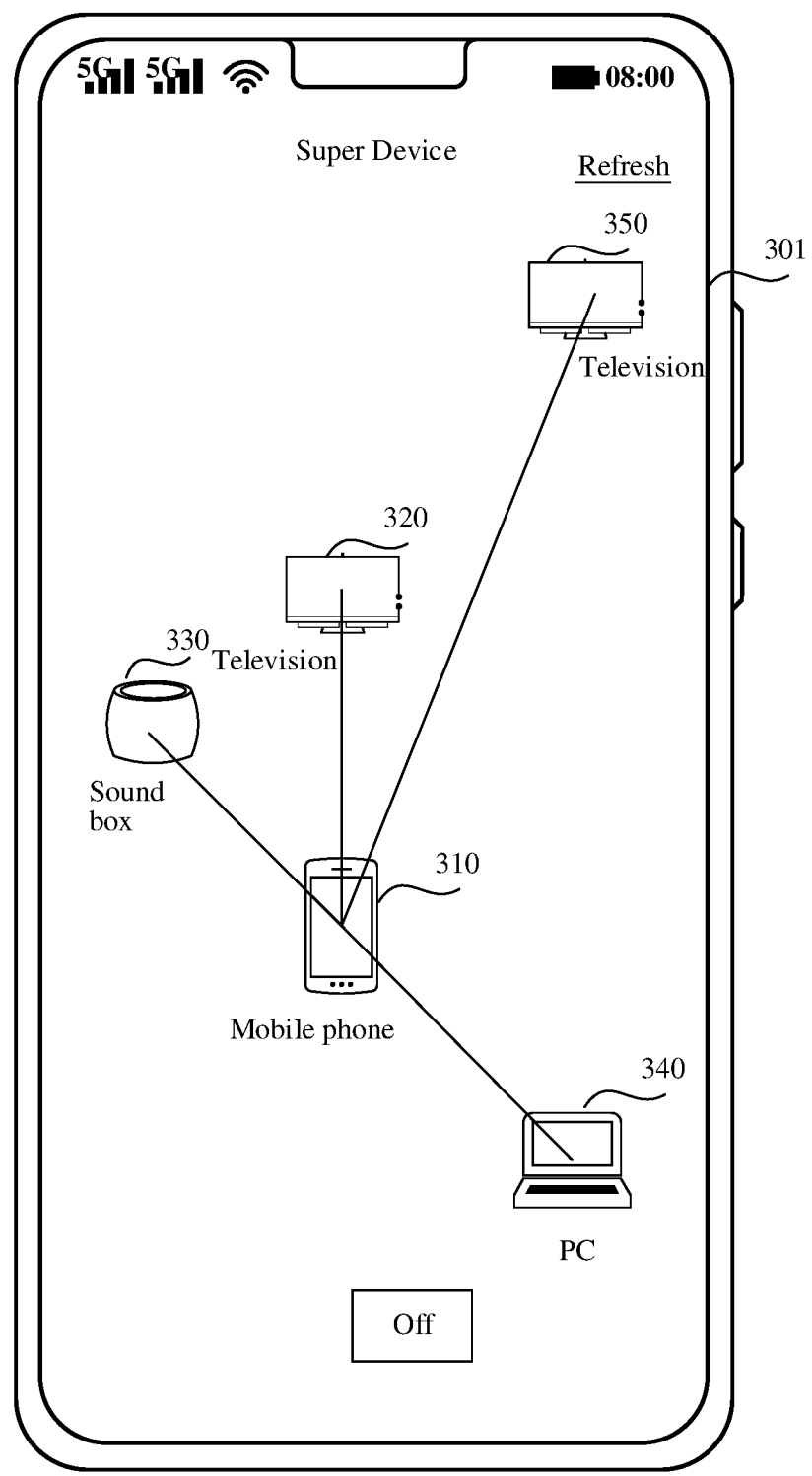
FIG. 3 is a schematic diagram of another user interface of an electronic device according to an embodiment of this application.

Refer to FIG. 3. In the interface 301, when a device type of a device associated with the mobile phone 101 is unique, an electronic device corresponding to the device icon may be distinguished based on the device type indicated by the device icon. For example, a device icon 310 corresponds to the mobile phone 101, a device icon 330 corresponds to a smart speaker 103, and a device icon 340 corresponds to a PC 104. When the device type of the device associated with the mobile phone 101 is not unique, an electronic device corresponding to a device icon further needs to be determined based on relative locations between device icons. For example, in the interface 301, it may be determined that a device icon 320 and a device icon 350 correspond to two smart televisions, but a specific correspondence between the two device icons and the two smart televisions cannot be determined. Further, the interface 301 further shows a distance between the device icon 320 and the device icon 310 of the mobile phone 101, which is less than a distance between the device icon 350 and the device icon 310 of the mobile phone 101. This means that, in the horizontal space, a distance between the smart television corresponding to the device icon 320 and the mobile phone 101 is less than a distance between the smart television corresponding to the device icon 350 and the mobile phone 101. If the distance between the smart television 102 and the mobile phone 101 is less than the distance between the smart television 105 and the mobile phone 101 in the horizontal space, the device icon 320 corresponds to the smart television 102, and the device icon 350 corresponds to the smart television 105.

It may be learned from the foregoing that, the interface A displayed on the mobile phone 101 not only indicates a device that is associated with the mobile phone 101 and that is found by the mobile phone 101, but also indicates a relative location relationship between electronic devices, so that the user can more visually understand a location of each electronic device, so as to distinguish the electronic devices, and the user can more comfortably and accurately select an electronic device that needs to be operated.

Certainly, in addition to entering the interface A from the interface of the control center of the mobile phone 101, the interface A may also be entered from another interface of the mobile phone 101. For example, the foregoing interface A is entered from a leftmost screen, a pull-down notification bar, or the like of the mobile phone 101. Alternatively, the interface A may be entered from a corresponding interface of an application (for example, a smart home application) in the mobile phone 101. In other words, a specific manner of entering the interface A is not limited in embodiments of this application.

Further, the interface A may be used as an entry for interaction between electronic devices. In other words, the user may directly perform an operation on the interface A, to trigger interaction between any two or more electronic devices on the interface A.

Figure 4:
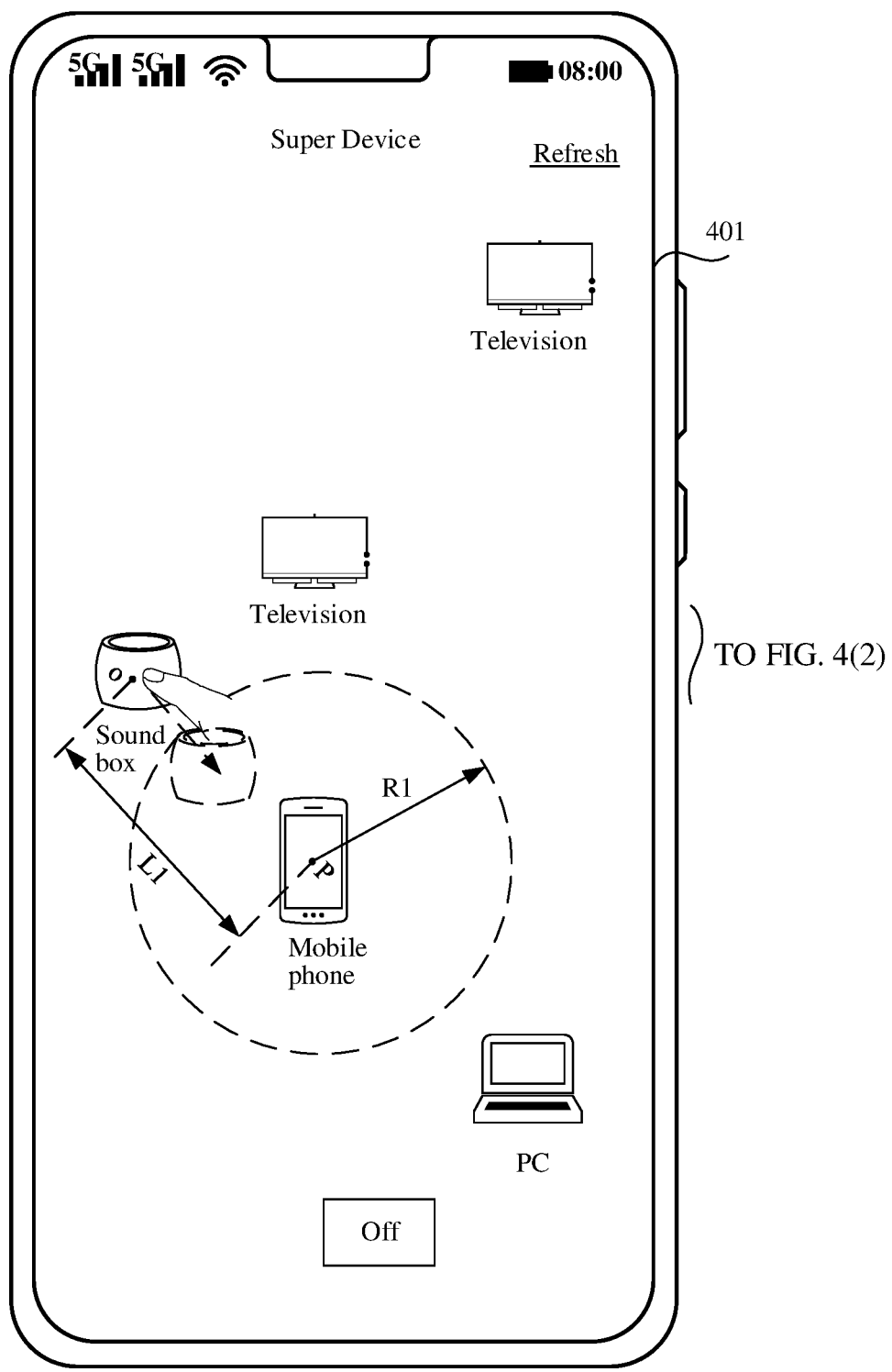
FIG. 4(1) to FIG. 4(3) are a schematic diagram of still some user interfaces of an electronic device according to an embodiment of this application.
Figure 4:
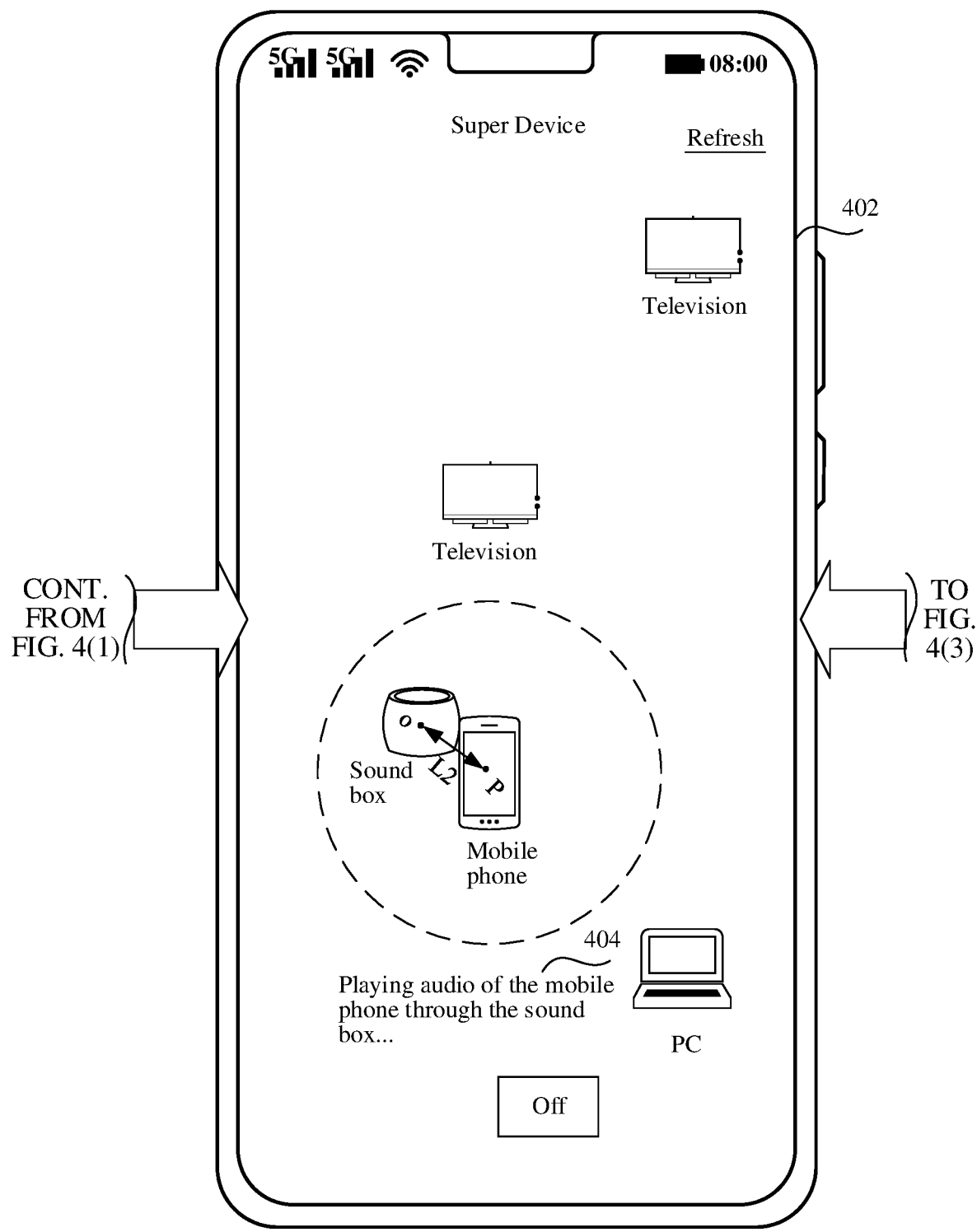
Figure 4:
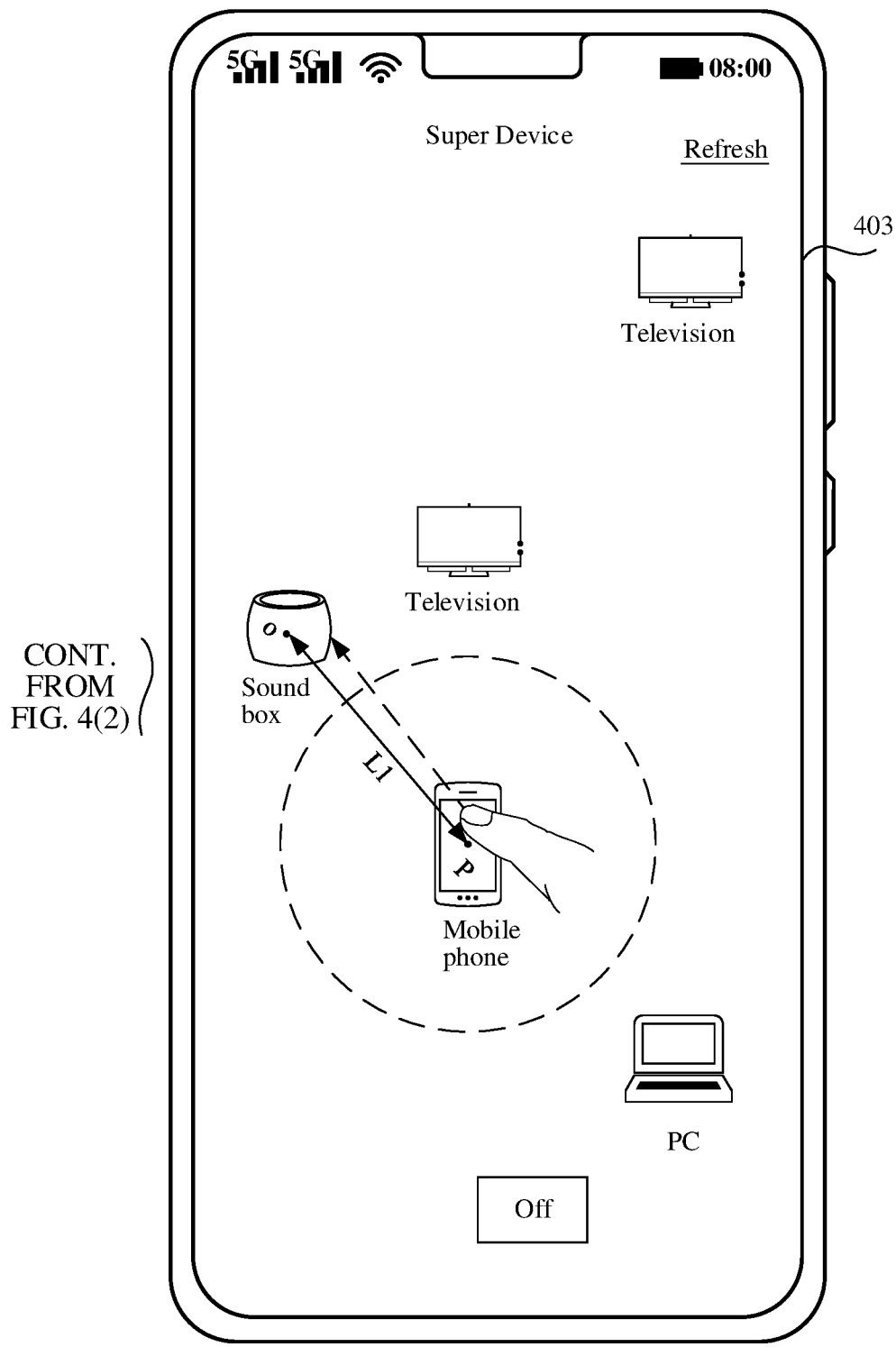

For example, as shown in FIG. 4(1), the mobile phone 101 displays an interface 401. Device icons corresponding to the mobile phone 101, the smart television 102, the smart sound box 103, the PC 104, and the smart television 105 are displayed in the interface 401. Optionally, a layout of a device icon corresponding to each electronic device may be consistent with a layout of each electronic device in horizontal space. When the user wants to trigger interaction between the mobile phone 101 and the smart sound box 103, the user may touch and hold a device icon of a sound box (which corresponds to the smart sound box 103), and drag the device icon of a sound box to a device icon of a mobile phone (which corresponds to the mobile phone 101). In some embodiments, a location of the device icon of the sound box may change with a movement of a finger of the user on a screen. In some examples of this embodiment, before the user drags the device icon of the sound box, the distance between the sound box device icon and the device icon of the mobile phone is a distance L1; when the user drags the device icon of the sound box to move, and when a distance between the two device icons is less than a threshold R1, a finger of the user releases the device icon of the sound box (that is, the finger leaves the screen of the mobile phone 101), and then the distance between the device icon of the sound box and the device icon of the mobile phone is a distance L2. The distance L2 is less than the distance L1, the distance L2 is less than or equal to the threshold R1, and the threshold R1 is less than the distance L1. Optionally, after the user drags the device icon of the sound box to approach the device icon of the mobile phone and then releases the device icon, the device icon of the sound box and the device icon of the mobile phone may be automatically attached together, that is, the mobile phone 101 displays an interface 402 shown in FIG. 4(2). That the two device icons are attached together means that the two device icons may completely or partially overlap, or the two device icons may contact each other. In some other examples of this embodiment, when the user drags the device icon of the sound box to move, when the distance between the two device icons is less than the threshold R1, the finger of the user does not release the device icon of the sound box (that is, the finger does not leave the screen of the mobile phone 101), but stays at a location for preset duration, the distance between the device icon of the sound box and the device icon of the mobile phone may change to the distance L2, for example, the device icon of the sound box and the device icon of the mobile phone may be attached together, in other words, the mobile phone 101 displays the interface 402 shown in FIG. 4(2).

Figure 14:
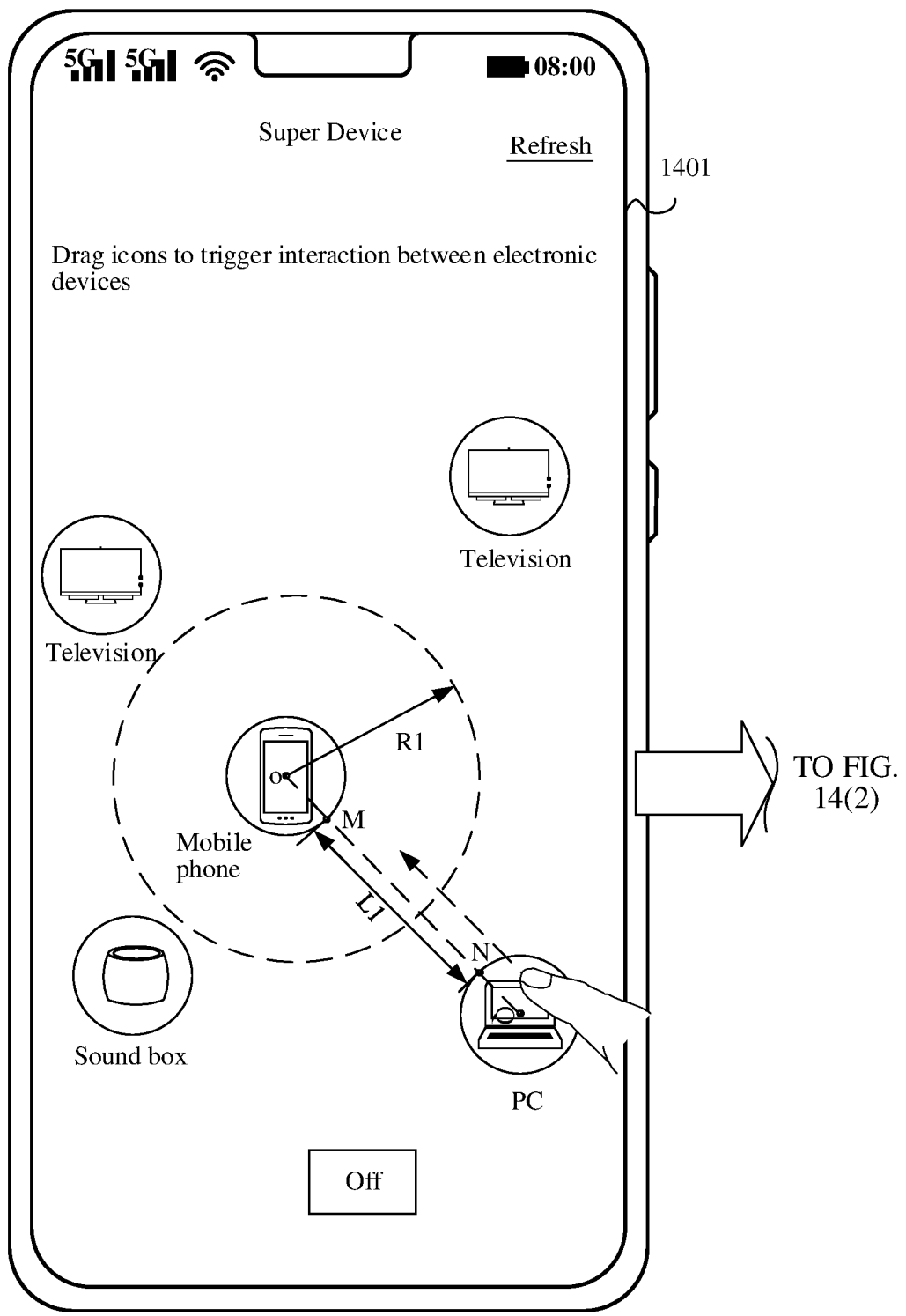
FIG. 14(1) to FIG. 14(3) are a schematic diagram of still some user interfaces of an electronic device according to an embodiment of this application.
Figure 14:
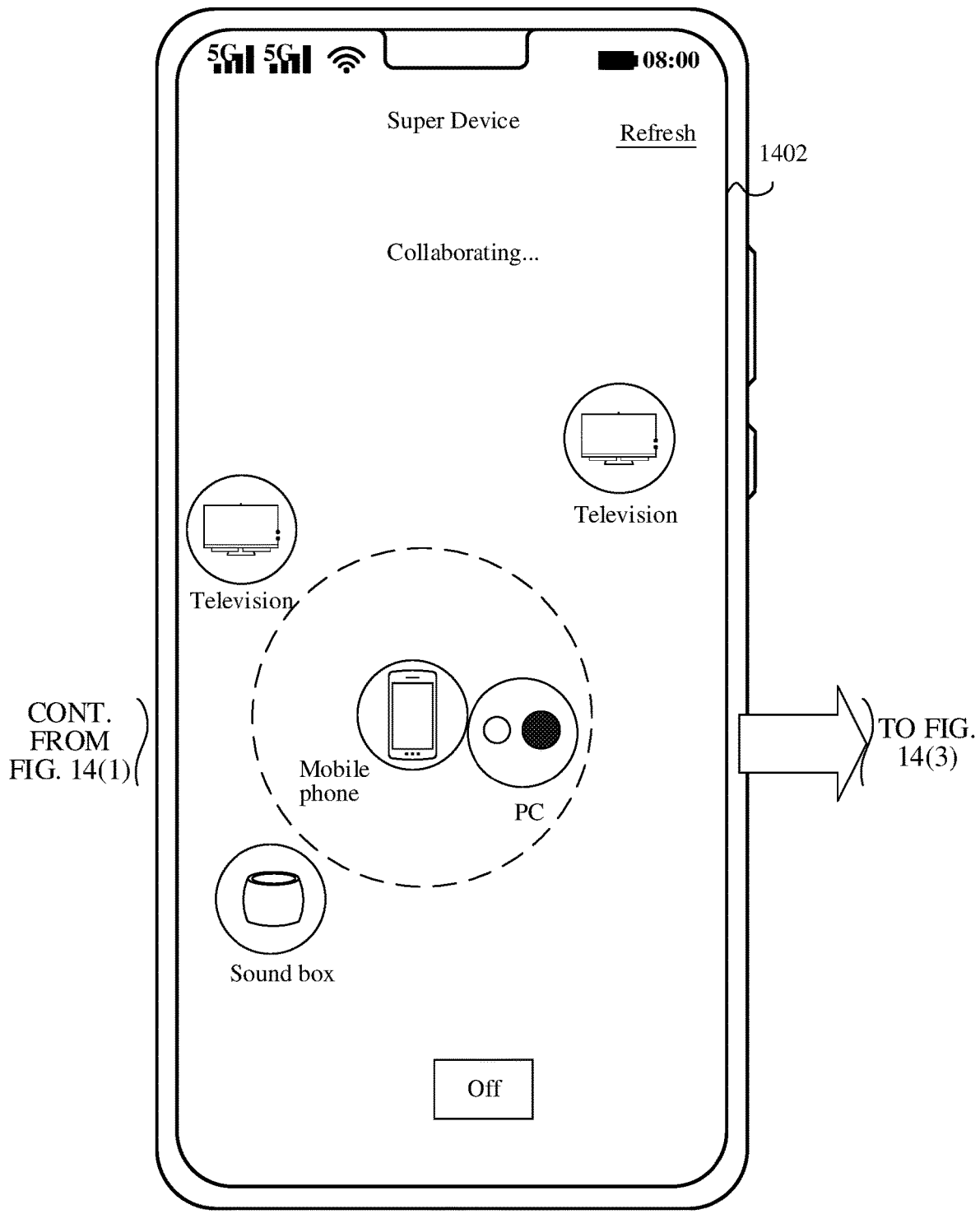
Figure 14:
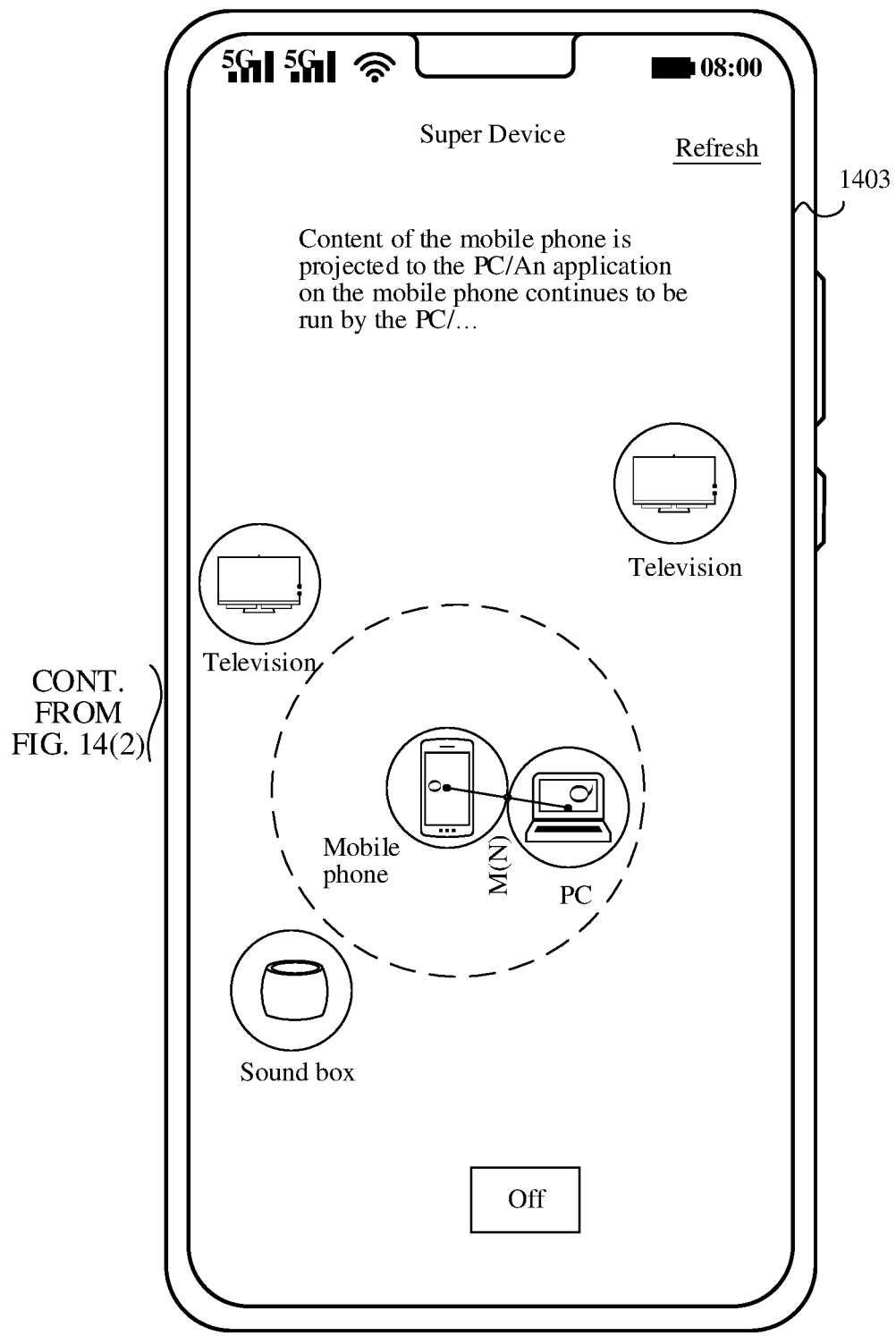

It should be noted that, in some examples, the distance between the two device icons in this application may be a distance between centers of the two device icons. For example, a center of the device icon of the sound box is a point O, a center of the device icon of the mobile phone is a point P, and the distance between the device icon of the sound box and the device icon of the mobile phone is a distance between the point O and the point P. For example, the distance between the point O and the point P shown in FIG. 4(1) is the distance L1. For another example, the distance between the point O and the point P shown in FIG. 4(2) is the distance L2. For another example, the distance between the point O and the point Q shown in FIG. 14(1) is the distance L1, and the distance between the point O and the point Q shown in FIG. 14(3) is the distance L2. In some other examples, the distance between the two device icons in this application may alternatively be a shortest distance between edges of the two device icons. For example, outer contours of the device icon of the mobile phone and a device icon of the PC are circles. A center of the device icon of the mobile phone is a point O, and a center of the device icon of the PC is a point Q. A line segment OQ intersects with an edge of the device icon of the mobile phone at a point M, and intersects with an edge of the device icon of the PC at a point N. A distance between the point M and the point N is a distance between the device icon of the mobile phone and the device icon of the PC. For example, the distance between the point M and the point N shown in FIG. 14(1) is the distance L1. For another example, as shown in FIG. 14(3), a distance between the point M and the point N is the distance L2. Optionally, L2 may be zero or close to zero, that is, the device icon of the mobile phone and the device icon of the PC are adsorbed together.

It should be further noted that, in this embodiment, a movement track that is of the finger and that is obtained when the user drags the device icon of the sound box is not limited, that is, the movement track of the device icon that is of the sound box and that is dragged by the user may be any curve. When the finger of the user releases the device icon of the sound box, or the finger of the user stays at a location for preset duration, the mobile phone 101 calculates a distance between a location at which the finger of the user releases the device icon of the sound box or the location at which the finger of the user stays and the device icon of the mobile phone. When the distance is less than the threshold R1, the distance between the device icon of the sound box and the device icon of the mobile phone is controlled to change to the distance L2, for example, the device icon of the sound box and the device icon of the mobile phone are adsorbed together.

In some other embodiments, when the user touches and holds the device icon of the sound box and drags the device icon, the device icon of the sound box may not change with the movement of the finger of the user. To be specific, after the user touches and holds the device icon of the sound box, when the user leaves the screen after sliding on the screen for a distance or stays at a location on the screen for preset duration, the mobile phone 101 determines a distance between a location at which the finger of the user leaves the screen or the location at which the finger of the user stays and the device icon of the mobile phone. When the distance is less than the threshold R1, the distance between the device icon of the sound box and the device icon of the mobile phone is controlled to change to the distance L2, for example, the device icon of the sound box and the device icon of the mobile phone are adsorbed together. It should be noted that, in a process in which the finger of the user moves on the screen, a location of the device icon of the sound box does not change with a movement of the finger.

It should be noted that, in the following embodiments, a manner of dragging a device icon to approach another device icon may be any one of the foregoing three manners, which is uniformly described herein and is not described in the following.

It should be further noted that the interface 401 and the interface 402 herein may be considered as two different interfaces, and the interface 402 and the interface 401 may alternatively be considered as a same interface, that is, the interface 402 is an interface obtained after locations of some device icons on the interface 401 are changed.

When the device icon of the sound box and the device icon of the mobile phone are adsorbed together, the mobile phone 101 may further determine, based on a current scenario of the mobile phone 101 and a device feature of the smart sound box 103, an interaction function to be performed between the mobile phone 101 and the smart sound box 103. For example, audio that is being played on the mobile phone 101 may be switched to the smart sound box 103 for playing. Optionally, in the interface 402 displayed by the mobile phone 101, corresponding prompt information 404 may also be displayed, to prompt the user of the interaction function performed between the mobile phone 101 and the smart sound box 103.

Certainly, in some other examples, in the interface 403 shown in FIG. 4(3), the user may also touch and hold the device icon of the mobile phone and drag the device icon toward the device icon of the sound box. When the distance between the two device icons is dragged to be less than the threshold R1, the device icon of the sound box and the device icon of the mobile phone are adsorbed together, that is, the mobile phone 101 displays the interface 402 shown in FIG. 4(2). Likewise, the mobile phone 101 may determine, based on a current scenario of the mobile phone 101 and the device feature of the smart sound box 103, the interaction function to be performed between the mobile phone 101 and the smart sound box 103. For example, audio that is being played on the mobile phone 101 may be switched to the smart sound box 103 for playing. Alternatively, the mobile phone 101 sends an operation of the user to the smart sound box 103, and the smart sound box 103 determines, based on a current scenario of the smart sound box 103 and a device feature of the mobile phone 101, the interaction function performed between the smart sound box 103 and the mobile phone 101. For example, audio that is being played on the smart sound box 103 may be switched to the mobile phone 101 for playing.

It should be further noted that, the interface 403 and the interface 402 herein may be considered as two different interfaces, and the interface 403 and the interface 402 may alternatively be considered as a same interface, that is, the interface 402 is an interface after locations of some device icons on the interface 403 are changed. Similarly, in the following embodiments, if an interface changes because the user drags a device icon, interfaces before and after an interface change may be considered as two different interfaces, or may be considered as a same interface, which is not described one by one below.

Figure 5:
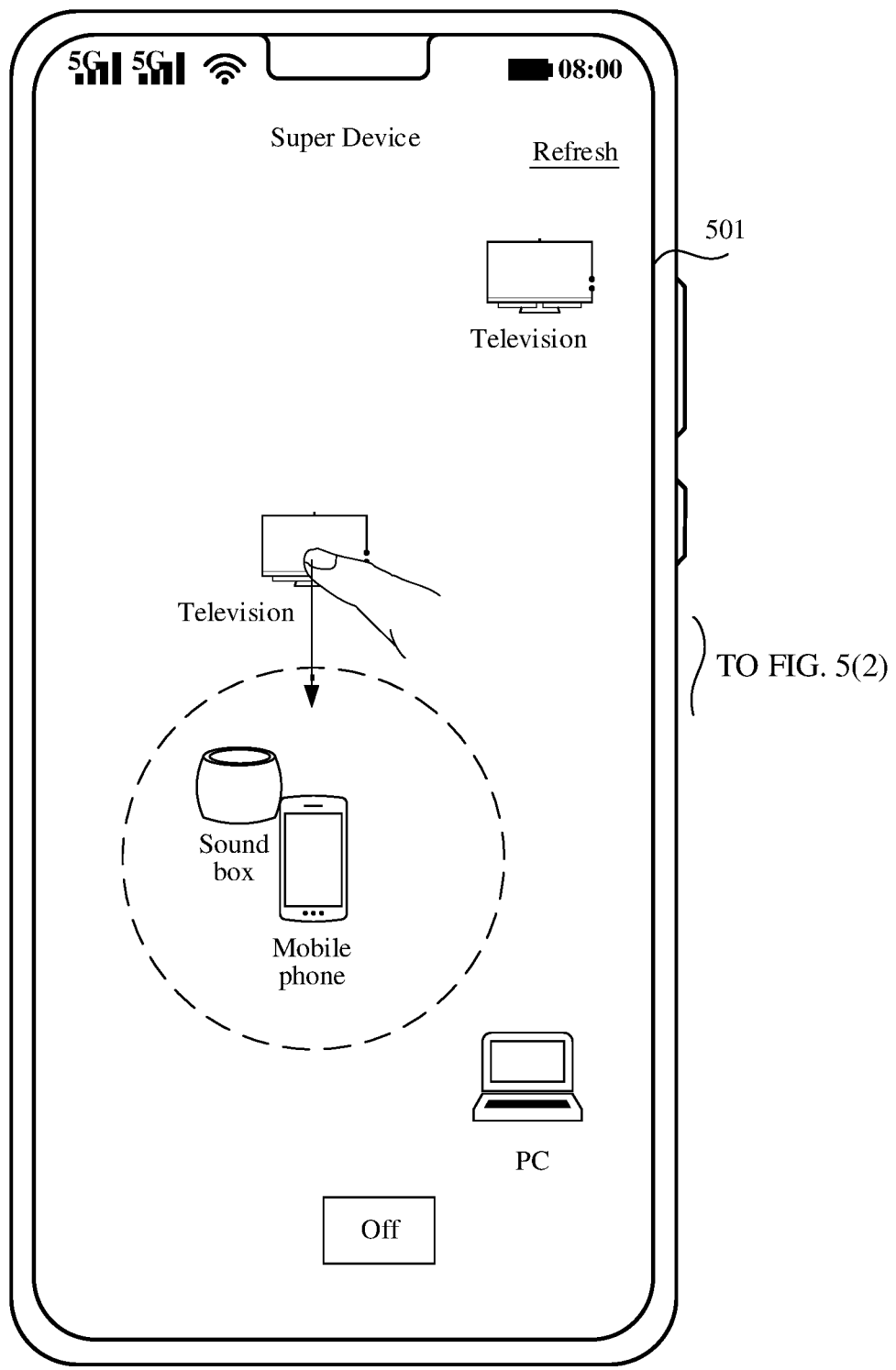
FIG. 5(1) and FIG. 5(2) are a schematic diagram of still some user interfaces of an electronic device according to an embodiment of this application.
Figure 5:
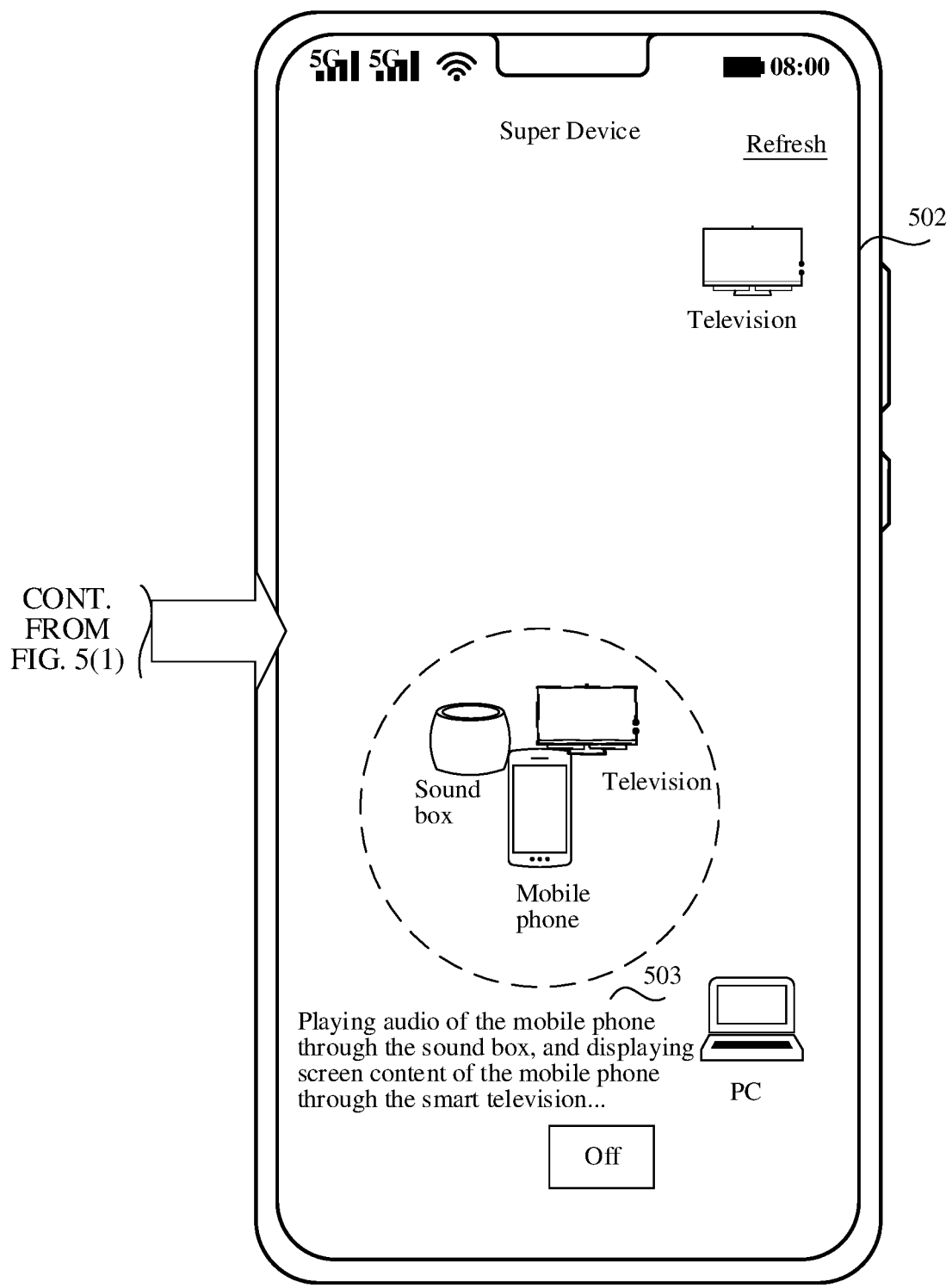

After the user triggers, in the foregoing manner, the mobile phone 101 and the smart sound box 103 to perform the interaction function, the user may further trigger more electronic devices to perform the interaction function with the mobile phone 101. For another example, in an interface 501 shown in FIG. 5(1), a device icon of a mobile phone and a device icon of a sound box are adsorbed together, representing that a mobile phone 101 is indicated to perform an interaction function with a smart sound box 103. Then, another electronic device may still be added to the interaction between the mobile phone 101 and the smart sound box 103 in the foregoing dragging manner. For example, a device icon of a television (corresponding to a smart television 102) is pressed and held and dragged to a device icon of a mobile phone. When a distance between two device icons is less than a threshold R1, the device icon of the television and the device icon of the mobile phone are adsorbed together, that is, the mobile phone 101 displays an interface 502 shown in FIG. 5(2). In this case, the mobile phone 101 may determine, based on a current scenario of the mobile phone 101 and the smart sound box 103 and a device feature of the smart television 102, an interaction function to be performed between the mobile phone 101, the smart sound box 103, and the smart television 102. For example, content on a screen of the mobile phone 101 may be projected to the smart television 102 for display, and the smart sound box 103 continues to play audio. Optionally, in the interface 502 displayed by the mobile phone 101, corresponding prompt information 503 may also be displayed, to prompt a user of the interaction function performed between the mobile phone 101, the smart sound box 103, and the smart television 102.

In the foregoing example, it is first detected that the user drags the device icon of the sound box. The mobile phone 101 first determines, based on a current scenario of the mobile phone 101 and a device type of the smart sound box 103, an interaction function performed between the smart sound box 102 and the mobile phone 101. Then, it is detected that the user drags the device icon of the television, and the mobile phone 101 determines, based on the current scenario of the mobile phone 101 and the smart sound box 103 and the device feature of the smart television 102, the interaction function performed between the three electronic devices. In some other examples, if it is detected that the user drags the device icon of the sound box and the device icon of the television at the same time, the mobile phone 101 may directly determine, based on a current scenario of the mobile phone 101, and device features of the smart sound box 103 and the smart television 102, the interaction function that the three electronic devices should perform. Alternatively, although it is first detected that the user drags the device icon of the sound box, and then it is detected that the user drags the device icon of the television, a time difference between two drags is less than a time threshold T (for example, one second), the mobile phone 101 may still directly determine, based on a current scenario of the mobile phone 101, and device features of the smart sound box 103 and the smart television 102, the interaction functions that the three electronic devices should perform.

Further, the user may further cancel (or disable) the interaction function between electronic devices. For example, in an interface 601 shown in FIG. 6(1), a device icon of a sound box, a device icon of a mobile phone, and a device icon of a television are adsorbed together, indicating that a mobile phone 101, a smart sound box 103, and a smart television 102 are performing an interaction function. In this case, if the user wants to cancel (or disable) the interaction function between the smart television 102 and the mobile phone 101 (and the smart sound box 103), the user may touch and hold the device icon of the television, and drag the device icon of the television away from the device icon of the mobile phone. In some embodiments, a location of the device icon of the television changes with a movement of a finger of the user on a screen. In some examples of this embodiment, the user may drag the device icon of the television to move. When a distance between two device icons is greater than a threshold R2 (which may be the same as or different from a threshold R1), the finger of the user releases the device icon of the television (that is, the finger leaves the screen of the mobile phone 101), and the distance between the two device icons changes to a distance L1. For example, the device icon of the television returns to a location before adsorption, as shown in an interface 602 in FIG. 6(2). In this case, the smart television 102 exits the interaction function with the mobile phone 101 (and the smart sound box 103). In some other examples of this embodiment, when the user drags the device icon of the television (that is, the finger leaves the screen of the mobile phone 101) to move, when the distance between the two device icons is greater than the threshold R2, the finger of the user does not release the device icon of the television (that is, the finger does not leave the screen of the mobile phone 101), but stays at a location for preset duration, the distance between the two device icons changes to a distance L1. For example, the device icon of the television returns to a location before adsorption, as shown in an interface 602 in FIG. 6(2). The threshold R2 is greater than a distance L2, and the threshold R2 is less than or equal to the distance L1.

It should be noted that, in this embodiment, a movement track that is of the finger and that is obtained when the user drags the device icon of the television is not limited, that is, the movement track of the device icon that is of the television and that is dragged by the user may be any curve. When the finger of the user releases the device icon of the television, or the finger of the user stays at a location for preset duration, the mobile phone 101 calculates a distance between a location at which the finger of the user releases the device icon of the television or the location at which the finger of the user stays and the device icon of the mobile phone. When the distance is greater than the threshold R2, the distance between the two device icons changes to the distance L1, for example, the device icon of the television returns to the location before the adsorption.

In some other embodiments, when the user touches and holds the device icon of the television and drags the device icon, the device icon of the television may not change with the movement of the finger of the user. To be specific, after the user touches and holds the device icon of the television, when the user leaves the screen after sliding on the screen for a distance or stays at a location on the screen for preset duration, the mobile phone 101 determines a distance between a location at which the finger of the user leaves the screen or the location at which the finger of the user stays and the device icon of the mobile phone. When the distance is greater than the threshold R2, the distance between the two device icons changes to the distance L1, for example, the device icon of the television returns to the location before the adsorption. It should be noted that, in a process in which the finger of the user moves on the screen, a location of the device icon of the television does not change with a movement of the finger.

It should be noted that, in the following embodiments, a manner of dragging a device icon to move away from another device icon may be any one of the foregoing three manners, which is uniformly described herein and is not described below.

Figure 6:
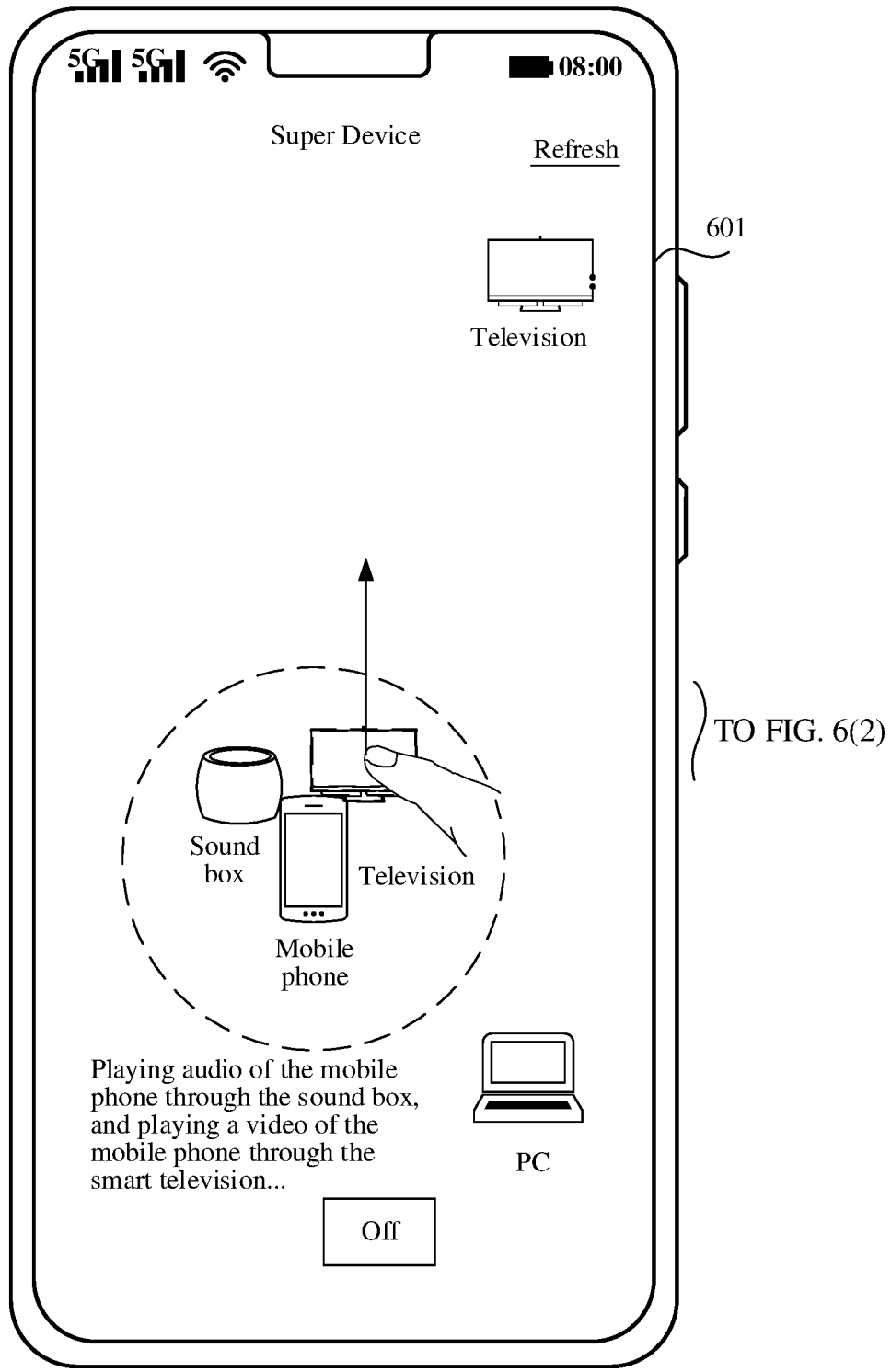
FIG. 6(1) to FIG. 6(3) are a schematic diagram of still some user interfaces of an electronic device according to an embodiment of this application.
Figure 6:
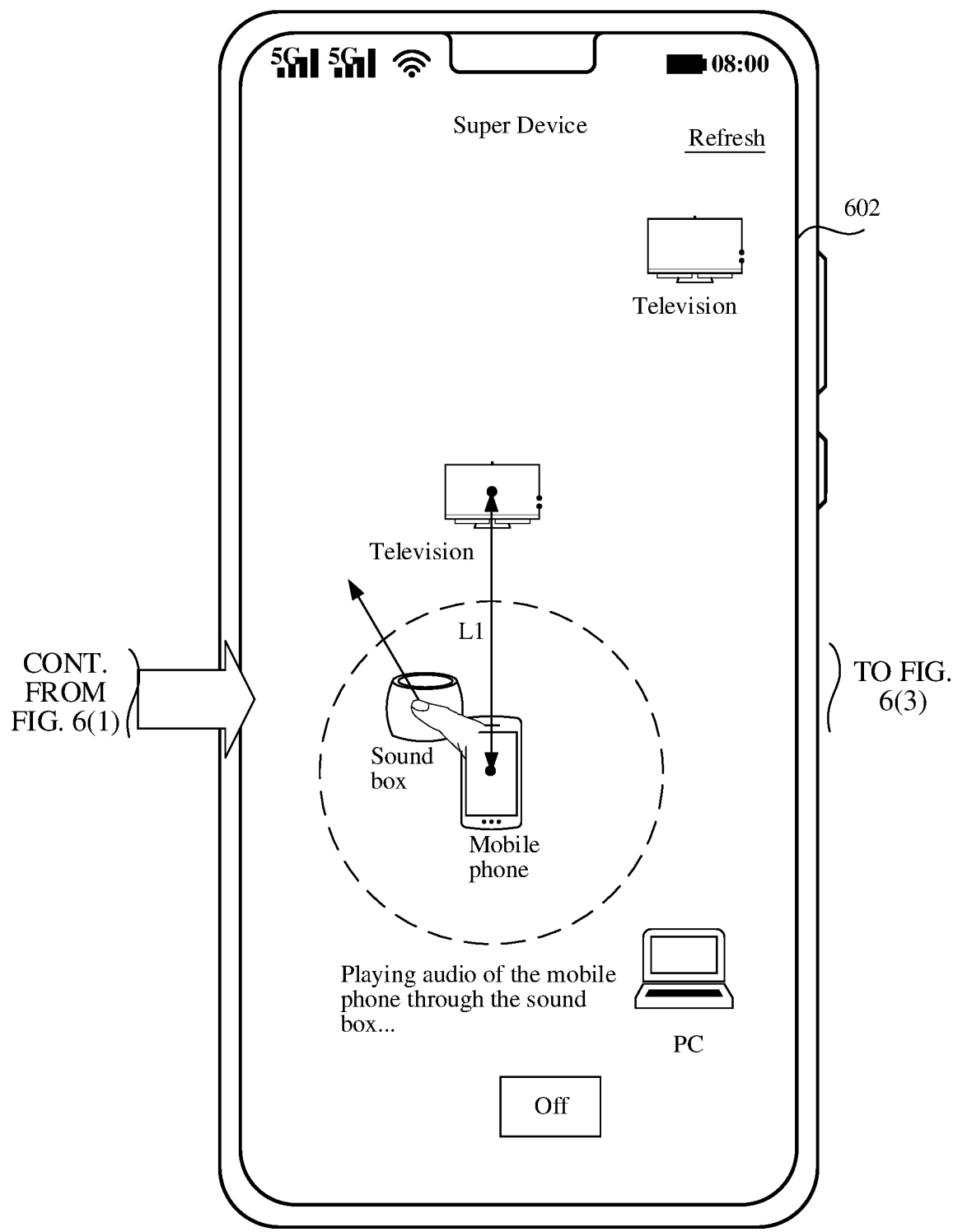
Figure 6:
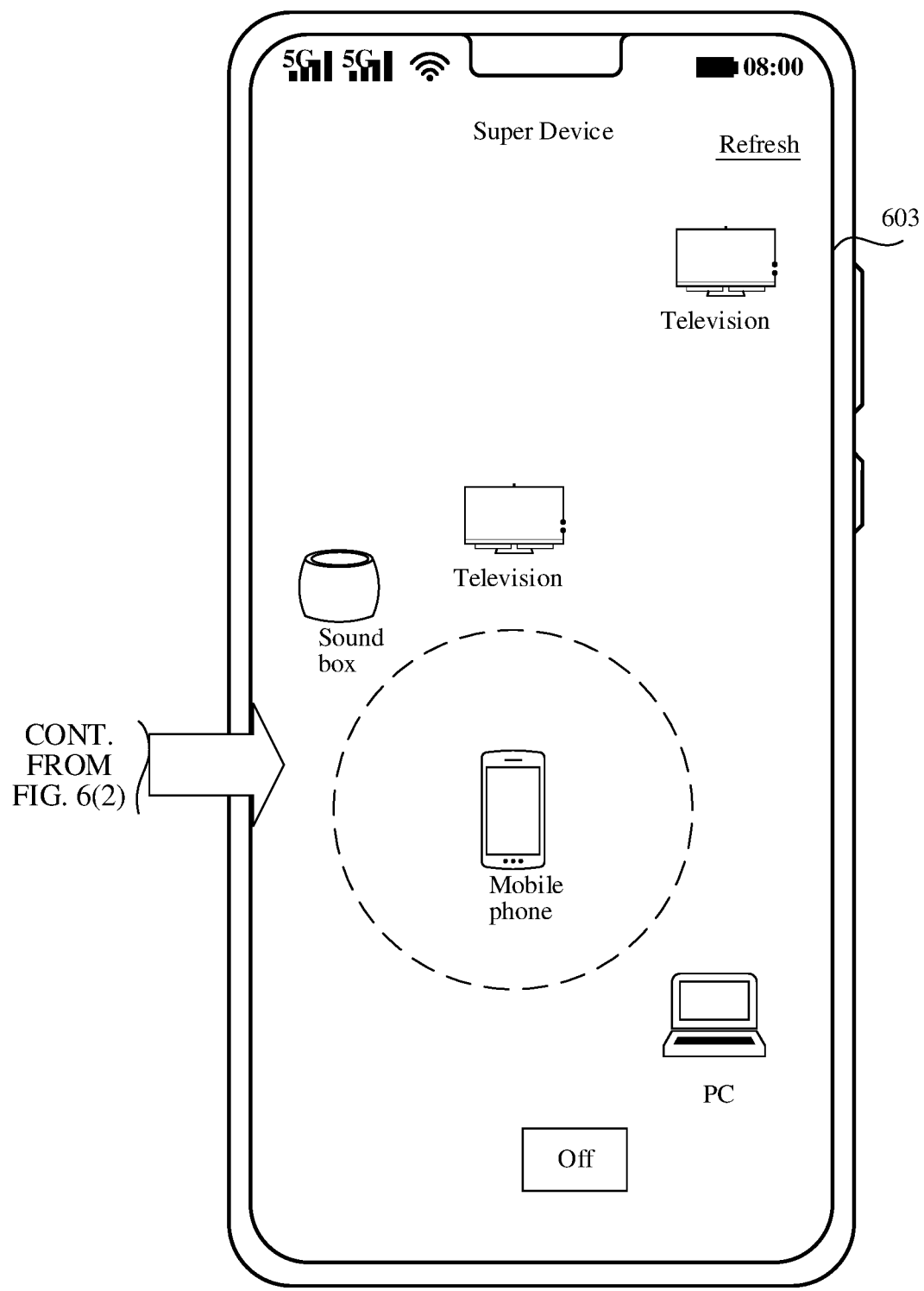

Further, in the interface 602 shown in FIG. 6(2), the user may touch and hold the device icon of the sound box, and drag the device icon of the sound box away from the device icon of the mobile phone. When a dragging distance is greater than the threshold R1 (or another threshold) and a hand is released, the device icon of the sound box returns to the location before the absorption, for example, an interface 603 shown in FIG. 6(3). In this case, the smart sound box 103 exits the interaction function with the mobile phone 101.

It should be noted that when the user triggers interaction between two or more electronic devices on the interface A, the two or more electronic devices have a capability or a state of performing the interaction function, and immediate performing of the interaction function between the two or more electronic devices is not limited. For example, if the user triggers an audio projection function between the mobile phone 101 and the smart sound box 103 by dragging a device icon, in this case, if the mobile phone 101 does not have an audio playing task or an audio playing task of the mobile phone 101 is paused, the mobile phone 101 does not immediately send audio data to the smart sound box 103. However, when the mobile phone 101 has an audio playing task, the mobile phone 101 sends to-be-played audio data to the smart sound box 103, and the smart sound box 103 plays the to-be-played audio data.

Figure 7:
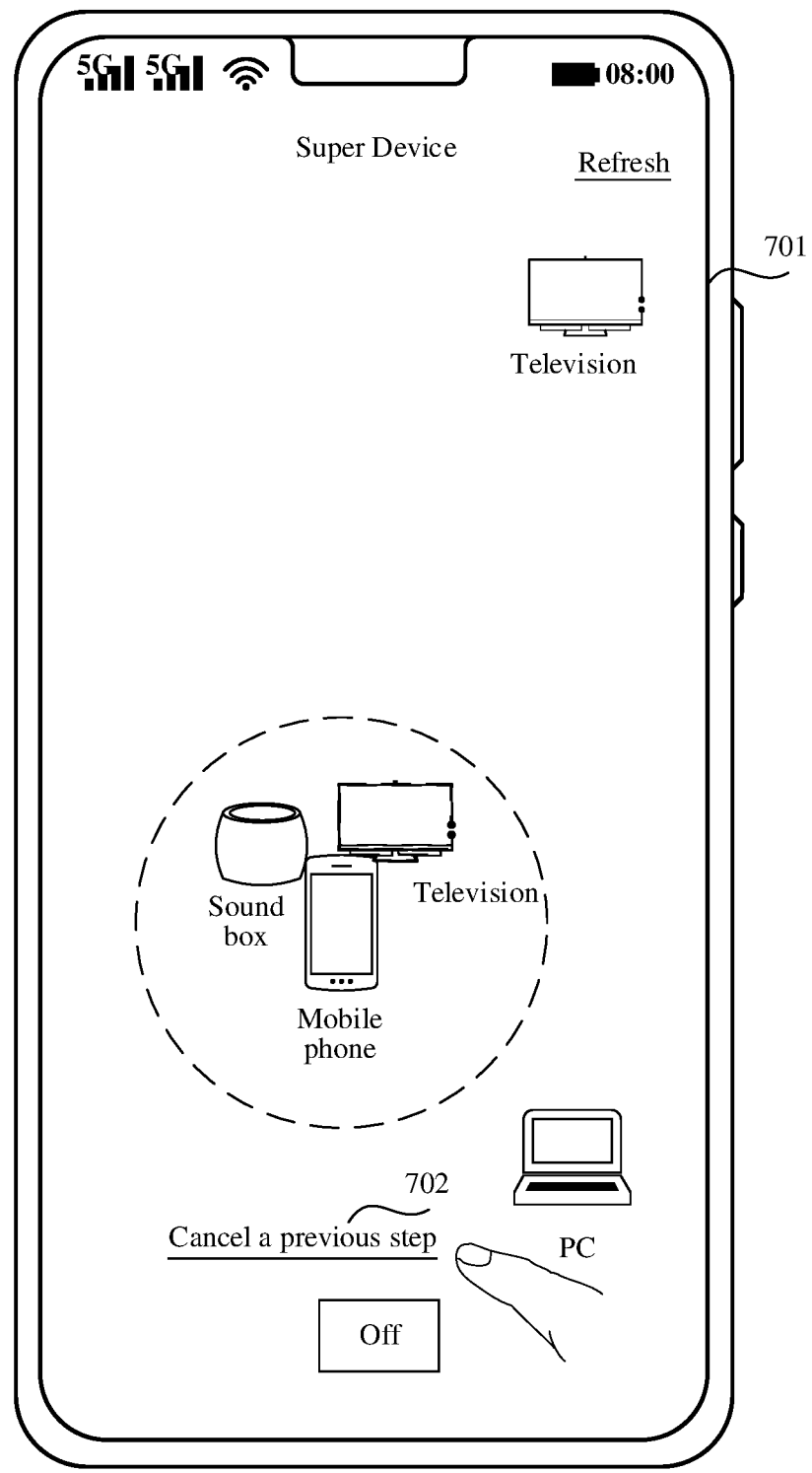
FIG. 7 is a schematic diagram of another user interface of an electronic device according to an embodiment of this application.

In some other examples, the user may also cancel (or disable) an interaction function between electronic devices by operating a control. For another example, in an interface 701 shown in FIG. 7, a device icon of a sound box, a device icon of a mobile phone, and a device icon of a television are adsorbed together, indicating that a mobile phone 101, a smart sound box 103, and a smart television 102 are performing an interaction function. A user may operate a control 702 in the operation interface 701 to cancel an operation in a previous step. For example, the operation in the previous step is an operation of dragging the device icon of the television to approach the device icon of the mobile phone. When the mobile phone 101 detects that the user operates the control 702, the mobile phone returns the device icon of the television to a location before the adsorption, as shown in the interface 602 shown in FIG. 6(2). Certainly, the interface 701 may also include a control for canceling all operations. In other words, after the mobile phone 101 detects that the user operates the control for canceling all operations, the mobile phone 101 may display an interface when an interface A is just entered, that is, no interaction function between any electronic devices is triggered. In other words, the mobile phone 101 disables interaction functions between all electronic devices.

Figure 8:
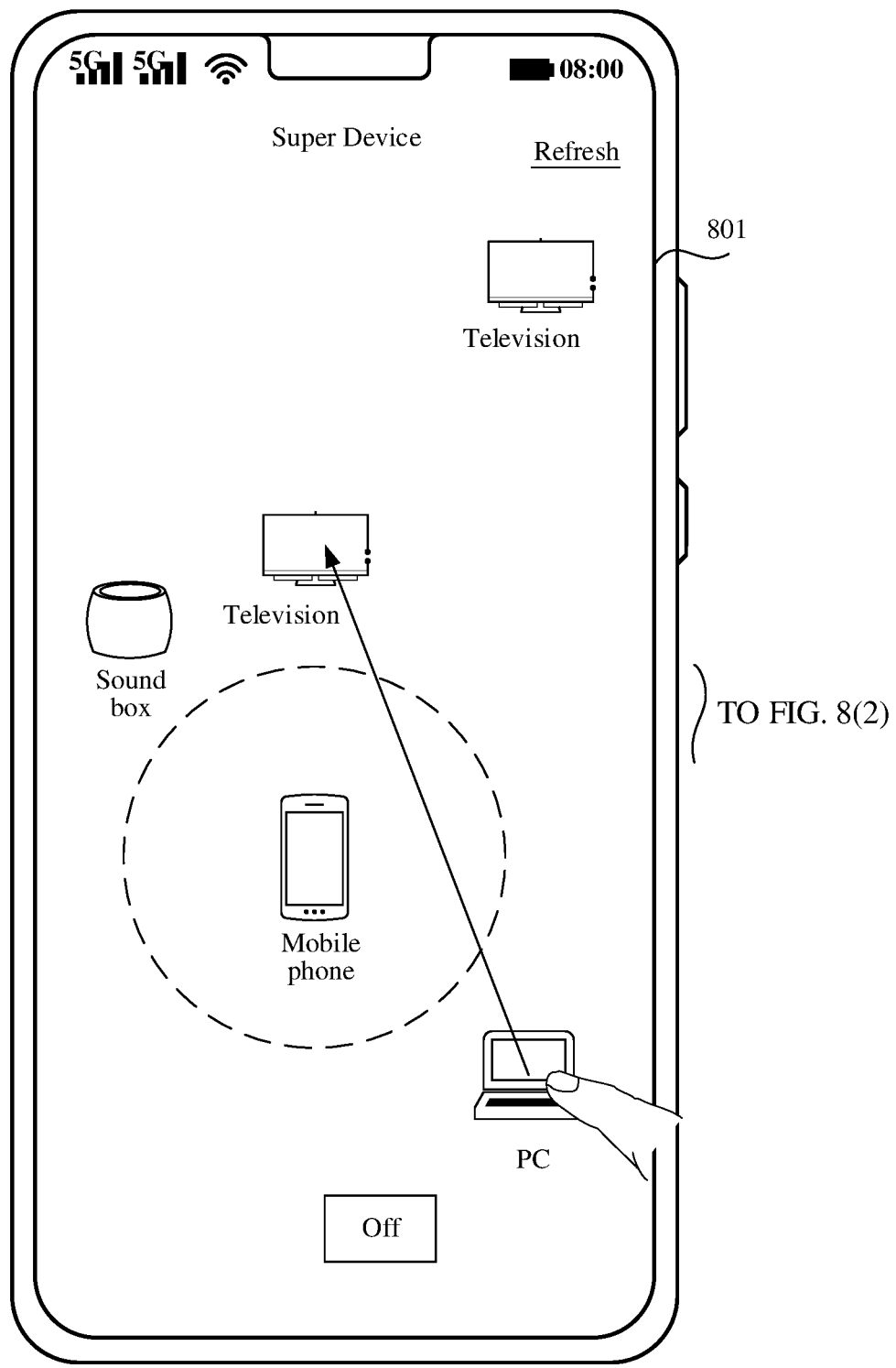
FIG. 8(1) and FIG. 8(2) are a schematic diagram of still some user interfaces of an electronic device according to an embodiment of this application.
Figure 8:
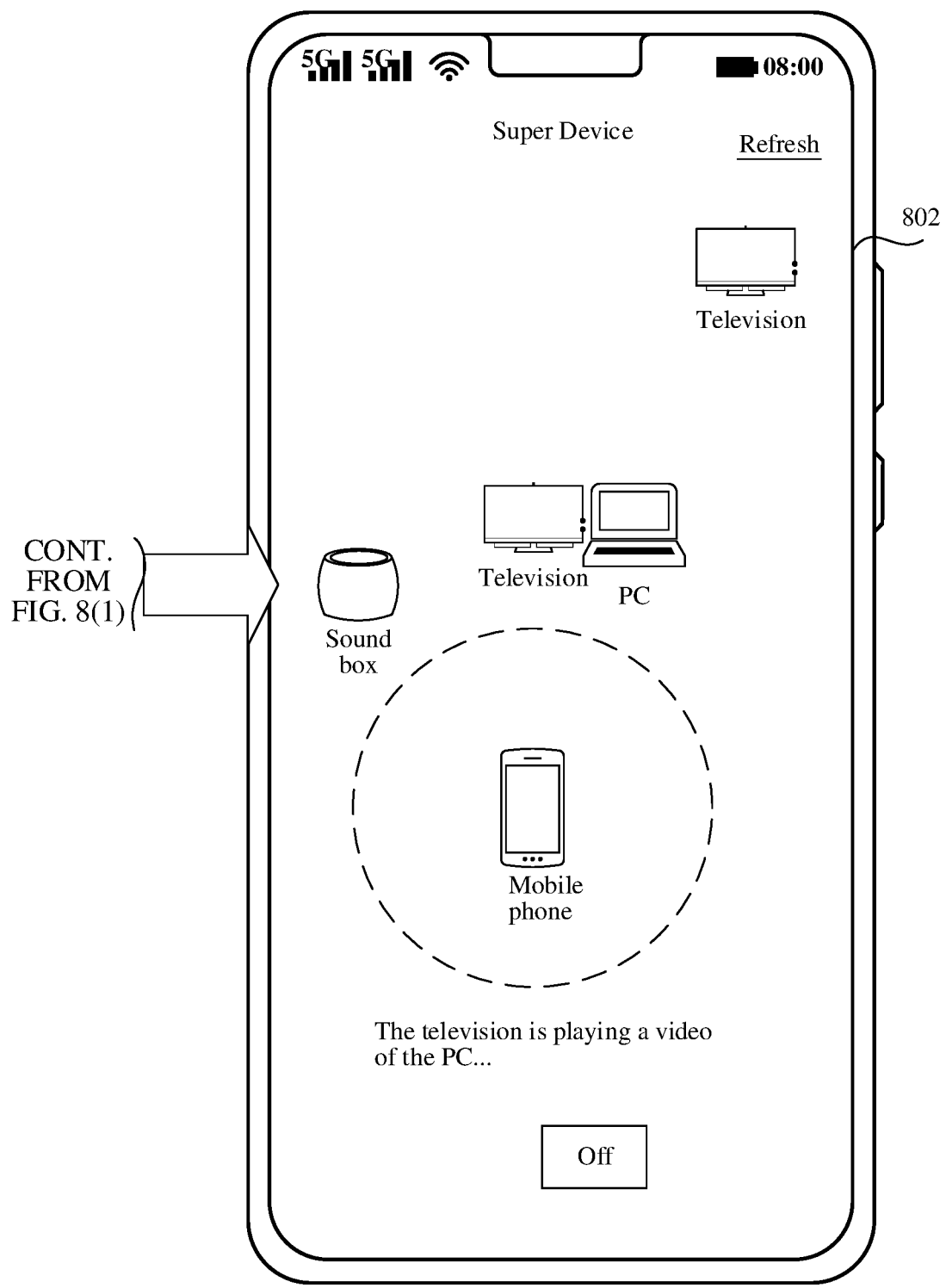

It should be noted that the foregoing examples are all about how to trigger an interaction function between another electronic device and the mobile phone 101 on the interface A displayed on the mobile phone 101. In some other examples, an interaction function between electronic devices other than the mobile phone 101 may also be triggered on the display interface A of the mobile phone 101. For example, in an interface 801 shown in FIG. 8(1), in response to detecting that a user drags a device icon of a PC toward a device icon of a television, and a distance between the device icon of the PC and the device icon of the television is less than a threshold R3, the device icon of the PC and the device icon of the television are adsorbed together (as shown in an interface 802 in FIG. 8(2)). In this case, a mobile phone 101 sends an interaction function indication to a PC 104 or a smart television 102, and the PC 104 and the smart television 102 perform a corresponding interaction function.

It can be learned from the foregoing that an interface A provided by the mobile phone 101 may be used as a unified entry for interaction between a plurality of electronic devices, and the user may trigger an interaction function between any two or more electronic devices in the interface A. In addition, the mobile phone 101 may intelligently determine a specific interaction function between electronic devices based on an application scenario in which the mobile phone 101 is located and a device type of an electronic device that performs an interaction function with the mobile phone 101 (different device types have different device features, for example, have a large screen and have a powerful audio input/output capability). The interaction function may be projection, application handoff, audio projection, content sharing, or the like. In this way, a problem that entries of interaction functions between electronic devices are scattered and interaction manners are different is resolved.

Figure 9:
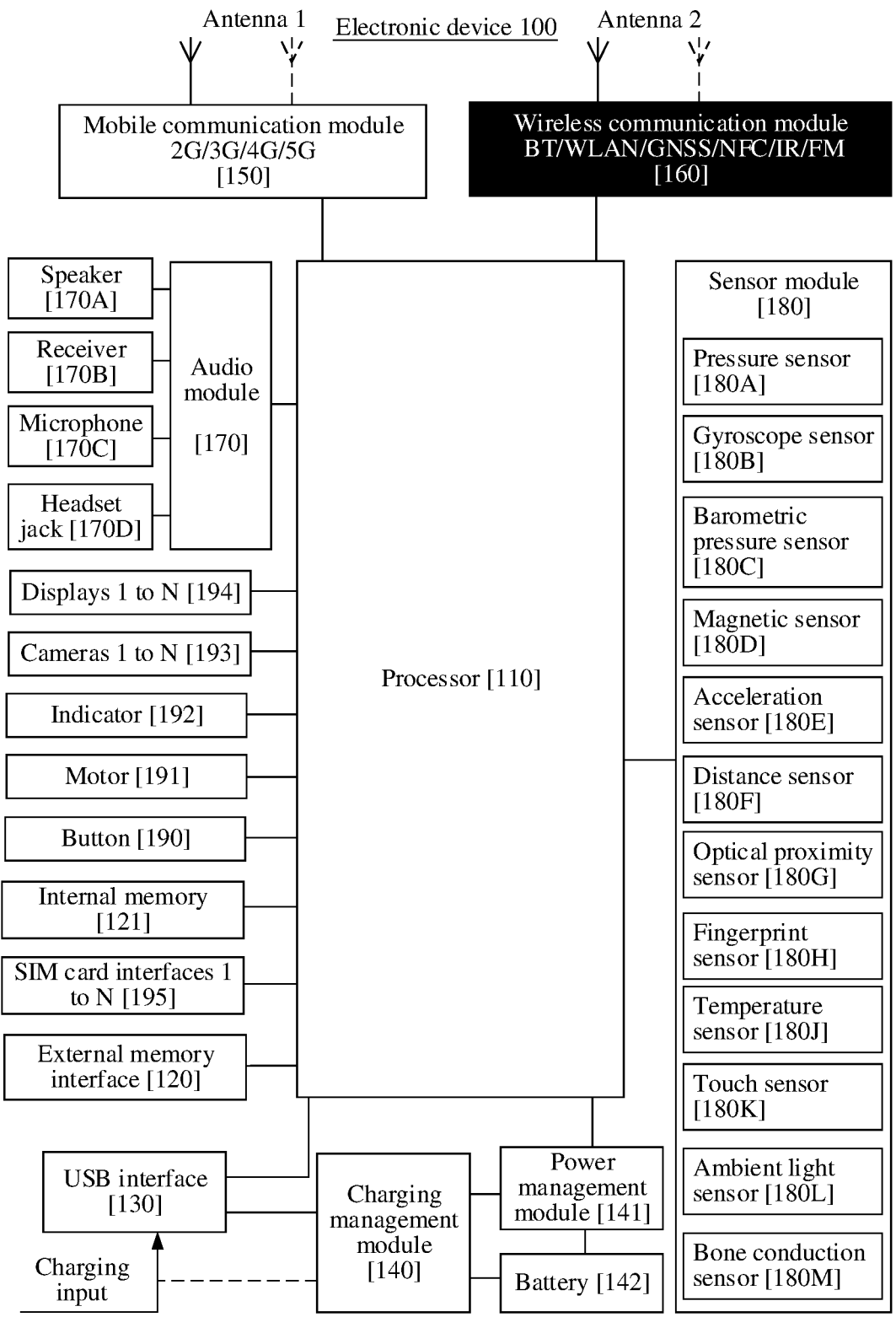
FIG. 9 is a schematic diagram of a structure of an electronic device according to an embodiment of this application.

The mobile phone 101 is used as an example of the foregoing electronic device. FIG. 9 is a schematic diagram of a structure of a mobile phone 101. It may be understood that, for another electronic device like a smart television 102, a smart sound box 103, a PC 104, and a smart television 105, refer to the schematic diagram of the structure of the mobile phone 101. Certainly, the another electronic device may include more or fewer components than the mobile phone 101, or combine some components, or split some components, or have different component arrangements. This is not limited in embodiments of this application.

Refer to FIG. 9. The mobile phone 101 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the mobile phone 101. In some other embodiments of this application, the mobile phone 101 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive wireless charging input by using a wireless charging coil of the mobile phone 101. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. In some other embodiments, the power management module 141 and the charging management module 140 may alternatively be disposed in a same device.

A wireless communication function of the mobile phone 101 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile phone 101 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the mobile phone 101. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the mobile phone 101, the antenna 1 and the mobile communication module 150 are coupled, and the antenna 2 and the wireless communication module 160 are coupled, so that the mobile phone 101 can communicate with a network and another device by using a wireless communication technology. The wireless communication technology may include a global system for mobile communication (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Bei- Dou navigation satellite system (beidou navigation satellite system, BDS), a quasi-zenith satellite system (quasi-zenith satellite system, QZSS), and/or a satellite based augmentation system (satellite based augmentation systems, SBAS).

The mobile phone 101 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the mobile phone 101 may include one or N displays 194, where N is a positive integer greater than 1.

The mobile phone 101 may implement a photographing function through the camera 193, the ISP, the video codec, the GPU, the display 194, the application processor and the like.

The external memory interface 120 may be configured to connect to an external memory card, for example, a micro SD card, to expand a storage capability of the mobile phone 101. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (for example, audio data or a phone book) created in a process of using the mobile phone 101. In addition, the internal memory 121 may include a high-speed random access memory, or may include a nonvolatile memory, for example, at least one magnetic disk storage device, a flash memory, or a universal flash storage (universal flash storage, UFS). The processor 110 runs the instructions stored in the internal memory 121 and/or the instructions stored in the memory disposed in the processor, to execute various function applications of the mobile phone 101 and data processing.

The mobile phone 101 may implement an audio function, for example, music playing and recording, through the audio module 170, the speaker 170A, the receiver 170B, the microphone 170C, the headset jack 170D, the application processor, and the like.

All technical solutions in the following embodiments may be applied to the network system 100 in FIG. 1. Herein, an example in which the network system 100 includes the mobile phone 101, the smart television 102, the smart sound box 103, the PC 104, and the smart television 105 is still used to describe the method for interaction between electronic devices provided in embodiments of this application. The mobile phone 101 may be specifically in the structure shown in FIG. 9. For structures of the smart television 102, the smart sound box 103, the PC 104, and the smart television 105, refer to the structure shown in FIG. 9.

When the user wants to trigger interaction between electronic devices, the user may enter the interface A through any electronic device in the network system 100, and perform an operation in the interface A. Herein, the mobile phone 101 that is frequently carried by the user is used as an example for description.

For example, as shown in FIG. 2(1), in response to detecting that the user performs an operation of sliding up from a bottom of a screen (or an operation of sliding down from a top of a screen) on a home screen 201 displayed by the mobile phone 101, the mobile phone 101 displays a control center interface 202 shown in FIG. 2(2). Further, in response to detecting that the user operates the control 203 in the control center interface 202, the mobile phone 101 enters the interface 301 shown in FIG. 3, that is, the interface A. It may be understood that, when the mobile phone 101 displays another interface (for example, an application interface currently running in the foreground), the user may also enter the control center interface 202 shown in FIG. 2(2) by performing the operation of sliding up from the bottom of the screen (or the operation of sliding down from the top of the screen).

In a specific embodiment, when it is detected that the user operates the control 203 in the control center interface 202, the mobile phone 101 enables a wireless communication function of the mobile phone 101, and sends and broadcasts a query message, to query a nearby electronic device. After receiving the query message of the mobile phone 101, the nearby electronic device separately returns a response to the mobile phone 101. The nearby electronic device may add information such as a MAC address and a device type of the electronic device to the response. The mobile phone 101 may determine, based on the information such as a MAC address and a device type of the electronic device, whether the electronic device is associated with the mobile phone 101, that is, whether the electronic device is an associated device of the mobile phone 101. For example, the mobile phone 101 may query, based on the MAC address of the electronic device carried in the response, an account management server for a login account of the electronic device, so as to determine whether the login account of the electronic device and a login account of the mobile phone 101 are the same, or belong to a same group of accounts. Alternatively, the mobile phone 101 may query, based on the MAC address of the electronic device carried in the response, a router of a Wi-Fi network in which the mobile phone 101 is located, whether the electronic device and the mobile phone 101 are located in a same Wi-Fi network, or the like. Alternatively, the mobile phone 101 determines, based on a historical record stored in the mobile phone 101, whether the electronic device has established a trust relationship with the mobile phone 101, and the like. It should be noted that a specific method for determining the associated device of the mobile phone 101 is not limited in embodiments of this application.

It should be noted that, in some scenarios, before it is detected that the user operates the control 203 on the control center interface 202, the mobile phone 101 may have established a communication connection to some electronic devices. In this case, after it is detected that the user operates the control 203 on the control center interface 202, in addition to performing the foregoing steps, the mobile phone 101 may further determine, for the electronic devices that have established the communication connection to the mobile phone 101, whether the electronic devices are associated devices of the mobile phone 101.

After determining that the electronic devices are the associated devices of the mobile phone 101, the mobile phone 101 measures a relative location between each associated device and the mobile phone 101 by using a positioning function in the wireless communication function. In some examples, the mobile phone 101 may obtain the distance between each associated device and the mobile phone 101 through measurement by using a Wi-Fi-based positioning capability or a Bluetooth iBeacon-based positioning capability. In some other examples, the mobile phone 101 may obtain the distance between each associated device and the mobile phone 101, and a direction of a location of each associated device relative to a location of the mobile phone 101 through measurement by using a Bluetooth 5.1-based AOA positioning capability or a UWB-based positioning capability.

After obtaining the relative location between the mobile phone 101 and the associated device of the mobile phone 101, the mobile phone 101 may draw and display the interface 301 shown in FIG. 3, that is, the interface A. The interface 301 includes identifiers of the mobile phone 101 and the associated device. In addition, a layout of the identifier of the mobile phone 101 and the identifier of the associated device is consistent with a layout of the mobile phone 101 and the associated device in real space. In other words, the interface 301 more vividly displays the relative location between the mobile phone 101 and the associated device in real space.

It should be noted that the mobile phone 101 usually has many associated devices, and each associated device may have a different wireless communication function, and may also have a different positioning function. Therefore, an embodiment of this application further provides a layout method for device identifiers in the interface 301 in different cases.

Case (1): There is an associated device that has a Bluetooth 5.1-based AOA positioning capability or a UWB-based positioning capability. By default, the mobile phone 101 has a Bluetooth 5.1-based AOA positioning capability or a UWB-based positioning capability.

1.1: First, determine a location of a device icon of the associated device that has a Bluetooth 5.1-based AOA positioning capability or a UWB-based positioning capability by using a device icon of the mobile phone 101 as a center.

The mobile phone 101 may measure a distance and a direction of the associated device that has a Bluetooth 5.1-based AOA positioning capability or a UWB-based positioning capability relative to the mobile phone 101. Locations of device icons of the associated devices (including distances and directions relative to the device icon of the mobile phone 101) may be determined based on distances and directions that are relative to the mobile phone 101 and that are obtained through measurement.

1.2: Determine, according to a specific layout rule, a location of a device icon of another associated device that does not have a Bluetooth 5.1-based AOA positioning capability or a UWB-based positioning capability.

Then, an included angle α between connecting lines of device icons of any two adjacent associated devices and the device icon of the mobile phone 101 is determined based on a quantity M of the associated devices of the mobile phone 101. Based on the distances between the other associated devices and the mobile phone 101, the included angle α, and a connecting line between the device icon of the mobile phone 101 and the device icon whose location is determined in step 1.1, the location of the device icon of the another associated device that does not have a Bluetooth 5.1-based AOA positioning capability or a UWB-based positioning capability is determined.

Figure 10:
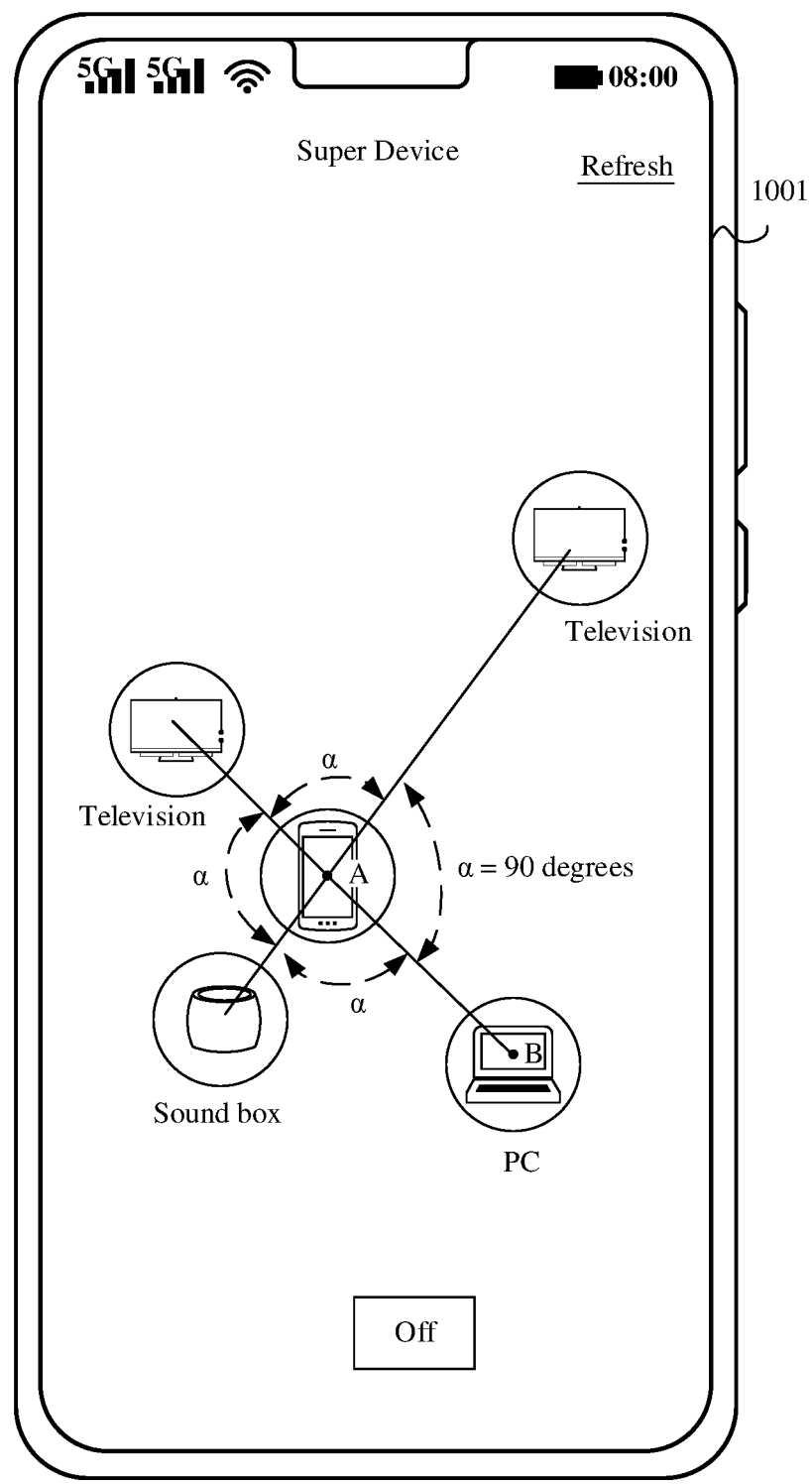
FIG. 10(1) and FIG. 10(2) are a schematic diagram of still some user interfaces of an electronic device according to an embodiment of this application.
Figure 10:
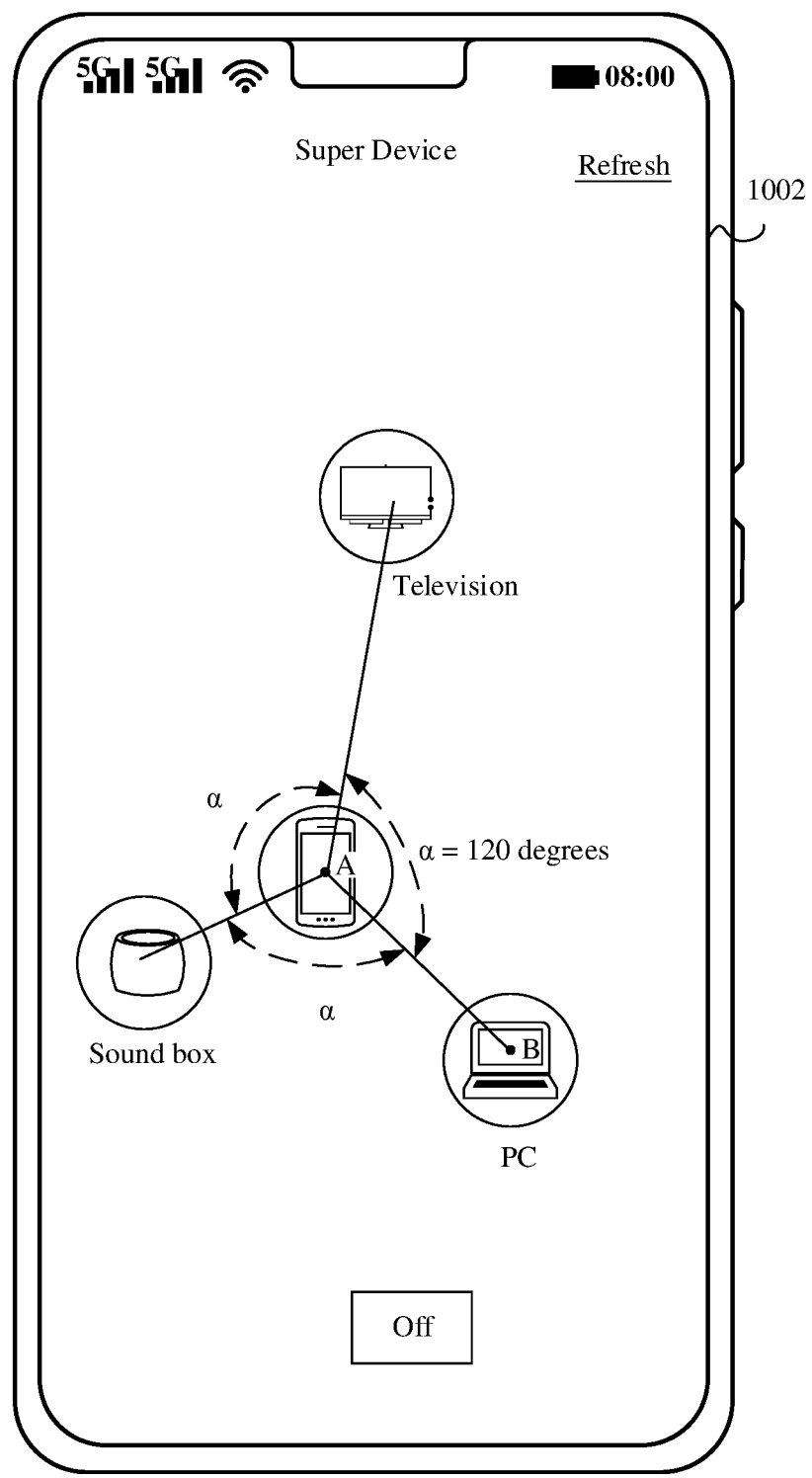

For example, a PC 104 has a Bluetooth 5.1-based AOA positioning capability or a UWB-based positioning capability, and other associated devices (that is, the smart television 102, the smart sound box 103, and the smart television 105) do not have a Bluetooth 5.1-based AOA positioning capability or a UWB-based positioning capability. To be specific, a distance and a direction of the PC 104 relative to the mobile phone 101 may be measured. In this case, a location (including a direction and a distance) of a device icon of the PC 104 may be determined by using the device icon of the mobile phone 101 as a center. As shown in an interface 1001 shown in FIG. 10(1), after device icons of a mobile phone 101 and a PC 104 are determined, it is equivalent that a connecting line AB is also determined.

The mobile phone 101 can measure only a relative distance between another associated device and the mobile phone 101, and then may determine a distance between a device icon of the another associated device and a device icon of the mobile phone 101. Optionally, in order to create a sense of randomness and enhance aesthetics of a device icon layout, a length value, for example, 20 device independent pixels (device independent pixels, DP), may also be randomly added or subtracted from the determined distance between the device icon of the another associated device and the device icon of the mobile phone 101.

Then, an included angle α between connecting lines of device icons of any two adjacent associated devices and the device icon of the mobile phone 101 is determined based on a quantity M (for example, M=4) of the associated devices of the mobile phone 101. For example, α=360 degrees/M=360 degrees/4=90 degrees. Optionally, to create a sense of randomness and enhance aesthetics of the device icon layout, an angle value, for example, 10 degrees, may also be randomly added or subtracted from the determined angle α.

Finally, the location of the device icon of the PC 104 is used as a focus, that is, a connecting line between the device icon of the mobile phone 101 and the device icon of the PC 104 (namely, the connecting line AB) is used as a start location, and locations of device icons of the other associated devices are determined based on the included angle α and the distances between the other associated devices and the mobile phone 101. For example, the mobile phone 101 finally displays the interface 1001 shown in FIG. 10(1).

It should be noted that when the location of the PC 104 changes, the mobile phone 101 determines a new location of the device icon of the PC 104 based on a measured new location of the PC 104. Subsequently, new locations of the device icons of the other associated devices are re-determined based on the new location of the device icon of the PC 104, the included angle α, and the distances between the other associated devices and the mobile phone 101. To be specific, the locations of the device icons of the other associated devices are dynamically adjusted in time.

Certainly, when the locations of the other associated devices (for example, the smart sound box 103, the smart television 102, and the smart television 105) change through measurement, distances between device icons of the associated devices and the device icon of the mobile phone 101 are also correspondingly adjusted.

In addition, when a quantity of associated devices found by the mobile phone 101 changes (for example, M is changed to 3), the included angle α is recalculated, and new locations of device icons of other associated devices are redetermined based on the location of the device icon of the PC 104, the recalculated included angle α (120 degrees), and the distances between the other associated devices and the mobile phone 101. For example, the mobile phone 101 displays an interface 1002 shown in FIG. 10(2).

Case (2): There are two or more associated devices that have a Bluetooth 5.1-based AOA positioning capability or a UWB-based positioning capability. By default, the mobile phone 101 has a Bluetooth 5.1-based AOA positioning capability or a UWB-based positioning capability.

In some embodiments, any associated device may be selected from the two or more associated devices that have a Bluetooth 5.1-based AOA positioning capability or a UWB-based positioning capability, and a location of a device icon of the selected associated device is first determined. Device icons of other associated devices that have a Bluetooth 5.1-based AOA positioning capability or a UWB-based positioning capability and device icons of associated devices that do not have a Bluetooth 5.1-based AOA positioning capability or a UWB-based positioning capability are determined based on the method for determining a device icon of an associated device that does not have a Bluetooth 5.1-based AOA positioning capability or a UWB-based positioning capability in case (1).

In some other embodiments, when two or more associated devices have a Bluetooth 5.1-based AOA positioning capability or a UWB-based positioning capability, locations of device icons of the associated devices may alternatively be first determined. Device icons of other associated devices that do not have a Bluetooth 5.1-based AOA positioning capability or a UWB-based positioning capability are randomly arranged based on idle locations on an interface.

Case (3): None of associated devices have a Bluetooth 5.1-based AOA positioning capability or a UWB-based positioning capability.

In an embodiment, the mobile phone 101 may still obtain a distance between each associated device and the mobile phone 101 through measurement. In this case, a distance between a device icon of each associated device and the device icon of the mobile phone 101 may be determined based on the distance between the associated device and the mobile phone 101. Optionally, to create a sense of randomness and enhance aesthetics of a device icon layout, a length value, for example, 20 DP, may also be randomly added or subtracted from a determined distance between a device icon of another associated device and the device icon of the mobile phone 101.

Then, an included angle α between connecting lines of device icons of any two adjacent associated devices and the device icon of the mobile phone 101 may still be determined based on a quantity M of the associated devices. For example, α=360 degrees/M. Optionally, to create a sense of randomness and enhance aesthetics of the device icon layout, an angle value, for example, 10 degrees, may also be randomly added or subtracted from the determined angle α.

Figure 11:
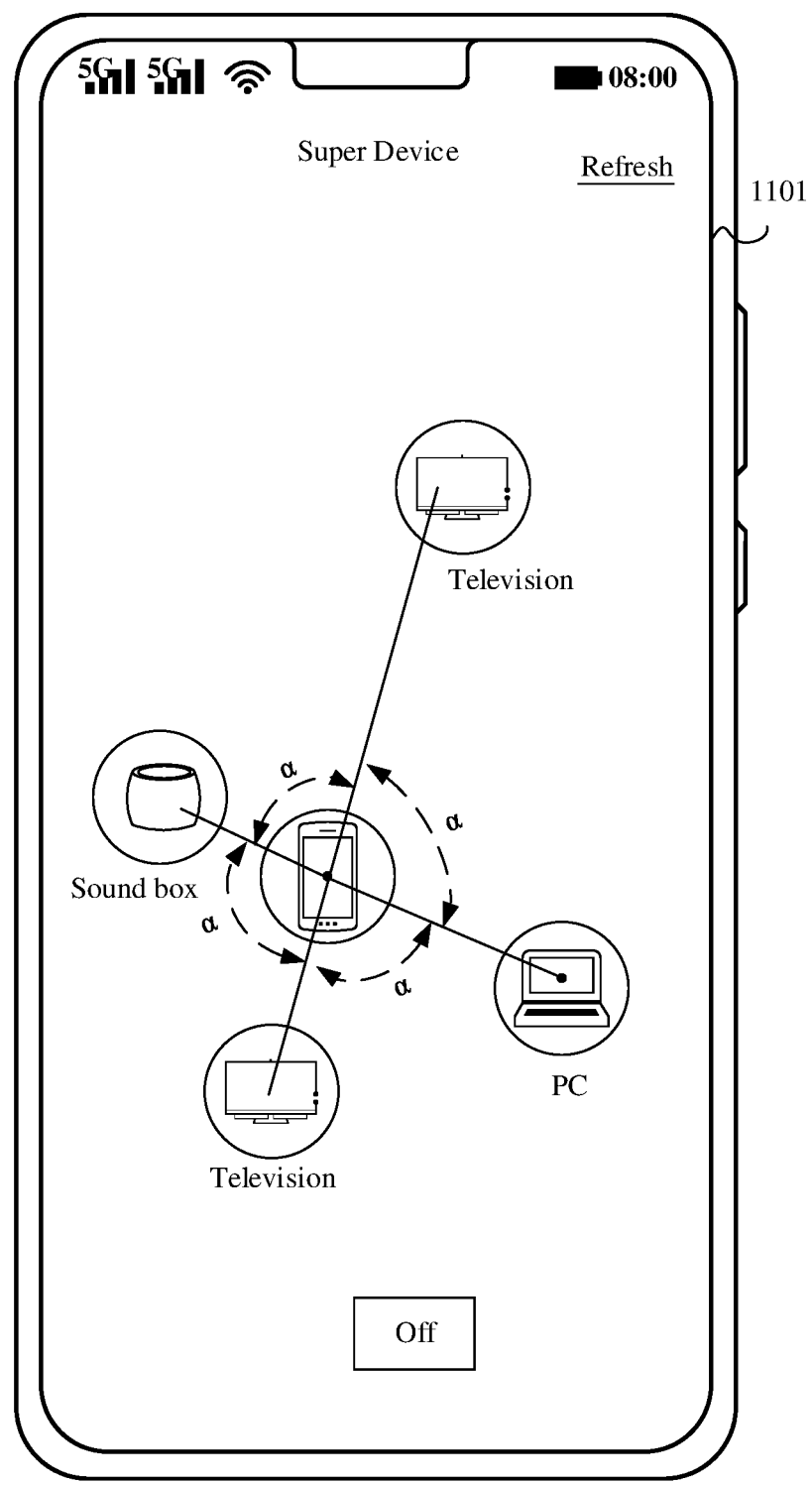
FIG. 11 is a schematic diagram of still some user interfaces of an electronic device according to an embodiment of this application.

Finally, locations of the device icons of the other associated devices are determined based on the included angle α and the distances between the other associated devices and the mobile phone 101. For example, the mobile phone 101 displays an interface 1101 shown in FIG. 11. It can be seen that the interface 1101 and the interface 1001 have the following similarities: Distances between device icons of all associated devices and a device icon of the mobile phone 101 are the same, and included angles of connecting lines between device icons of any two adjacent associated devices and the device icon of the mobile phone 101 are the same.

A difference lies in that the device icons of the associated devices are located in different locations on a screen. Adjacent relationships between device icons of management devices are different.

In some examples of this embodiment, when the locations of the other associated devices (for example, the smart sound box 103, the smart television 102, and the smart television 105) change through measurement, distances between device icons of the associated devices and the device icon of the mobile phone 101 are also correspondingly adjusted.

In some other examples of this embodiment, when a quantity of associated devices found by the mobile phone 101 changes, the included angle α is recalculated, and a location of a device icon of each associated device is readjusted based on the recalculated included angle α.

In another embodiment, the mobile phone 101 may alternatively not obtain a distance between each associated device and the mobile phone 101 through measurement. Instead, a distance between a device icon of each associated device and a device icon of the mobile phone 101 is set to a default value, for example, 120 DP. Optionally, to create a sense of randomness and enhance aesthetics of a device icon layout, a length value, for example, 20 DP, may also be randomly added or subtracted from a determined distance between a device icon of another associated device and the device icon of the mobile phone 101. It should be noted that, the distance between the device icon of each associated device and the device icon of the mobile phone 101 may be set to be same, that is, there is one default value. Alternatively, the distance between the device icon of each associated device and the device icon of the mobile phone 101 may be set to be different, that is, there are a plurality of default values.

An included angle α between connecting lines of device icons of any two adjacent associated devices and the device icon of the mobile phone 101 is determined based on a quantity M of the associated devices. For example, α=360 degrees/M. Optionally, to create a sense of randomness and enhance aesthetics of the device icon layout, an angle value, for example, 10 degrees, may also be randomly added or subtracted from the determined angle α.

Figure 12:
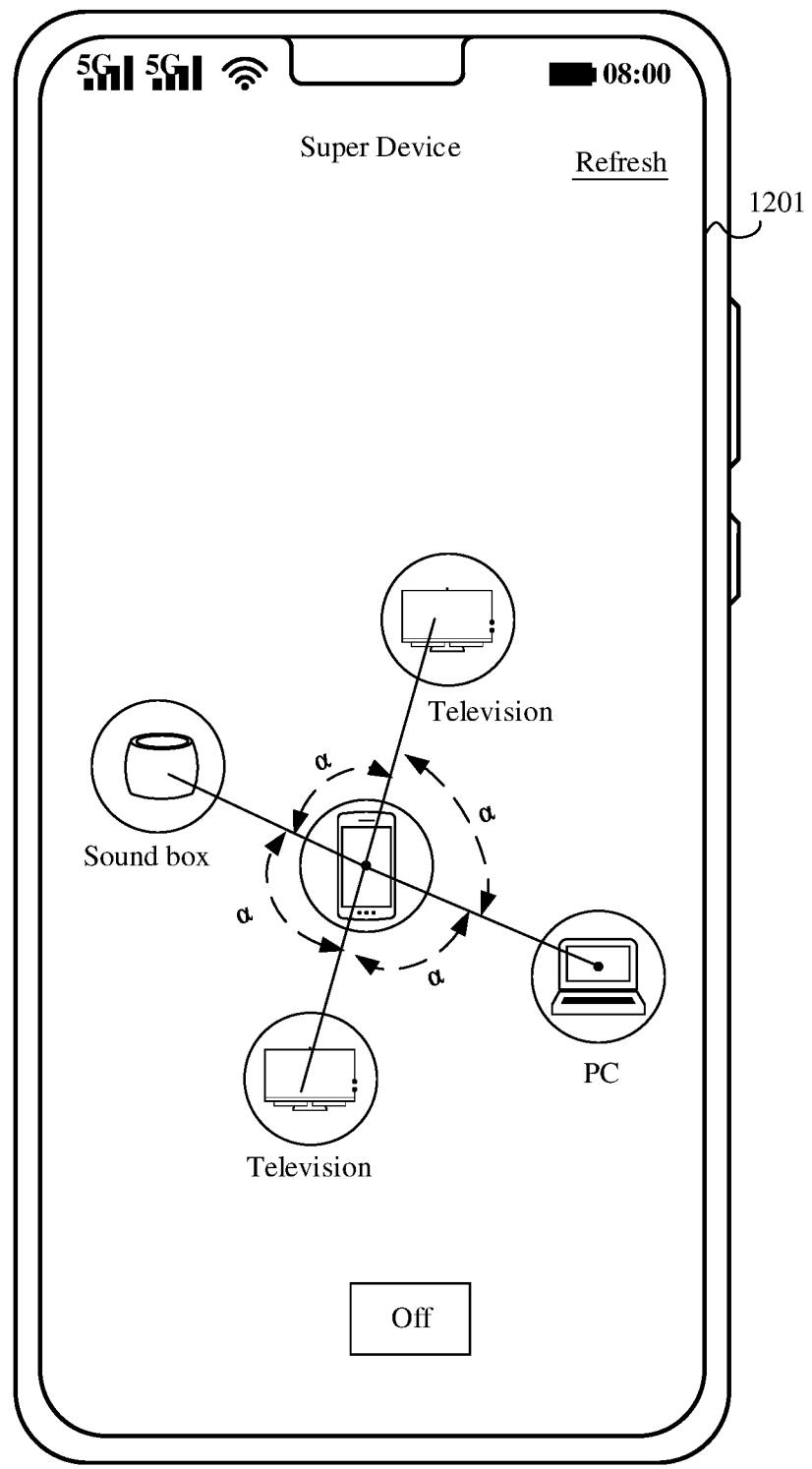
FIG. 12 is a schematic diagram of still some user interfaces of an electronic device according to an embodiment of this application.

Finally, a location of a device icon of another associated device is determined based on the included angle α and the default distance between the device icon of each associated device and the device icon of the mobile phone 101. For example, the mobile phone 101 displays an interface 1201 shown in FIG. 12. It can be seen that distances between device icons of associated devices and the device icon of the mobile phone 101 are approximately equal.

In some examples of this embodiment, when a quantity of associated devices found by the mobile phone 101 changes, the included angle α is recalculated, and a location of a device icon of each associated device is readjusted based on the recalculated included angle α.

In conclusion, a layout method for associated devices in an interface A is not specifically limited in embodiments of this application.

In addition, it should be noted that the mobile phone 101 may periodically obtain a relative location between each associated device and the mobile phone 101, and refresh the interface A based on the obtained latest location between each associated device and the mobile phone 101. Alternatively, the mobile phone 101 may refresh the interface A when a relative location between an associated device relative and the mobile phone 101 changes. Alternatively, a refresh control may be set for the interface A. After detecting that a user operates the refreshing the control, the mobile phone 101 refreshes the interface A.

It should be noted that, when the mobile phone 101 measures a distance and a direction between each associated device and the mobile phone 101, and in a process in which the mobile phone 101 displays the interface A, the mobile phone 101 may be in a state in which no wireless connection is established between the mobile phone 101 and each associated device and between the associated devices, for example, in a standby state. In other words, in this process, the mobile phone 101 and each associated device are required to enable a wireless communication function, but it is not required that a wireless connection is established between the mobile phone 101 and each associated device and between the associated devices.

It should be further noted that the user may further enter the interface A from another interface of the mobile phone 101. For example, the foregoing interface A is entered from a leftmost screen, a pull-down notification bar, or the like of the mobile phone 101. The leftmost screen is an interface displayed by the mobile phone 101 after it is detected that the user performs an operation of sliding from a left edge of a screen to the right on a home screen displayed by the mobile phone 101, and the interface is not another home screen displayed by the mobile phone 101. Alternatively, the foregoing interface A may be entered from an application interface of the mobile phone 101 (for example, an interface for searching for a device in a smart home application or an interface for searching for a device in a setting application).

Figure 13:
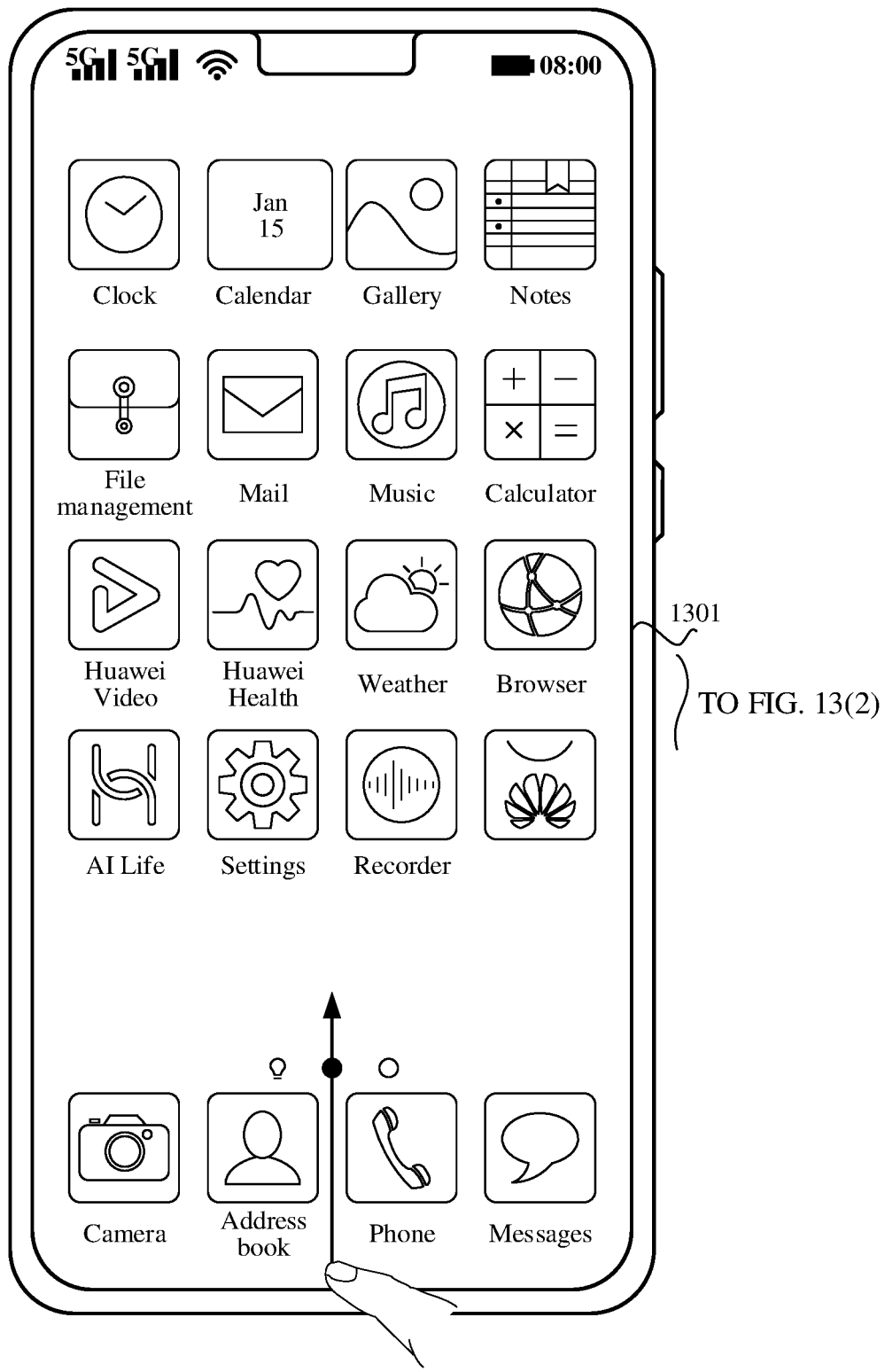
FIG. 13(1) and FIG. 13(2) are a schematic diagram of still some user interfaces of an electronic device according to an embodiment of this application.
Figure 13:
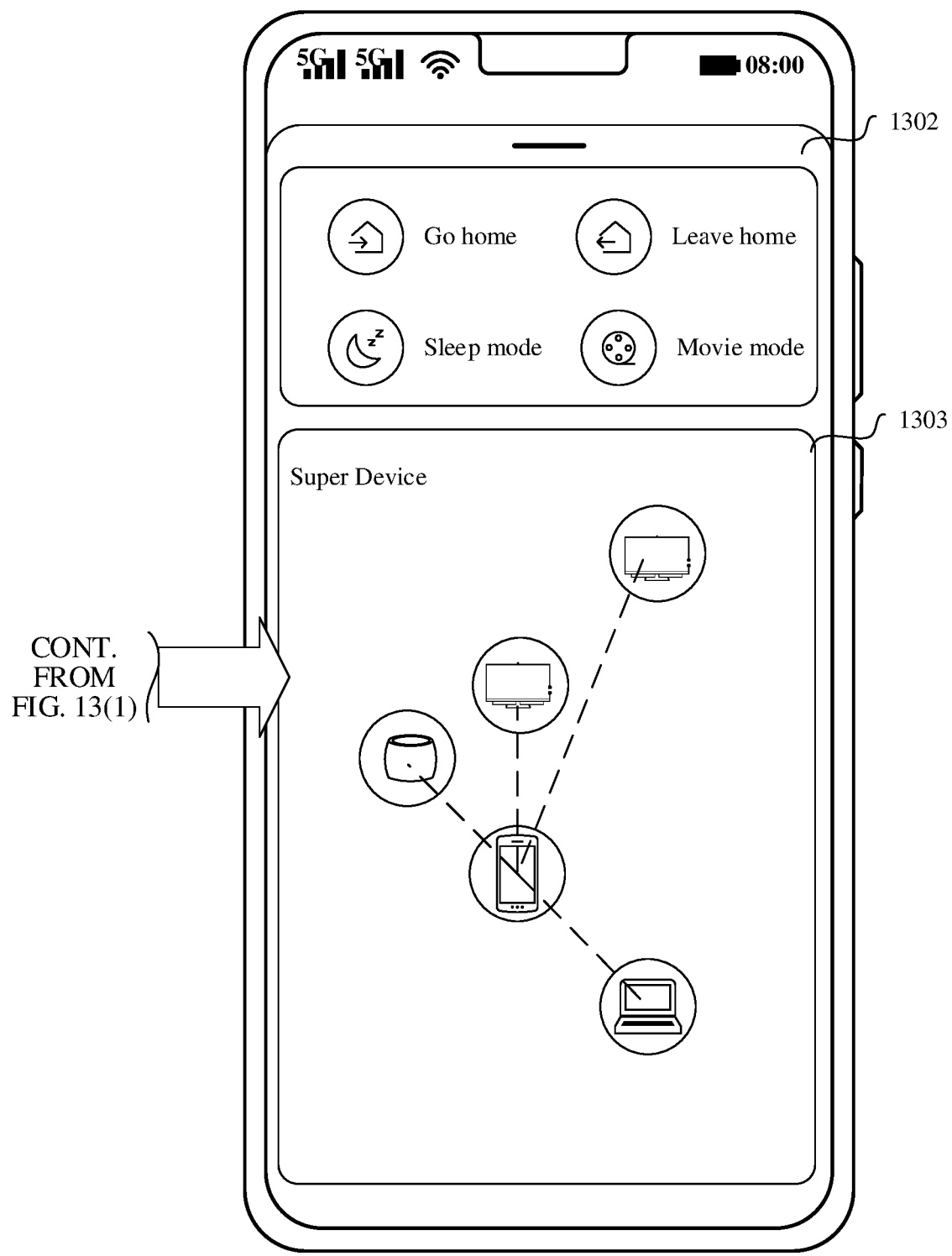

In some other examples, the interface A may alternatively be included in the control center interface, leftmost screen, or a pull-down notification bar. For example, FIG. 13(1) shows a home screen 1301 displayed by the mobile phone 101. In response to detecting that a user performs an operation of sliding up from a bottom of a screen on the home screen 1301 displayed by the mobile phone 101, the mobile phone 101 displays a control center interface 1302 shown in FIG. 13(2). Content of an area 1303 in the control center interface 1302 is content of the interface A.

In other words, in embodiments of this application, neither a specific manner of entering the interface A, a location of the interface A, nor the like is limited.

The foregoing describes in detail how the user enters the interface A by using the mobile phone 101 and a process of how the mobile phone 101 displays the interface A. The following further describes how the user performs an operation on the interface A to trigger an interaction function between any two or more electronic devices.

For example, as shown in FIG. 14(1), in a display interface 1401 of a mobile phone 101, device icons corresponding to a mobile phone 101, a smart television 102, a smart sound box 103, a PC 104, and a smart television 105 are displayed in the interface 1401. In addition, the display interface 1401 may further display prompt information "Drag an icon to trigger interaction between electronic devices", to prompt the user to perform a drag action to trigger collaborative work of a plurality of electronic devices. Alternatively, the prompt information in the display interface 1401 may alternatively be: "Drag a device to a local device to establish collaboration" (not shown in the figure), so as to prompt the user to drag another device in a direction toward the local device. When the user wants to trigger interaction between the mobile phone 101 and the PC 104, the user may touch and hold the device icon of the PC, and drag the device icon toward the device icon of the mobile phone. When a distance between the two device icons is dragged to be less than a threshold R1 (for example, 65 DP) and a hand is released, the device icon of the PC and the device icon of the mobile phone are adsorbed together, and the mobile phone 101 may display an interface 1402 shown in FIG. 14(2). In this case, the mobile phone 101 may display prompt information, to prompt that the mobile phone 101 and the PC 104 are cooperating. When the mobile phone 101 and the PC 104 start to perform a corresponding interaction function, the mobile phone 101 may display an interface 1403 shown in FIG. 14(3). In the interface 1403, the device icon of the mobile phone 101 and the device icon of the PC 104 are adsorbed together. Optionally, prompt information may also be displayed on the interface 1403, to prompt an interactive function that the mobile phone 101 and the PC 104 are performing, or prompt that the mobile phone 101 and the PC 104 are performing a collaborative operation. If the mobile phone 101 and the PC 104 cannot perform an interaction function, the device icon of the PC 104 returns to a location before being dragged, that is, the device icon of the mobile phone 101 and the device icon of the PC 104 are not adsorbed together, and the mobile phone 101 may further prompt the user that collaboration between the mobile phone 101 and the PC 104 fails.

In some embodiments, the mobile phone 101 may intelligently determine, based on a current scenario in which the mobile phone 101 is located, a type of a collaborative associated device (for example, the PC 104), and the like, an interaction function performed between the mobile phone 101 and the collaborative associated device.

A cross-device interaction function in this application includes but is not limited to a system-level interaction function and an application-level interaction function. The system-level interaction function includes but is not limited to audio projection, projection, and the like. The application-level interaction function includes but is not limited to application handoff, content sharing, and the like.

Audio projection means to send an audio stream played on one electronic device to another electronic device, and the another electronic device plays the audio stream. For example, audio projection is audio projection between a mobile phone and a smart sound box, audio projection between a mobile phone and a smart screen in a screen-off state, and audio projection between a mobile phone and a head unit.

Projection includes stream projection (also referred to as multi-source projection) based on a digital living network alliance (digital living network alliance, DLNA) technology, screen mirroring (also referred to as single-source projection) based on a Miracast technology, and projection based on another technology (like AirPlay). For example, projection is performed between a mobile phone and a smart TV, PC, or tablet. If a user wants to project a video or audio played on the mobile phone to another electronic device, the user may perform stream projection. In this case, the mobile phone may send a playback address of the video or audio to the electronic device (for example, the PC), and the PC plays the corresponding video or audio based on the received playback address. Alternatively, the mobile phone sends video data or audio data played by the mobile phone to the PC, and the PC may directly play the video data or audio data based on the received video data or audio data. In the screen projection process, an interface displayed on the mobile phone may be different from content displayed on the PC. If the user wants to project the interface displayed on a screen of the mobile phone to another electronic device, screen mirroring may be performed. In this case, the mobile phone sends mobile phone interface data to another electronic device (for example, the PC), and the PC displays the interface of the mobile phone. In the screen projection process, the interface displayed on the mobile phone and a mobile phone interface displayed on the PC are same.

Application handoff means that an electronic device can continue to run an application that has been run by another electronic device.

Content sharing includes sharing content such as a file, a photo, a video, an audio, and a text between different electronic devices. For example, application handoff is performed between a mobile phone and a smart TV/PC/tablet computer. A handoff application is, for example, a MeeTime application (a video call application), a video application, a music application, and a document application.

In a specific implementation method, the mobile phone 101 may first determine, based on a currently running application, a scenario in which the mobile phone 101 is currently located. For example, if the mobile phone 101 currently runs a document editing application like Word or WPS, it is determined that the mobile phone 101 is in an office scenario. Alternatively, if the mobile phone 101 currently runs a PPT application, a gallery application, or the like, it is determined that the mobile phone 101 is in a demonstration sharing scenario. Alternatively, if the mobile phone 101 currently runs a video application, an audio application, or the like, it is determined that the mobile phone 101 is in an audio and video playing scenario. Alternatively, if the mobile phone 101 currently runs a call application, it is determined that the mobile phone 101 is in a video call scenario. Alternatively, when the mobile phone 101 currently runs a sports application, a fitness application, or browses a sports web page, it is determined that the mobile phone 101 is in a sports and health scenario. Alternatively, when a head unit appears on the associated device of the mobile phone 101, it is determined that the mobile phone is in a head unit projection scenario.

It should be noted that, as described above, in some examples, the user displays a control center in a pull-up or slide-down manner on an application interface of an application 1 (the application 1 is not a desktop application) displayed on the mobile phone 101, and enters the interface A by using a control (or referred to as a widget) of the control center. In this case, in this example, an application currently running on the mobile phone 101 is the application 1.

In some other examples, when the mobile phone 101 displays a home screen (which may also be considered that the mobile phone 101 displays an interface of a desktop application), the user displays a control center in a pull-up or slide-down manner, and enters the interface A by using a control or a widget in the control center. Alternatively, the user enters the interface A by using a leftmost screen of the mobile phone 101. In this example, an application currently running on the mobile phone 101 may be understood as an application that is a non-desktop application and that is most recently run in the foreground by the mobile phone before the mobile phone displays the control center or enters the leftmost screen.

For example, when displaying an application interface of an application 2 (a non-desktop application), the mobile phone 101 receives an operation of the user, and returns to the home interface of the mobile phone. Then, the control center is started in a pull-up or slide-down manner, and the interface A is entered by using a control (or referred to as a widget) of the control center. In this case, an application currently running on the mobile phone 101 is the application 2.

For another example, when displaying an application interface of an application 3 (a non-desktop application), the mobile phone 101 receives an operation of the user, and returns to the home interface of the mobile phone. After an operation of sliding from a left edge of a screen to the right on the home screen by the user is received again, the mobile phone displays the leftmost screen, and enters the interface A by using a control (or a widget) in the leftmost screen. In this case, an application currently running on the mobile phone 101 is the application 3.

Then, an interaction function performed by the mobile phone 101 with the associated device is determined based on a current scenario of the mobile phone and a type of the collaborative associated device. For example, an example in which the mobile phone 101 is in a document editing scenario is used to describe how to determine an interaction function performed by the mobile phone 101 with a collaborative associated device. If the collaborative associated device is the smart television 102, because a device feature of the smart television 102 is that the smart television 102 has a large screen, user input is inconvenient. Therefore, it may be determined that an interaction function between the mobile phone 101 and the smart television 102 is screen mirroring. The user may project a document currently running on the mobile phone 101 to the smart television 102, to facilitate viewing. In addition, the user may continue to edit a document by using the mobile phone 101. If the collaborative associated device is the PC 104, the PC 104 has a large screen and an input apparatus like a keyboard because of a device feature of the PC 104. Therefore, an interaction function of application handoff performed by the mobile phone 101 with the PC 104 may be firstly selected. In other words, the mobile phone 101 sends a currently edited document to the PC 104, and the user may continue to edit the document on the PC 104 based on the document edited by the mobile phone 101. If either of the mobile phone 101 and the PC 104 does not support the interaction function of application handoff, an interaction function for screen mirroring performed by the mobile phone 101 with the PC 104 may be selected.

The following Table 1 shows an example of a correspondence between a current scenario of the mobile phone 101, a type of a collaborative associated device, and an interaction function between electronic devices. In other words, after determining the current scenario, the mobile phone 101 may determine, by searching Table 1, the interaction function performed by the mobile phone 101 with the collaborative associated device.

TABLE 1

| Scenario in which a mobile phone 101 is located | Task currently performed by the mobile phone 101 | Collaborative associated device | Interaction function |
|---|---|---|---|
| Office scenario | Document editing | Smart television | Screen mirroring |
| | | PC | Select application handoff firstly, and select screen mirroring secondly |
| | | Tablet computer | Select application handoff firstly, and select screen mirroring secondly |
| | Presentation sharing | Smart television | Screen mirroring |
| | | PC | Screen mirroring |
| | | Tablet computer | Screen mirroring |
| Home entertainment | Audio and video playback | Smart television | Screen mirroring |
| | | PC | Select stream projection firstly, select application handoff secondly, and select screen mirroring thirdly |
| | | Tablet computer | Select application handoff firstly, and select screen mirroring secondly |
| | | Smart sound box | Audio projection |
| | Video call | Smart television | Select application handoff firstly, and select screen mirroring secondly |
| | | PC | Select application handoff firstly, and select screen mirroring secondly |
| | | Tablet computer | Select application handoff firstly, and select screen mirroring secondly |
| Sports and health | Sports and health (practicing yoga and watching fitness videos) | Smart television | Screen mirroring |
| | | PC | Select stream projection firstly, select application handoff secondly, and select screen mirroring thirdly |
| | | Tablet computer | Select application handoff firstly, and select screen mirroring secondly |
| Travel | Head unit projection | Head unit | Screen mirroring |
| Other | Other | Smart television | Screen mirroring |
| | | PC | Screen mirroring |
| | | Tablet computer | Screen mirroring |

It should be noted that the correspondence in Table 1 is only an example, and does not constitute a limitation on a correspondence between the scenario in which the mobile phone 101 is located, the type of the collaborative associated device, and the interaction function between electronic devices.

In addition, in some other embodiments, the mobile phone 101 may further determine an interaction function between two electronic devices based on a running status of the collaborative associated device. For example, the user triggers an interaction function between the mobile phone 101 and the smart television 102. When it is determined that the smart television 102 is in a screen-on state, the mobile phone 101 and the smart television 102 may perform an interaction function of screen mirroring. When it is determined that the smart television 102 is in a screen-off state, the mobile phone 101 and the smart television 102 may perform an interaction function of audio projection.

In some other embodiments, the mobile phone 101 may further determine an interaction function between two electronic devices based on a device type of the collaborative associated device. In other words, an interaction function between the two electronic devices is a fixed interaction function. For example, when the user triggers an interaction function between the mobile phone 101 and the smart sound box 103, the mobile phone 101 determines, based on a device type of the smart sound box 103, that an interaction function of audio projection is performed between the mobile phone 101 and the smart sound box 103. For another example, when the user triggers an interaction function between the mobile phone 101 and the smart television 102, the mobile phone 101 determines, based on a device type of the smart television 102, that an interaction function of projection is performed between the mobile phone 101 and the smart television 102.

It should be noted that the method for determining, by the mobile phone 101, the interaction function performed between the mobile phone 101 and the collaborative associated device is only an example. In some other embodiments, the foregoing methods may be further combined. For example, when the mobile phone 101 displays a running interface of an application (a non-desktop application), a user displays a control center in a pull-up or pull-down manner, and enters the interface A. When an interaction function between the mobile phone 101 and some collaborative associated device is triggered through the interface A, the mobile phone 101 may determine, based on information about the currently running application and a device type of the collaborative associated device, an interaction function that should be performed. When the mobile phone 101 displays a desktop (which may also be considered as a running interface of a desktop application), the user displays a control center in a pull-up or pull-down manner, and enters the interface A. When an interaction function between the mobile phone 101 and some collaborative associated device is triggered through the interface A, the mobile phone 101 may determine, based on a device type of the collaborative associated device, an interaction function that should be performed, or the mobile phone 101 directly determines to perform some preset interaction function.

After the mobile phone 101 determines the interaction function performed between the mobile phone 101 and the collaborative associated device, the mobile phone 101 establishes a wireless connection to the collaborative associated device, to transmit service data required by the interaction function. The established wireless connection may be, for example, a Wi-Fi peer-to-peer (Peer-to-peer, P2P) network connection or a Bluetooth connection. For example, if the mobile phone 101 and the PC 104 perform an interaction function of screen mirroring, and the mobile phone 101 sends a screen interface of the mobile phone 101 to the PC 104 through the established wireless connection, the PC 104 displays the screen interface of the mobile phone 101. For another example, if the mobile phone 101 and the PC 104 perform an interaction function of application handoff, the mobile phone 101 sends a status of a currently running application to the PC 104. The PC 104 locally starts a corresponding application, restores, based on the received status of the application, the locally running application to a running state of the mobile phone 101, and continues to run. For another example, if the mobile phone 101 and the PC 104 perform an interaction function of stream projection, the mobile phone 101 sends a playback address of streaming media to the PC 104, and the PC 104 downloads and plays the streaming media from a corresponding server based on the playback address of the streaming media. Alternatively, the mobile phone 101 sends data of streaming media to the PC 104, and the PC 104 plays a corresponding video or audio based on the data of the streaming media.

It should be noted that, in some examples, an interaction function between the mobile phone 101 and the PC 104 is not affected when drag directions of the user are different. In other words, no matter whether the device icon of the PC is touched and held and dragged toward the device icon of the mobile phone to trigger an interaction function between the two electronic devices, or the device icon of the mobile phone is touched and held and dragged toward the device icon the PC to trigger an interaction function between the two electronic devices, interaction functions performed between the mobile phone 101 and the PC 104 are same. In some other examples, when drag directions of the user are different, interaction functions between the mobile phone 101 and the PC 104 may be different, for example, data transmission directions are different. For example, if a device icon of a PC is touched and held and dragged toward a device icon of a mobile phone to trigger an interaction function between two electronic devices, when application handoff is performed between a mobile phone 101 and a PC 104, a state of an application on the PC 104 may be sent to the mobile phone 101, and the mobile phone 101 performs the application through handoff based on the received state of the application. If a device icon of the mobile phone is touched and held and dragged toward a device icon of the PC to trigger an interaction function between two electronic devices, when application handoff is performed between the mobile phone 101 and the PC 104, a state of an application on the mobile phone 101 may be sent to the PC 104, and the PC 104 performs the application through handoff based on to the received state of the application.

The user may further drag more associated devices to participate in an interaction function between the mobile phone 101 and the PC 104. For related operations, refer to the foregoing description about FIG. 5(1) and FIG. 5(2).

Figure 15:
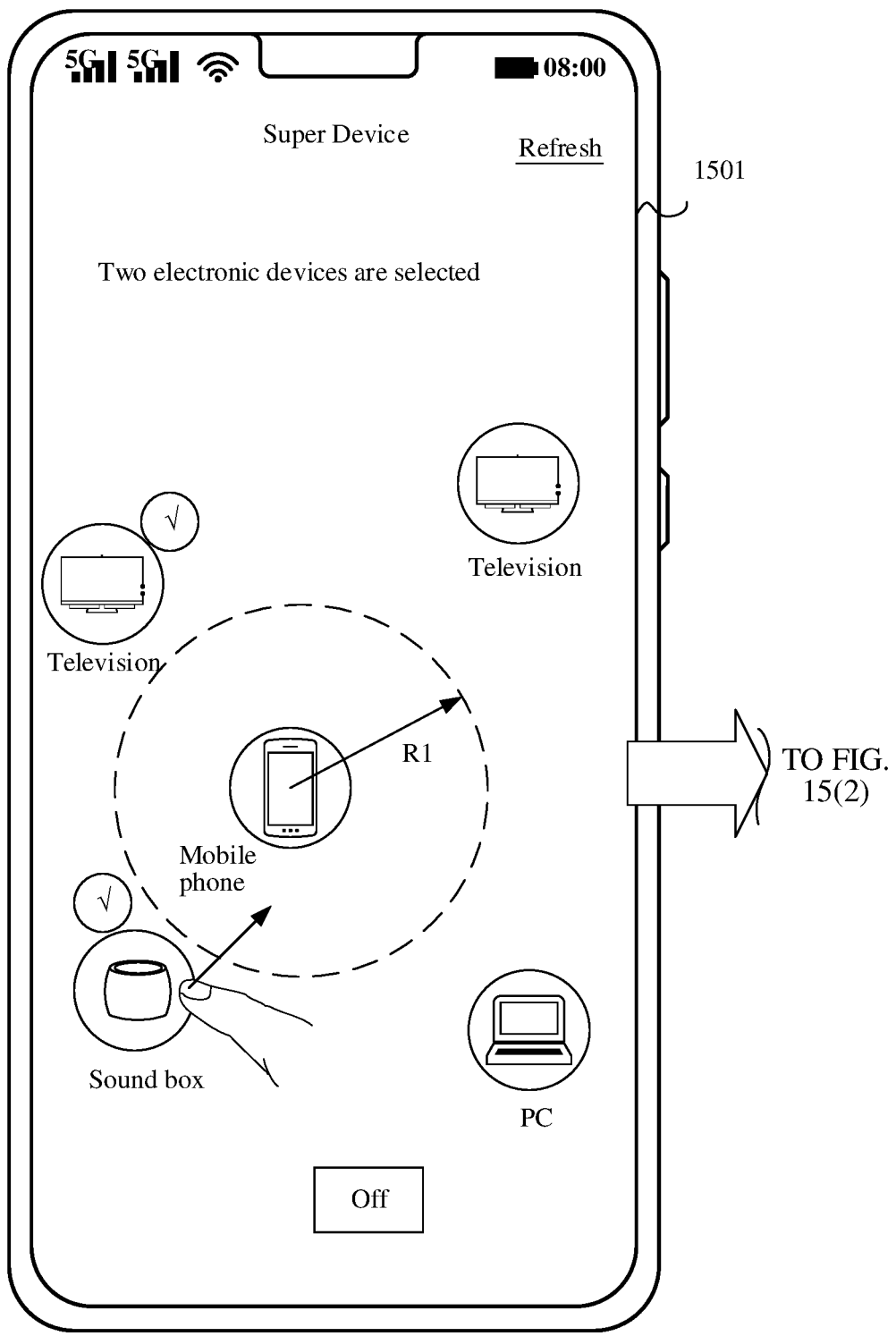
FIG. 15(1) and FIG. 15(2) are a schematic diagram of still some user interfaces of an electronic device according to an embodiment of this application.
Figure 15:
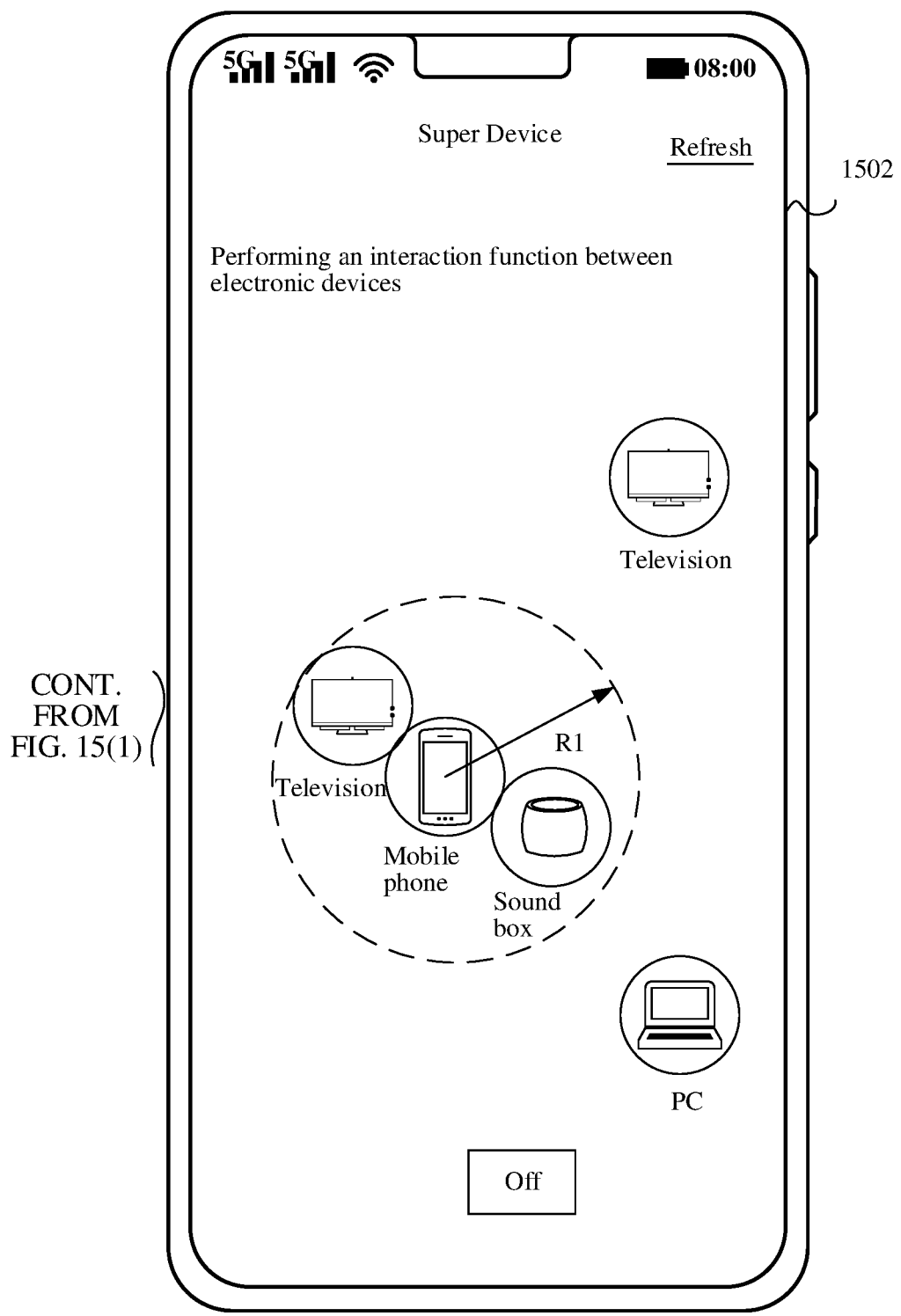

In some other embodiments, the user may also select device icons of a plurality of associated devices, and drag the device icons close to the mobile phone 101, so as to trigger interaction functions between the plurality of associated devices and the mobile phone 101 at a time. For example, in an interface 1501 shown in FIG. 15(1), a user may first select device icons of a plurality of associated devices for example, select a device icon of a smart television 102 and a device icon of a smart speaker 103 in a manner of, for example, pressing and holding a device icon, then touch and hold any selected device icon, and drag the device icon toward the device icon of the mobile phone 101. When a distance between any device icon in the selected device icons and the device icon of the mobile phone 101 is less than a threshold R1 and a hand is released, a plurality of selected device icons are adsorbed together with the device icon of the mobile phone 101, the mobile phone 101 displays an interface 1502 shown in FIG. 15(2), and the mobile phone 101, the smart television 102, and the smart sound box 103 jointly perform a corresponding interaction function together.

Figure 16:
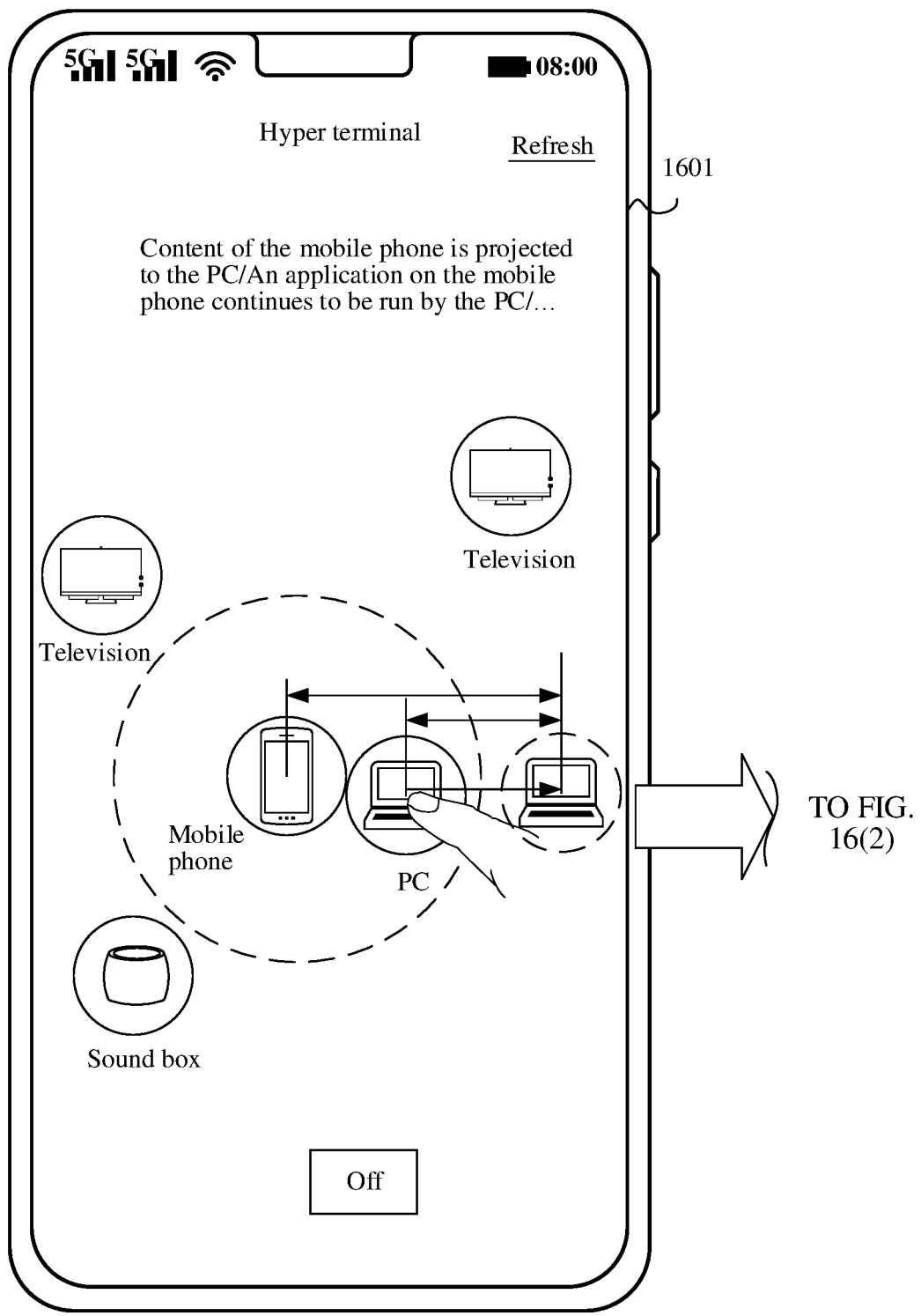
FIG. 16(1) and FIG. 16(2) are a schematic diagram of still some user interfaces of an electronic device according to an embodiment of this application.
Figure 16:
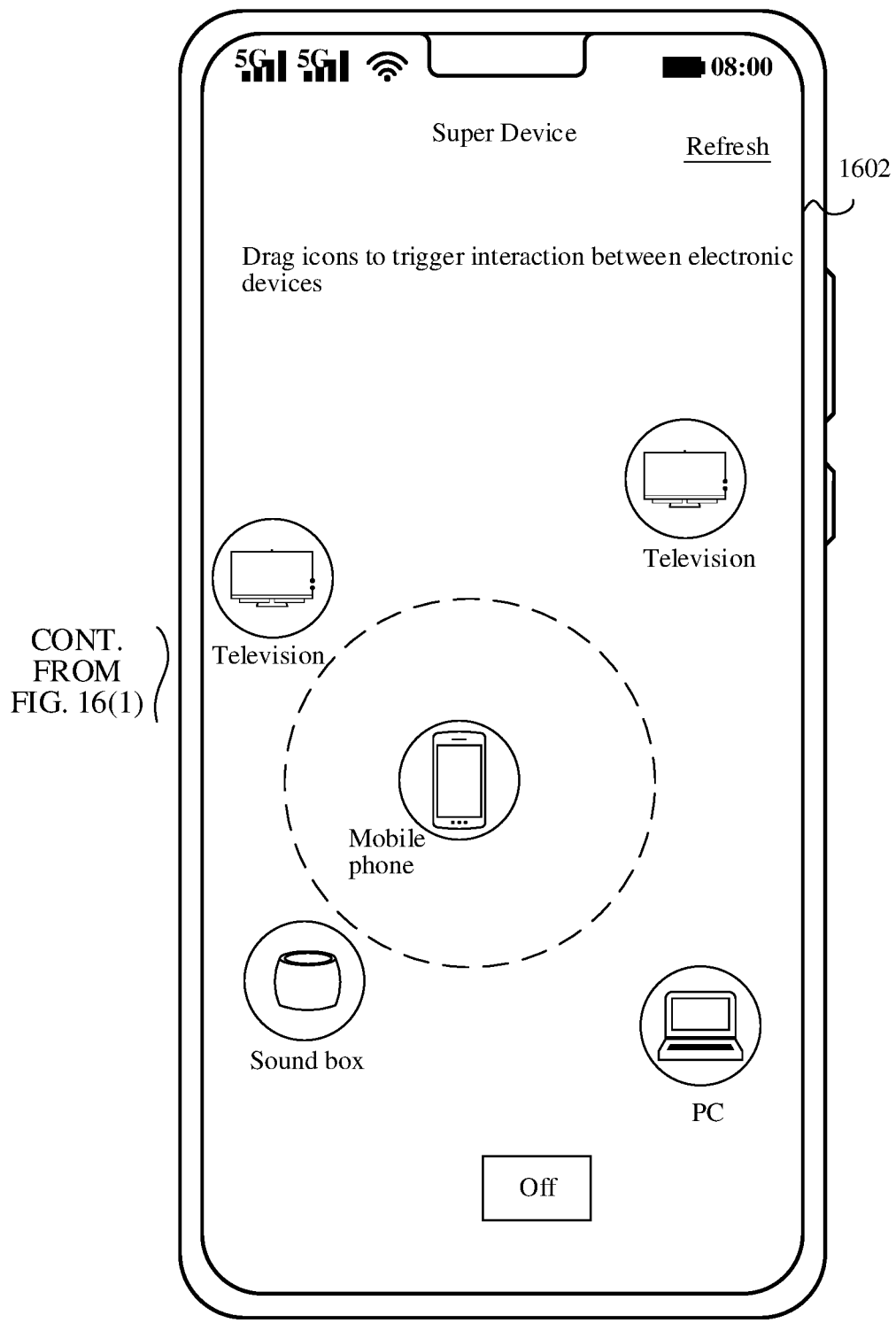

Further, the user may cancel (or disable) an interaction function between the mobile phone 101 and a PC 104. For example, in an interface 1601 shown in FIG. 16(1), a device icon of a PC and a device icon of a mobile phone are adsorbed together, indicating that a mobile phone 101 and a PC 104 are performing an interaction function. In this case, if a user wants to cancel (or disable) the interaction function, the user may touch and hold the device icon of the PC, and drag the device icon away from the device icon of the mobile phone. When a distance between two device icons that are dragged is greater than a threshold R2 (which may be the same as or different from a threshold R1) and a hand is released, the device icon of the PC returns to a location before the absorption, for example, an interface 1602 shown in FIG. 16(2). In this case, the PC 104 exits the interaction function with the mobile phone 101. Alternatively, the user may touch and hold the device icon of the PC, and drag the device icon away from the device icon of the mobile phone. When a distance of dragging by a finger (that is, a moving distance of the device icon of the PC, or a distance between two device icons) is less than the threshold R2 (which may be the same as or different from the threshold R1) and a hand is released, the device icon of the PC returns to an adsorption location, for example, the interface 1601 shown in FIG. 16(1). In this case, the PC 104 exits the interaction function with the mobile phone 101.

Figure 17:
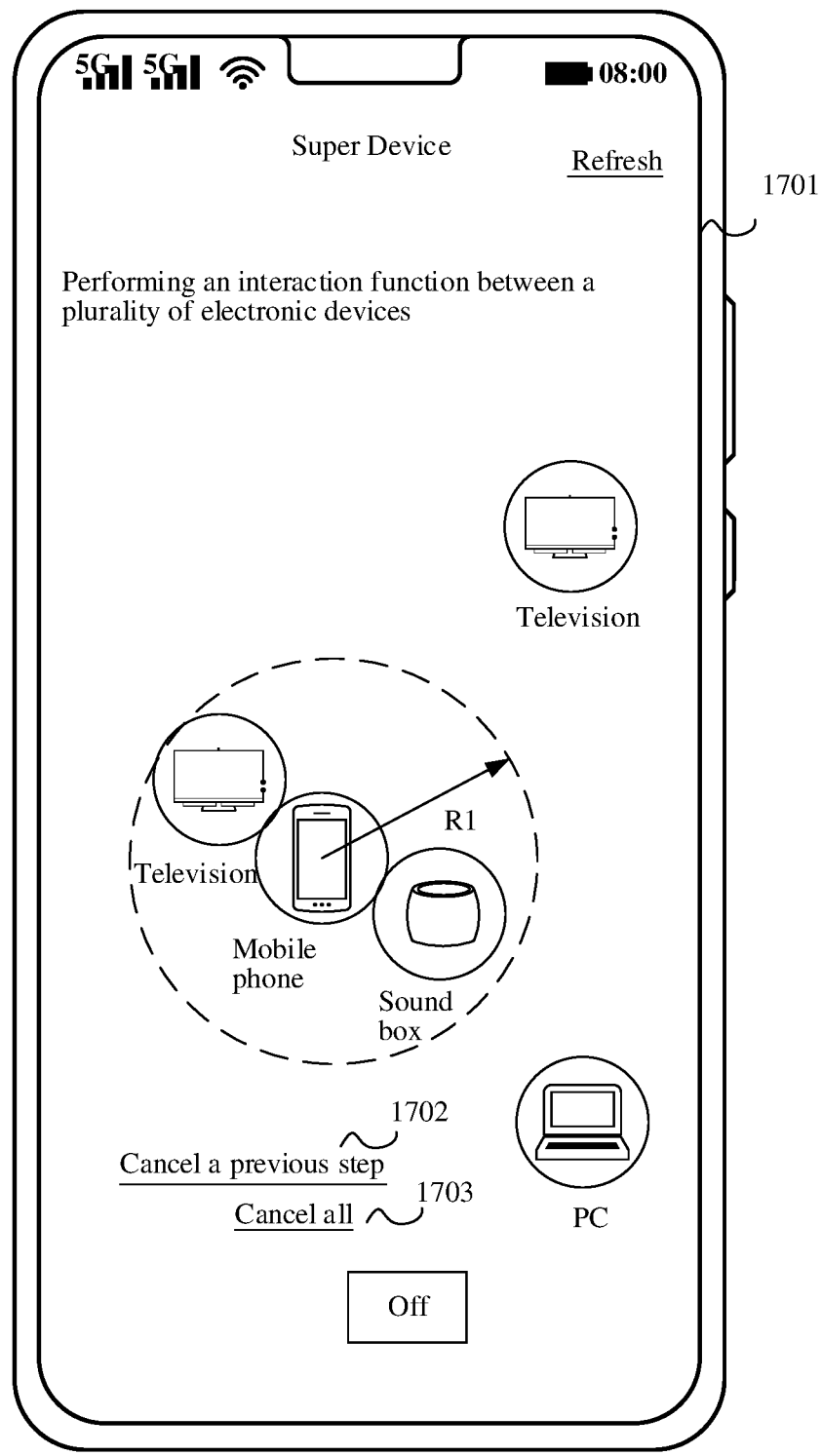
FIG. 17 is a schematic diagram of still some user interfaces of an electronic device according to an embodiment of this application.

In another embodiment, as shown in FIG. 17, an interface 1701 includes a control 1702 for canceling a previous step. In response to detecting that a user operates the control 1702, a mobile phone 101 cancels a drag operation performed by the user in a previous step. Optionally, the interface 1701 may further include a control 1703 for canceling all. In response to detecting that the user operates the control 1703, the mobile phone 101 cancels all interaction functions between electronic devices by one click.

The foregoing examples are all about how to trigger an interaction function between another electronic device and the mobile phone 101 on the interface A displayed on the mobile phone 101. In some other examples, an interaction function between electronic devices other than the mobile phone 101 may also be triggered on the display interface A of the mobile phone 101. For example, in an interface 1801 shown in FIG. 18(1), when it is detected that a user drags a device icon of a PC toward a device icon of a television, a distance between the device icon of the PC and the device icon of the television is less than a threshold R3, and a hand is released, a mobile phone 101 determines whether a PC 104 and a smart television 105 can perform an interaction function. If it is determined that the two electronic devices can perform the interaction function, on an interface displayed by the mobile phone 101, the device icon of the PC and the device icon of the television are adsorbed together, to prompt that the PC 104 and the smart television 105 are performing the interaction function. If it is determined that the two electronic devices cannot perform the interaction function, on the interface displayed by the mobile phone 101, the device icon of the PC returns to an initial position, and prompt information may be displayed, to prompt that the PC 104 and the smart television 105 cannot perform the interaction function or collaboration fails.

It should be noted that, the mobile phone 101 may not distinguish a direction in which a user performs a drag operation, that is, when drag directions are different, interaction functions triggered between the two electronic devices are the same. For example, no matter whether it is detected that the user performs a drag operation shown in FIG. 18(1) or it is detected that the user performs the drag operation shown in FIG. 18(2), an interaction function triggered between the PC 104 and the smart television 105 is the same. The mobile phone 101 may alternatively distinguish a direction in which the user performs a drag operation. To be specific, when drag directions are different, interaction functions triggered between two electronic devices are different. For example, data transmission directions in the interaction functions are different. For example, when it is detected that the user performs the drag operation shown in FIG. 18(1), it may be determined to send a status of an application on the PC 104 to the smart television 105, and the smart television 105 continues to run the application. When it is detected that the user performs the drag operation shown in FIG. 18(2), it may be determined to send a status of an application on the smart television 105 to the PC 104, and the PC 104 continues to run the application.

The following describes, by using an example in which the mobile phone 101 distinguishes directions in which the user performs drag operations, a process in which the PC 104 and the smart television 105 are triggered on the mobile phone 101 to perform an interaction function.

Solution 1: The mobile phone 101 determines the interaction function performed between the PC 104 and the smart television 105.

Figure 19:
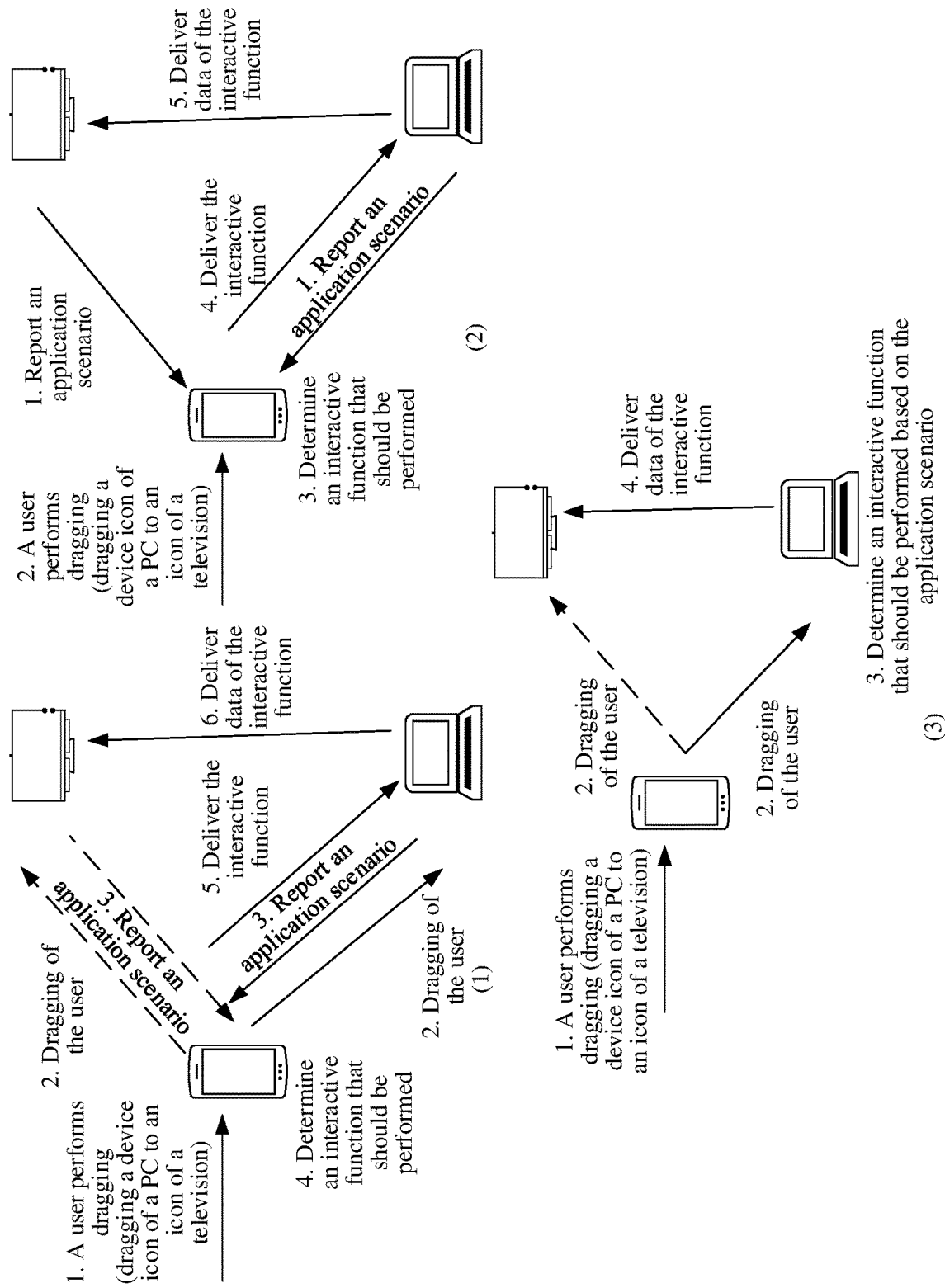
FIG. 19 is a schematic flowchart of some interaction functions triggered between electronic devices according to an embodiment of this application.

In a specific implementation, a procedure shown in FIG. 19 (1) includes the following steps:
1: The mobile phone 101 detects that a user drags a device icon of a PC toward a device icon of a television, and releases a hand when a distance between the device icon of the PC and the device icon of the television is less than the threshold R3.
2: The mobile phone 101 sends a drag instruction of the user to the PC 104, to prompt the PC 104 to send an instruction for reporting an application scenario of the PC 104. The application scenario of the PC 104 may be determined based on a current running application of the PC 104. For a determining method, refer to the foregoing method for determining an application scenario of the mobile phone 101. Optionally, the mobile phone 101 may also send a drag instruction of the user to the smart television 105.
3: The PC 104 reports the current application scenario of the PC 104 to the mobile phone 101. Optionally, the smart television 104 also reports a current application scenario of the smart television 104 to the mobile phone 101.
4: The mobile phone 101 determines, based on the current application scenario of the PC 104 and a device type of the smart television 105, an interaction function that should be performed between the PC 104 and the smart television 105.
5: The mobile phone 101 delivers the determined interaction function to the PC 104.
6: The PC 104 establishes a wireless connection to the smart television 105, and delivers, to the smart television 105, data required by the interaction function, for example, a screen interface of the PC 104 required for an interaction function of screen mirroring, and a current application status of the PC 104 required for an interaction function of application handoff.

In another specific implementation, a procedure shown in FIG. 19 (2) includes the following steps:
1: The PC 104 and the smart television 105 periodically send respective current application scenarios to the mobile phone 101; or when the application scenario changes, report a changed application scenario to the mobile phone 101.
2: The mobile phone 101 detects that a user drags a device icon of a PC toward a device icon of a television, and releases a hand when a distance between the device icon of the PC and the device icon of the television is less than the threshold R3.
3: The mobile phone 101 determines, based on the current application scenario of the PC 104 and a device type of the smart television 105, an interaction function that should be performed between the PC 104 and the smart television 105.
4: The mobile phone 101 delivers the determined interaction function to the PC 104.
5: The PC 104 establishes a wireless connection to the smart television 105, and delivers, to the smart television 105, data required by the interaction function, for example, a screen interface of the PC 104 required for an interaction function of screen mirroring, and a current application status of the PC 104 required for an interaction function of application handoff.

Solution 2: The PC 104 or the smart television 105 determines the interaction function performed between the PC 104 and the smart television 105.

In still another specific implementation, the procedure shown in FIG. 19 (3) includes the following steps:
1: The mobile phone 101 detects that a user drags a device icon of a PC toward a device icon of a television, and releases a hand when a distance between the device icon of the PC and the device icon of the television is less than the threshold R3.
2: The mobile phone 101 sends a drag instruction of the user to the PC 104. Optionally, the mobile phone 101 may also send a drag instruction of the user to the smart television 105.
3: The PC 104 determines, based on a current application scenario of the PC 104 and a device type of the smart television 105, an interaction function that should be performed between the PC 104 and the smart television 105.
4: The PC 104 establishes a wireless connection to the smart television 105, and delivers, to the smart television 105, data required by the interaction function, for example, a screen interface of the PC 104 required for an interaction function of screen mirroring, and a current application status of the PC 104 required for an interaction function of application handoff.

It may be understood that, when it is detected that the user performs, on the mobile phone 101, an operation of canceling (or disabling) the interaction function performed between the PC 104 and the smart television 105, the mobile phone 101 may send a disabling instruction to the PC 104 and/or the smart television 105, to disable the interaction function performed between the PC 104 and the smart television 105.

It should be noted that the foregoing solution 1, solution 2, and specific implementations in the solutions are only examples. In embodiments of this application, specific steps in a process of triggering, on the mobile phone 101, the PC 104 and the smart television 105 to perform the interaction function are not specifically limited.

In some other embodiments, after an interaction function between two or more electronic devices is triggered, the user may further reconfigure a provider of a capability required for the interaction function, that is, reconfigure which electronic device provides which capability required by the interaction function.

Figure 20:
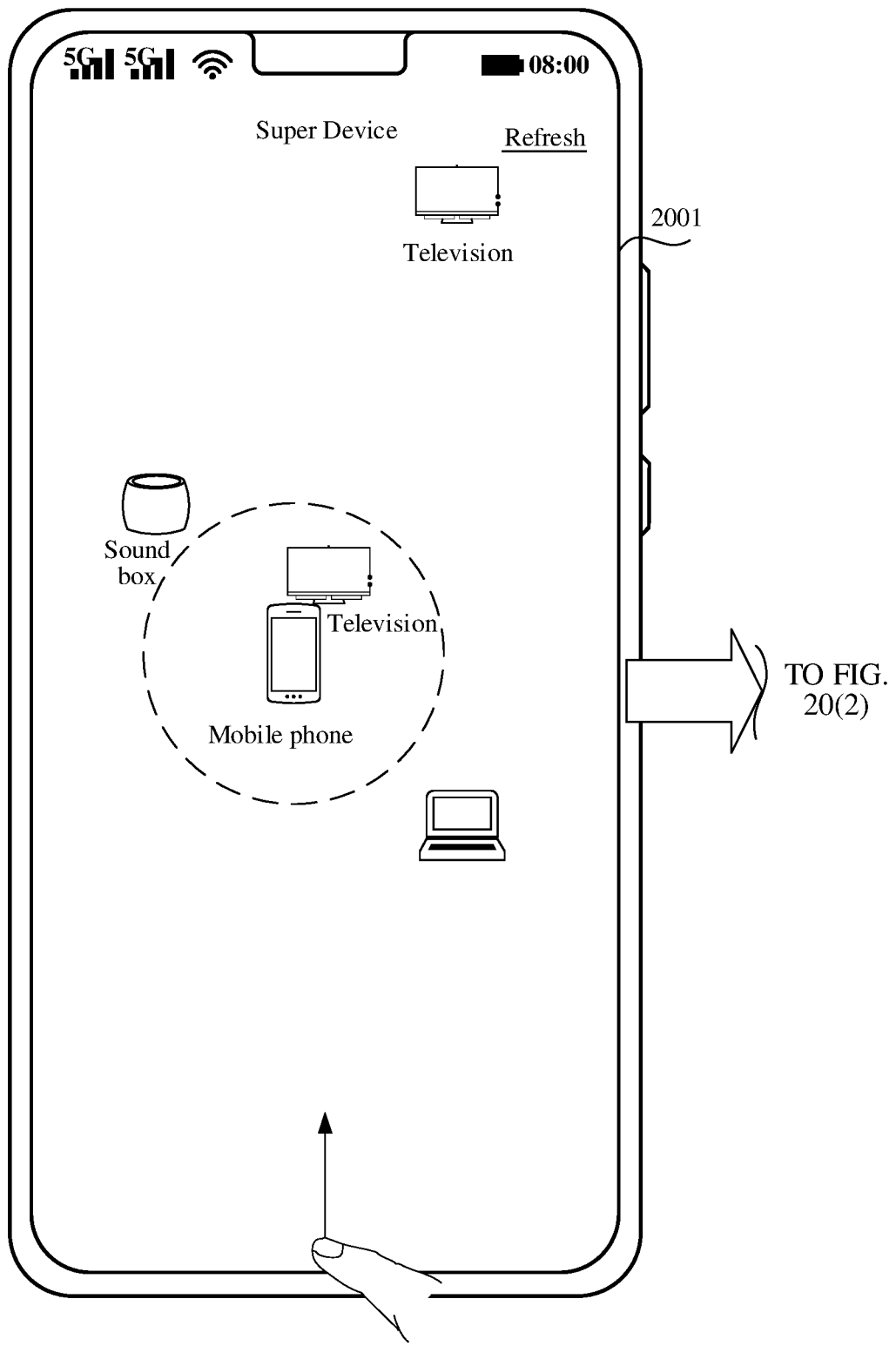
FIG. 20(1) to FIG. 20(3) are a schematic diagram of still some user interfaces of an electronic device according to an embodiment of this application.
Figure 20:
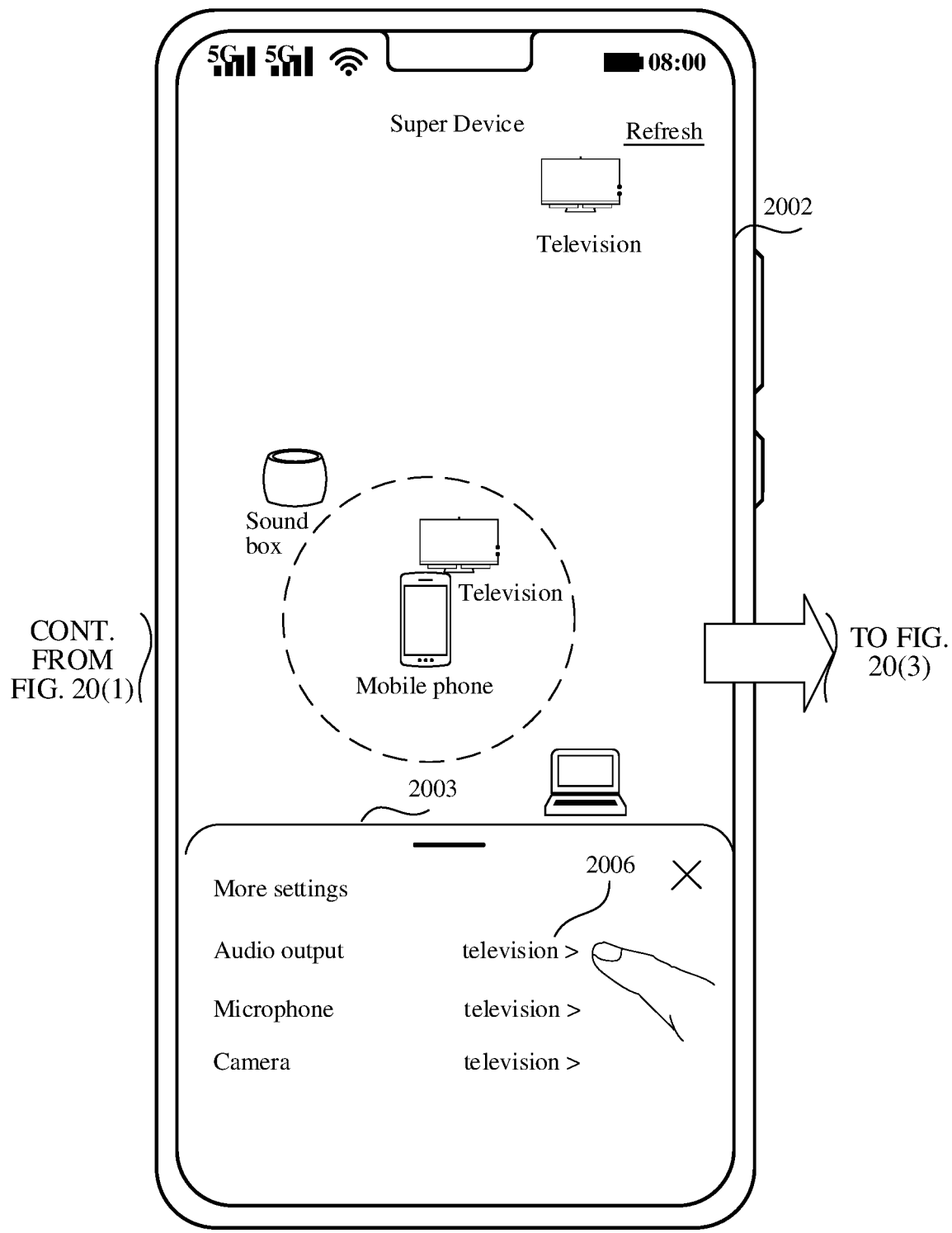
Figure 20:
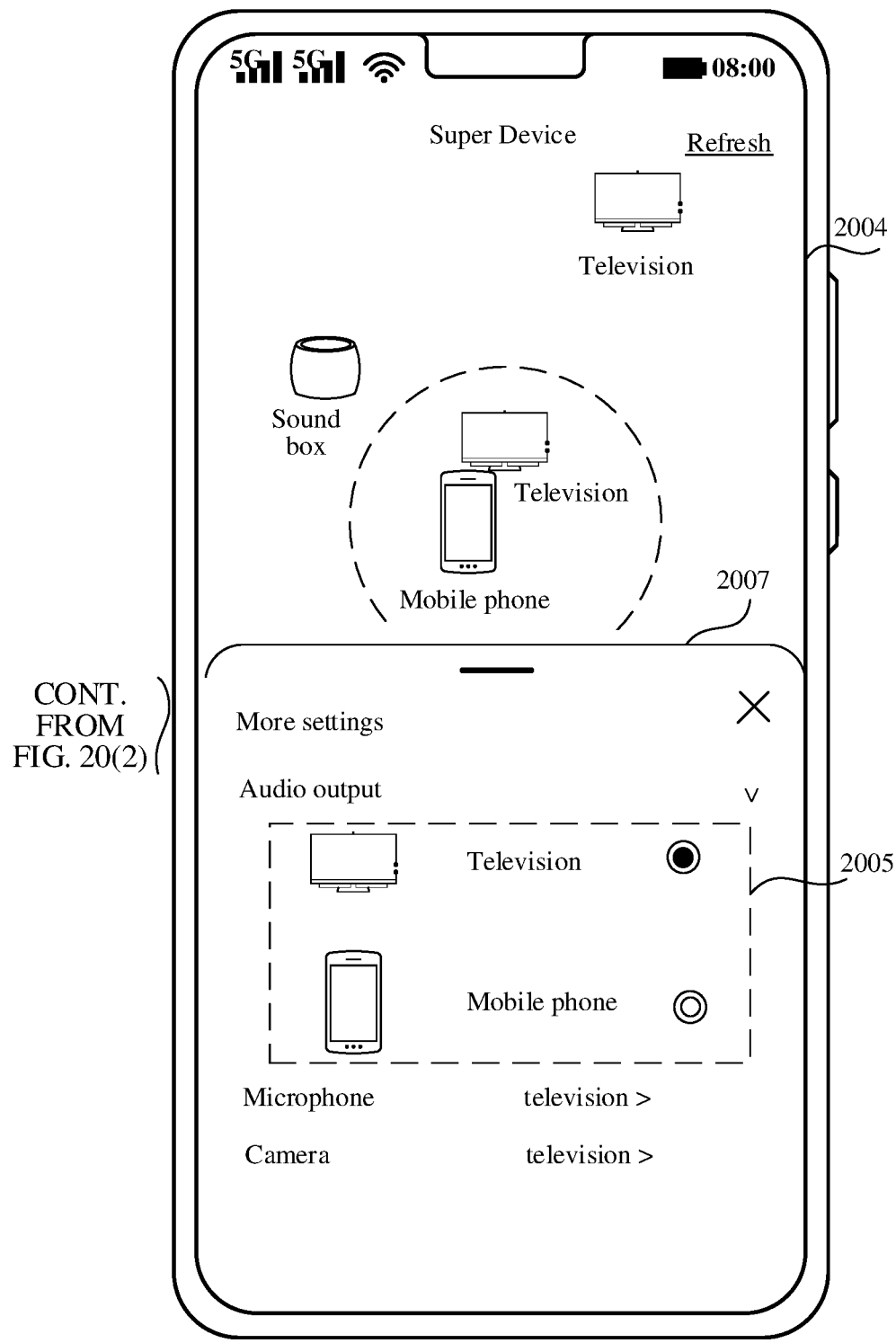

For example, as shown in FIG. 20(1), a mobile phone 101 displays an interface 2001. On the interface 2001, a device icon of a mobile phone and a device icon of a television are adsorbed together, indicating that the mobile phone 101 and a smart television 102 are performing an interaction function. When detecting an operation of sliding up from a bottom of the interface 2001 by a user, the mobile phone may display an interface 2002 shown in FIG. 20(2). A setting menu 2003 is displayed on the interface 2002. The setting menu 2003 displays a specific capability provided by each electronic device for a currently performed interaction function. The specific capability includes but is not limited to an audio output capability, a sound collection capability (that is, a microphone), an image collection capability (that is, a camera), and the like. The user may reconfigure, by using the setting menu 2003, which electronic device provides which capability required by the interaction function. For example, the menu 2003 in the interface 2002 shows that the smart television 102 provides an audio output capability for the interaction function. If the user wants to reconfigure another electronic device to provide an audio output capability for the interaction function, the user may alternatively tap an option 2006 corresponding to an audio output capability in a menu bar 2003, and the mobile phone 101 expands the option corresponding to an audio output capability. For example, in response to that the user taps the option 2006 in the menu bar 2003, the mobile phone 101 displays an interface 2004 shown in FIG. 20(3). Options 2005 of a plurality of electronic devices having an audio output capability are displayed in a setting menu 2007 in the interface 2004. The user may select, from the options 2005, another electronic device (for example, the mobile phone 101) to provide an audio output capability for the current interaction function.

In addition, the user may also enter the interface 2002 shown in FIG. 20(2) in another manner. For example, corresponding controls, for example, more setting controls, may alternatively be set on the interface 2001 shown in FIG. 20(1). In this case, in response to detecting that the user operates the control, the mobile phone 101 may also display the interface 2002 shown in FIG. 20(2).

In the foregoing embodiment, a setting menu displays a capability of an electronic device participating in a current interaction function. In some other embodiments, the setting menu may alternatively display all capabilities of a currently associated electronic device. To be specific, the setting menu includes a capability of an electronic device participating in a current interaction function and a capability of an electronic device not participating in the current interaction function. In this case, a user may also set, by using the setting menu, a capability required by the electronic device not participating in the current interaction function to provide the current interaction function, to trigger the electronic device not participating in the current interaction function to join the current interaction function.

Figure 21:
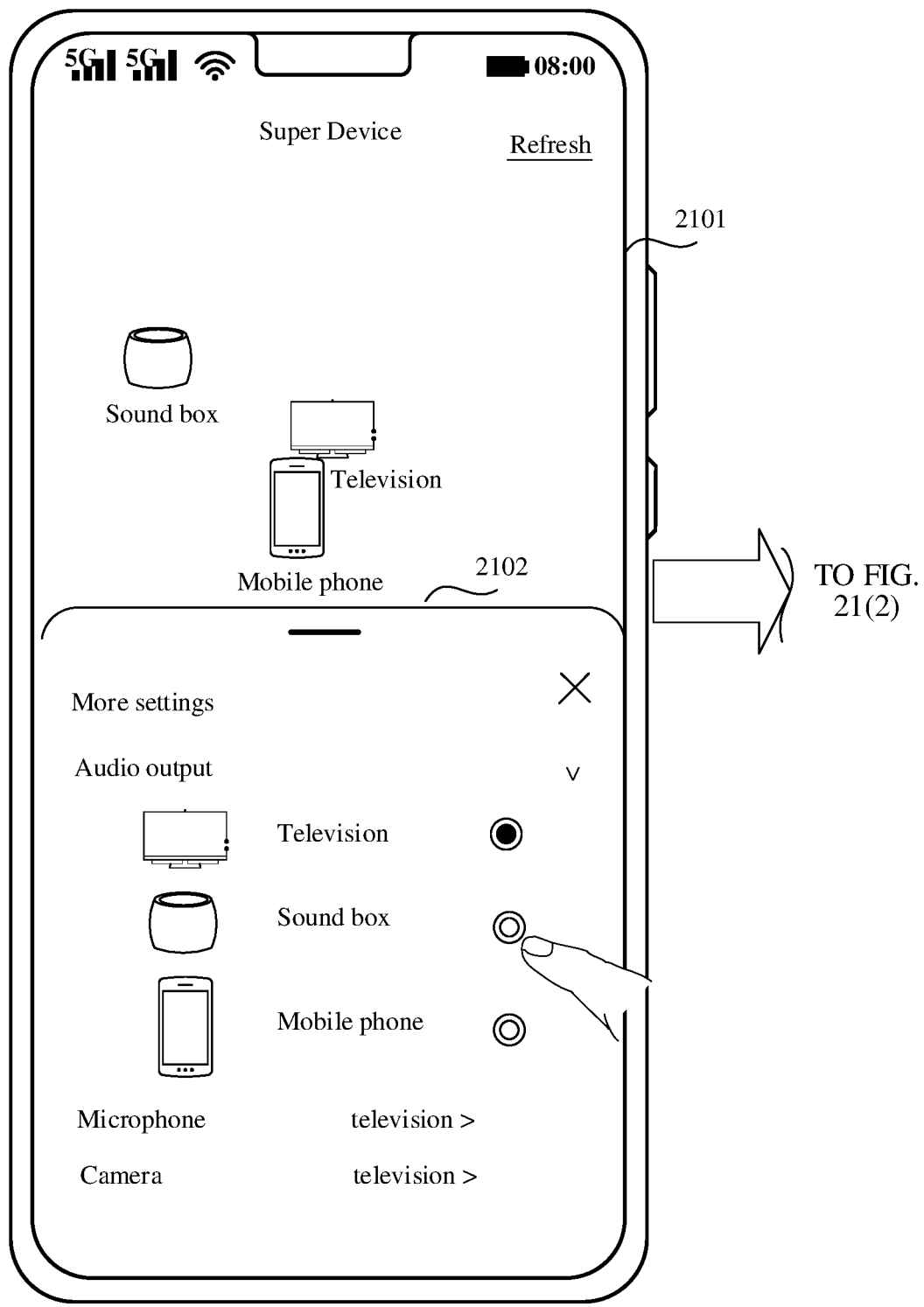
FIG. 21(1) and FIG. 21(2) are a schematic diagram of still some user interfaces of an electronic device according to an embodiment of this application.
Figure 21:
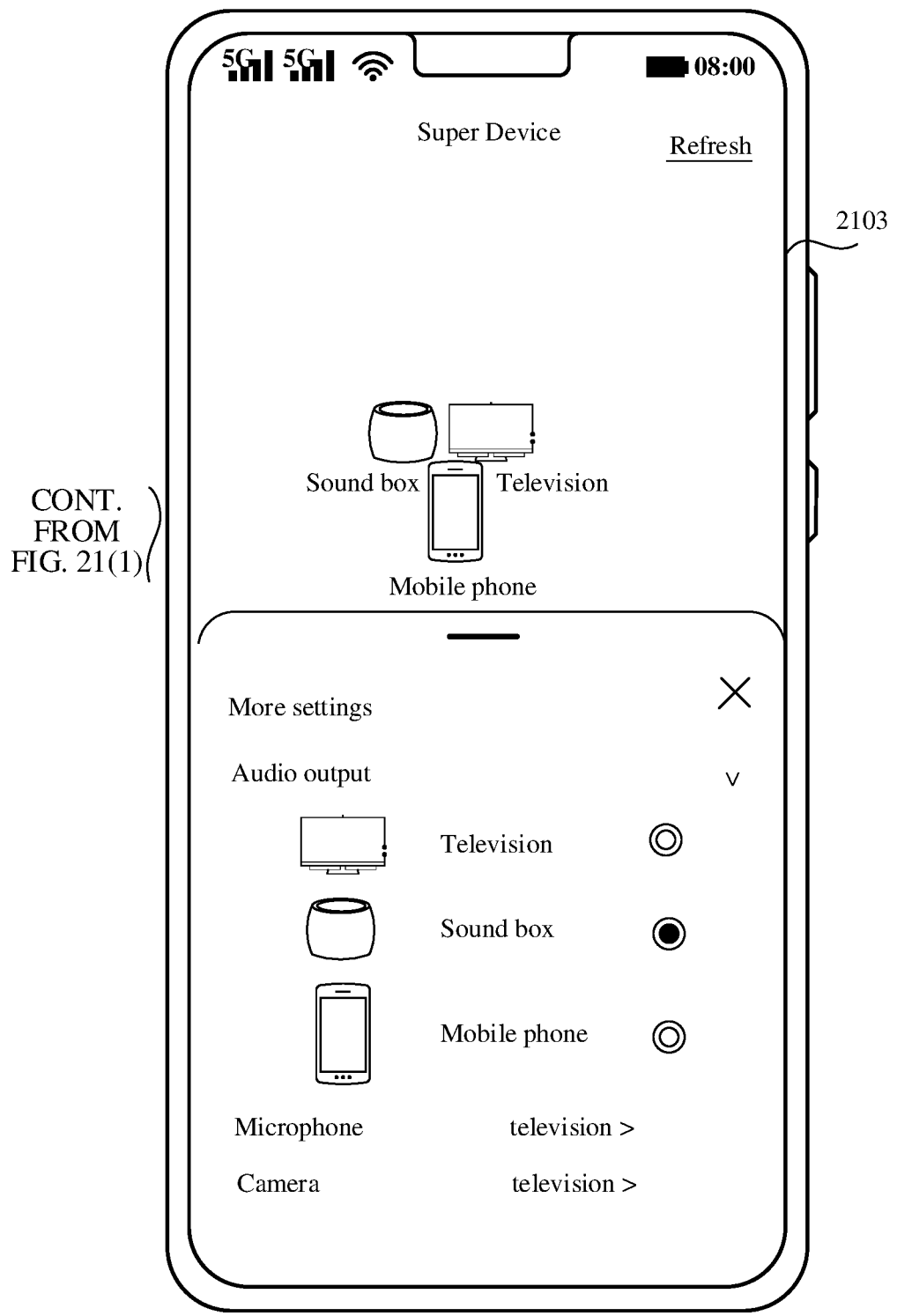

For example, as shown in FIG. 21(1), a mobile phone 101 displays an interface 2101. On the interface 2101, a device icon of a mobile phone and a device icon of a television are adsorbed together, indicating that the mobile phone 101 and a smart television 102 are performing an interaction function. In addition, in a setting menu 2102 in the interface 2101, options of each capability include all associated devices. For example, in an audio output capability, electronic devices participating in a current interaction function, namely, a device icon of the mobile phone 101 and a device icon of the smart television 102, are included, and an electronic device not participating in the current interaction function, for example, a device icon of the smart sound box 102, is also included. In this case, if a user selects the smart sound box 102 as an audio output device, the mobile phone 101 displays an interface shown in FIG. 21(2), that is, the device icon of the smart sound box 102 is also adsorbed together with the device diagram of the mobile phone 101 (and the smart television 102), that is, the smart television 102 also participates in the current interaction function.

Figure 18:
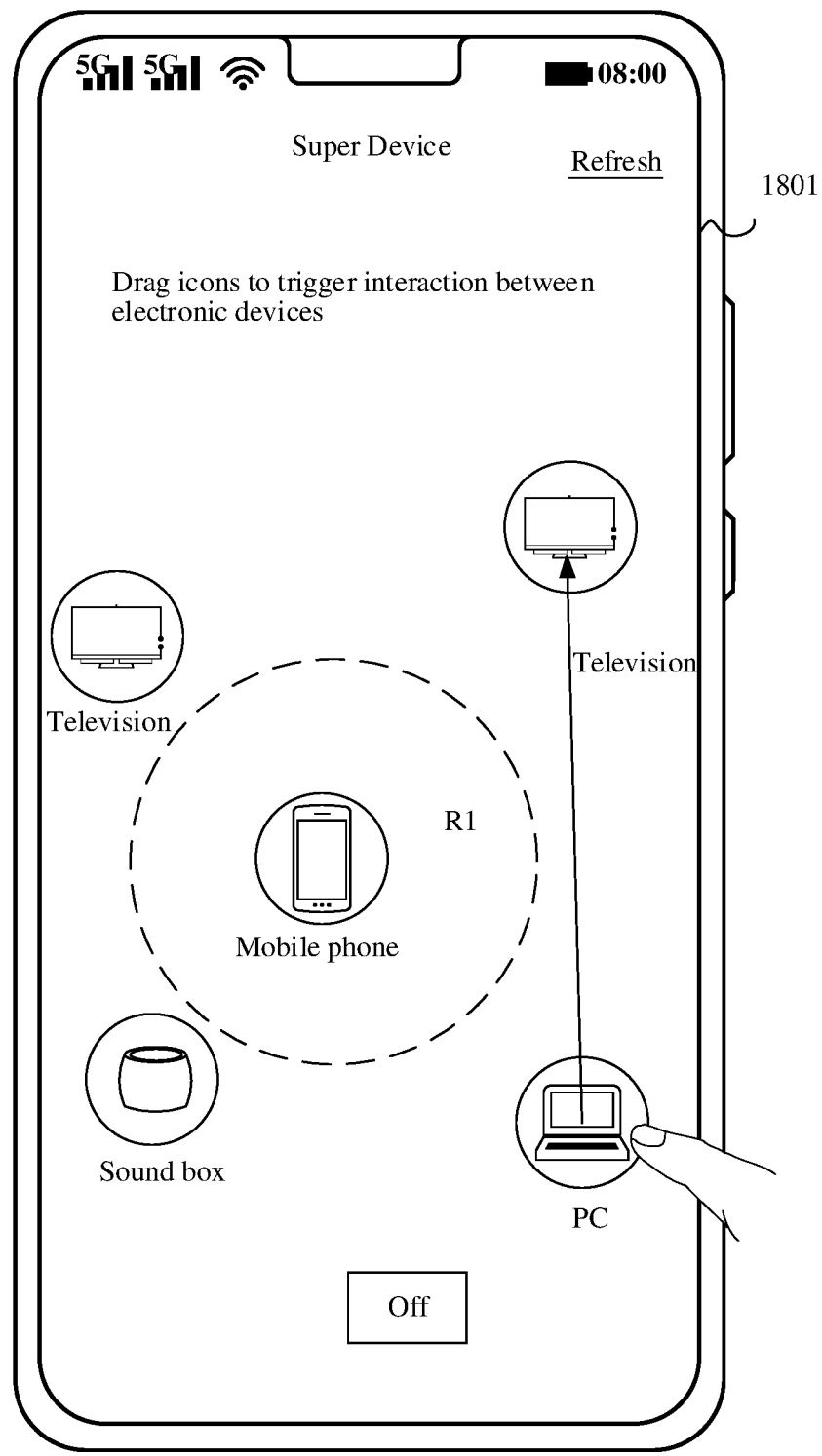
FIG. 18(1) and FIG. 18(2) are a schematic diagram of still some user interfaces of an electronic device according to an embodiment of this application.
Figure 18:
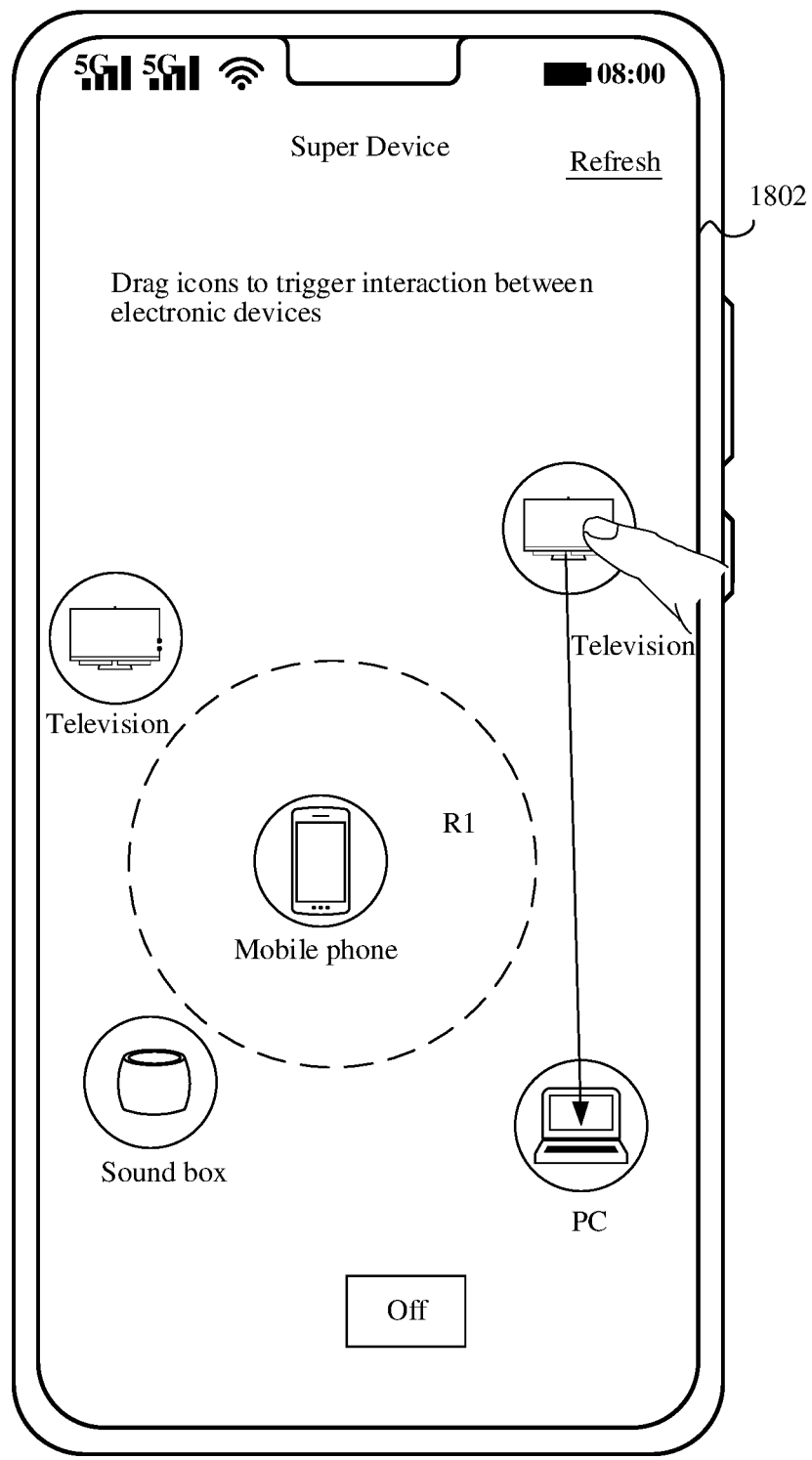

It should be noted that in the interfaces shown in FIG. 14(1) to FIG. 18(2) and FIG. 20(1) to FIG. 21(2) in embodiments of this application, a "super device" is displayed, to prompt a user that a current operation is performed on a plurality of associated terminals. Prompt information "super device" is only an example for description, and may be replaced with other content, for example, replaced with "smart collaboration" or "multi-device collaboration".

Figure 22:
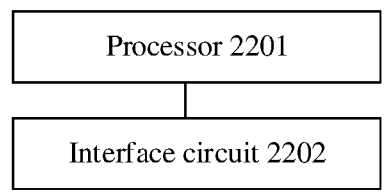
FIG. 22 is a schematic diagram of a structure of an apparatus according to an embodiment of this application.

An embodiment of this application further provides an apparatus. As shown in FIG. 22, the apparatus includes at least one processor 2201 and at least one interface circuit 2202. The processor 2201 and the interface circuit 2202 may be interconnected through a line. For example, the interface circuit 2202 may be configured to receive a signal from another apparatus (for example, a memory of a mobile phone 101). For another example, the interface circuit 2202 may be configured to send a signal to another apparatus (for example, the processor 2201). For example, the interface circuit 2202 may read instructions stored in the memory, and send the instructions to the processor 2201. When the instructions are executed by the processor 2201, the electronic device may perform steps performed by the mobile phone 101 (for example, a mobile phone) in the foregoing embodiments. Certainly, the chip system may further include another discrete device. This is not specifically limited in embodiments of this application.

An embodiment of this application further provides an apparatus. The apparatus is included in an electronic device, and the apparatus has a function of implementing behavior of the electronic device in any method in the foregoing embodiments. The function may be implemented by hardware, or may be implemented by hardware executing corresponding software. The hardware or the software includes at least one module or unit corresponding to the foregoing functions, for example, a detection module or unit, a display module or unit, a determining module or unit, and a calculation module or unit.

An embodiment of this application further provides a computer storage medium, including computer instructions. When the computer instructions are run on an electronic device, the electronic device is enabled to perform any method in the foregoing embodiments.

An embodiment of this application further provides a computer program product. When the computer program product runs on a computer, the computer is enabled to perform any method in the foregoing embodiments.

An embodiment of this application further provides a graphical user interface on an electronic device. The electronic device includes a display, a camera, a memory, and one or more processors. The one or more processors are configured to execute one or more computer programs stored in the memory; and the graphical user interface includes a graphical user interface displayed when the electronic device performs any method in the foregoing embodiments.

It may be understood that to implement the foregoing functions, the terminal or the like includes corresponding hardware structures and/or software modules for performing the functions. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of the present invention.

In embodiments of this application, the terminal or the like may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in embodiments of the present invention, module division is an example, and is merely a logical function division. During actual implementation, another division manner may be used.

The foregoing descriptions about implementations allow a person skilled in the art to clearly understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments. Details are not described herein again.

Functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, like a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
    displaying, by a first electronic device, a first interface, wherein the first interface comprises a first control corresponding to the first electronic device, a second control corresponding to a second electronic device, and a third control corresponding to a third electronic device, wherein the second electronic device is associated with the first electronic device, and a distance between the first control and the second control is a first distance, and wherein the third electronic device is associated with the first electronic device, and a distance between the first control and the third control is a third distance;
    receiving, by the first electronic device, a first operation of a user on the second control;
    in response to the first operation, controlling, by the first electronic device, the first distance between the first control and the second control to change to a second distance, and determining, by the first electronic device, to perform a first interaction function with the second electronic device, wherein the second distance is less than the first distance;
    receiving, by the first electronic device, a second operation on the third control; and
    in response to the second operation, controlling, by the first electronic device, the third distance between the first control and the third control to change to a fourth distance, and determining, by the first electronic device, to perform a second interaction function with the third electronic device;
    wherein the fourth distance is less than the third distance, and the first interaction function and the second interaction function are different;
    wherein the first electronic device continues to perform the first interaction function with the second electronic device when the first electronic device performs the second interaction function with the third electronic device; and
    wherein the first control is a device icon of the first electronic device, the second control is a device icon of the second electronic device, and the third control is a device icon of the third electronic device.

2. The method according to claim 1, wherein: that the second electronic device is associated with the first electronic device comprises:
    the second electronic device and the first electronic device are located in a same communication network;
    the second electronic device and the first electronic device log in to a same account;
    a login account of the second electronic device and a login account of the first electronic device belong to a same group;
    the second electronic device has been connected to a hotspot shared by the first electronic device;

the first electronic device has been connected to a hotspot shared by the second electronic device; or the first electronic device and the second electronic device have established a Wi-Fi direct connection; and that the third electronic device is associated with the first electronic device comprises the third electronic device and the first electronic device are located in a same communication network;

the third electronic device and the first electronic device log in to a same account;

a login account of the third electronic device and a login account of the first electronic device belong to a same group;

the third electronic device has been connected to a hotspot shared by the first electronic device;

the first electronic device has been connected to a hotspot shared by the third electronic device; or the first electronic device and the third electronic device have established a Wi-Fi direct connection.

3. The method according to claim 1, wherein the first operation comprises:

dragging the second control on the first interface, and releasing the second control when the distance between the second control and the first control is less than a first threshold, wherein the first threshold is less than the first distance, and the first threshold is greater than or equal to the second distance.

4. The method according to claim 3, wherein:

dragging the second control on the first interface comprises: touching and holding the second control on the first interface, and dragging the second control towards the first control.

5. The method according to claim 1, wherein the second operation comprises:

dragging the third control on the first interface, and releasing the third control when the distance between the third control and the first control is less than a second threshold, wherein the second threshold is less than the third distance, and the second threshold is greater than or equal to the fourth distance.

6. The method according to claim 1, wherein determining, by the first electronic device, to perform the first interaction function with the second electronic device comprises:

determining, by the first electronic device, the first interaction function based on information about an application currently running on the first electronic device and a device type of the second electronic device.

7. The method according to claim 1, wherein after the distance between the first control and the second control is changed to the second distance, the method further comprises:

receiving, by the first electronic device, a fourth operation on the second control; and in response to the fourth operation, controlling, by the first electronic device, the distance between the second control and the first control to change to the first distance, and stopping performing the first interaction function with the second electronic device.

8. The method according to claim 7, wherein the fourth operation comprises:

dragging the second control, and releasing the second control when a distance between the second control and the first control is greater than a third threshold; wherein the third threshold is less than or equal to the first distance, and the third threshold is greater than the second distance.

9. The method according to claim 1, wherein in the first interface, the third control, and the second control are disposed around the first control.

10. The method according to claim 1, wherein:

the first electronic device is a mobile phone, the second electronic device is a sound box, the first electronic device performing the first interaction function with the second electronic device comprises audio that is being played on the mobile phone being switched to the sound box for playing; and the third electronic device is a television, the first electronic device performing the second interaction function with the third electronic device comprises content on a screen of the mobile phone being projected to the television for display.

11. A first electronic device, comprising:

a processor;

a non-transitory memory; and a touchscreen, wherein the non-transitory memory and the touchscreen are coupled to the processor, the non-transitory memory storing computer program code, the computer program code comprises computer instructions, and when the processor reads the computer instructions from the non-transitory memory, the first electronic device is enabled to perform:

displaying a first interface, wherein the first interface comprises a first control corresponding to the first electronic device, a second control corresponding to a second electronic device and a third control corresponding to a third electronic device, wherein the second electronic device is associated with the first electronic device, and a distance between the first control and the second control is a first distance, and wherein the third electronic device is associated with the first electronic device, and a distance between the first control and the third control is a third distance;

receiving a first operation of a user on the second control;

in response to the first operation, controlling the first distance between the first control and the second control to change to a second distance, and determining to perform a first interaction function with the second electronic device, wherein the second distance is less than the first distance;

receiving a second operation on the third control; and in response to the second operation, controlling the third distance between the first control and the third control to change to a fourth distance, and determining to perform a second interaction function with the third electronic device;

wherein the fourth distance is less than the third distance, the first interaction function and the second interaction function are different;

wherein the first electronic device continues to perform the first interaction function with the second electronic device when the first electronic device performs the second interaction function with the third electronic device; and wherein the first control is a device icon of the first electronic device, the second control is a device icon of the second electronic device, and the third control is a device icon of the third electronic device.

12. The first electronic device according to claim 11, wherein:

that the second electronic device is associated with the first electronic device comprises:

the second electronic device and the first electronic device are located in a same communication network;

the second electronic device and the first electronic device log in to a same account;

a login account of the second electronic device and a login account of the first electronic device belong to a same group;

the second electronic device has been connected to a hotspot shared by the first electronic device;

the first electronic device has been connected to a hotspot shared by the second electronic device; or the first electronic device and the second electronic device have established a Wi-Fi direct connection; and that the third electronic device is associated with the first electronic device comprises:

the third electronic device and the first electronic device are located in a same communication network;

the third electronic device and the first electronic device log in to a same account;

a login account of the third electronic device and a login account of the first electronic device belong to a same group;

the third electronic device has been connected to a hotspot shared by the first electronic device;

the first electronic device has been connected to a hotspot shared by the third electronic device; or the first electronic device and the third electronic device have established a Wi-Fi direct connection.

13. The first electronic device according to claim 11, wherein the first operation comprises:

dragging the second control on the first interface, and releasing the second control when the distance between the second control and the first control is less than a first threshold, wherein the first threshold is less than the first distance, and the first threshold is greater than or equal to the second distance.

14. The first electronic device according to claim 13, wherein:

dragging the second control on the first interface comprises: touching and holding the second control on the first interface, and dragging the second control toward the first control.

15. The first electronic device according to claim 11, wherein the second operation comprises:

dragging the third control on the first interface, and releasing the third control when the distance between the third control and the first control is less than a second threshold, wherein the second threshold is less than the third distance, and the second threshold is greater than or equal to the fourth distance.

16. The first electronic device according to claim 11, wherein determining to perform a first interaction function with the second electronic device comprises:

determining the first interaction function based on information about an application currently running on the first electronic device and a device type of the second electronic device.

17. The first electronic device according to claim 11, wherein after the distance between the first control and the second control is changed to the second distance, the first electronic device is further enabled to perform:

receiving a fourth operation on the second control; and in response to the fourth operation, controlling the distance between the second control and the first control to change to the first distance, and stopping performing the first interaction function with the second electronic device.

18. The first electronic device according to claim 11, wherein in the first interface, the third control, and the second control are disposed around the first control.

19. The first electronic device according to claim 11, wherein:

the first electronic device is a mobile phone, the second electronic device is a sound box, the first electronic device performing the first interaction function with the second electronic device comprises audio that is being played on the mobile phone being switched to the sound box for playing; and the third electronic device is a television, the first electronic device performing the second interaction function with the third electronic device comprises content on a screen of the mobile phone being projected to the television for display.

* * * * *